United States Patent
Cho

(10) Patent No.: US 9,869,922 B2
(45) Date of Patent: Jan. 16, 2018

(54) OPTICAL LENS SYSTEM FOR CAMERA

(71) Applicants: Sunggoo Cho, Jecheon-si (KR); LIGHT AND MATH INC., Jecheon-si (KR)

(72) Inventor: Sunggoo Cho, Jecheon-si (KR)

(*) Notice: Subject to any disclaimer, the term of this patent is extended or adjusted under 35 U.S.C. 154(b) by 0 days.

(21) Appl. No.: 15/120,688

(22) PCT Filed: Mar. 9, 2015

(86) PCT No.: PCT/KR2015/002259
§ 371 (c)(1),
(2) Date: Aug. 22, 2016

(87) PCT Pub. No.: WO2015/152528
PCT Pub. Date: Oct. 8, 2015

(65) Prior Publication Data
US 2017/0017134 A1 Jan. 19, 2017

(30) Foreign Application Priority Data
Apr. 3, 2014 (KR) .................. 10-2014-0039771

(51) Int. Cl.
*G03B 9/02* (2006.01)
*G03B 9/04* (2006.01)
(Continued)

(52) U.S. Cl.
CPC .............. *G03B 9/02* (2013.01); *G03B 9/04* (2013.01); *G03B 15/03* (2013.01); *G03B 17/12* (2013.01);
(Continued)

(58) Field of Classification Search
None
See application file for complete search history.

(56) References Cited

U.S. PATENT DOCUMENTS 5,047,792 A * 9/1991 Asano .................. G03B 17/12
396/176
5,960,217 A * 9/1999 Goto .................... G03B 7/097
396/170

(Continued)

FOREIGN PATENT DOCUMENTS

JP 2004-333554 11/2004
JP 2005-326777 11/2005
(Continued)

OTHER PUBLICATIONS

English translation of 10-2009-0076635.
(Continued)

*Primary Examiner* — W B Perkey
(74) *Attorney, Agent, or Firm* — Antonio Ha & U.S. Patent, LLC

(57) ABSTRACT

An optical lens system for photographing an object, according to an embodiment of the present invention, comprises an object image forming member for forming an image of the object, a light source for providing light to the object, optical lenses, an aperture stop area, and a switching aperture disposed in the aperture stop area. The switching aperture includes a base plate having, in the center thereof, an opening for an image to be taken, a blade having, in the center thereof, a pin hole for an image to be magnified such that a magnified image corresponding to the object is formed, and a variable connection member bent or straightened according to power supply to induce light incident from the object to form a photographed image via the opening for an image to be taken or form a magnified image via the pin hole for an image to be magnified.

19 Claims, 35 Drawing Sheets

(51) Int. Cl.
*G03B 15/03* (2006.01)
*H04N 5/225* (2006.01)
*G03B 17/12* (2006.01)
*G03B 19/16* (2006.01)
*H04N 5/232* (2006.01)

(52) U.S. Cl.
CPC .......... *G03B 19/16* (2013.01); *H04N 5/2254* (2013.01); *H04N 5/23296* (2013.01); *G03B 2205/0053* (2013.01)

(56) References Cited

U.S. PATENT DOCUMENTS

| 7,832,948 B1* | 11/2010 | Gutierrez | G03B 9/00 396/457 |
|---|---|---|---|
| 2011/0292198 A1 | 12/2011 | Lapstun et al. | |
| 2017/0017134 A1* | 1/2017 | Cho | G03B 9/02 |

FOREIGN PATENT DOCUMENTS

| KR | 10-2005-0006623 | 1/2005 |
| KR | 10-2006-0050873 | 5/2006 |
| KR | 10-2009-0076635 | 7/2009 |
| KR | 10-1058020 | 8/2011 |
| KR | 10-2013-0006696 | 1/2013 |
| WO | WO2006/083081 | 8/2006 |

OTHER PUBLICATIONS

English translation of 10-2013-0006696.
English translation of 10-1058020.
English translation of 10-2006-0050873.
English translation of 10-2005-0006623.
English translation of 2004-333554.
English translation of 2005-326777.

* cited by examiner

OPTICAL LENS SYSTEM FOR CAMERA

TECHNICAL FIELD

The present invention relates to optical lens systems for cameras, and more specifically, to optical lens systems for cameras which are capable of flexibly performing a series of magnified image formation functions (i.e., object magnifying function) as well as basic captured image formation functions.

DISCUSSION OF RELATED ART

A recent remarkable development of electric/electronic technology leads to a sharp growth or spread of electronic devices (e.g., desktop computers, mobile phones, tablet PCs, game players, or laptop computers) that are equipped with an optical lens system for cameras (e.g., digital cameras) to carry out a series of camera functions in various manners.

As shown in FIG. 1, an optical lens system 10 according to the prior art is systematically configured with an object image formation member 16 for forming a captured image corresponding to an object P, which has a CCD device or CMOS device for forming images disposed therein), optical lenses 11, 12, 13, and 14 arranged ahead of the object image formation member 16, an aperture stop area positioned in a front space of the optical lenses 11, 12, 13, and 14, gap spaces between the optical lenses 11, 12, 13, and 14, or a rear space of the optical lenses 11, 12, 13, and 14, an aperture stop 17 disposed in the aperture stop area to adjust the amount of light entering the object image formation member 16, and an optical filter 15 disposed before the object image formation member 16 to cut off unnecessary light beams (for reference, there may be one or more optical lenses 11, 12, 13, and 14. Here, in case there is one optical lens, the aperture stop area 18 is positioned before or behind the optical lens.)

In such case, the aperture stop area 18 may freely be positioned anywhere in the optical lens system 10 depending on the feature of the optical lens system 10 (or an electronic device adopting the same—Of course, the aperture stop area 18 is an essential component as a position of an aperture stop that should be provided in all optical lens systems 10. For reference, FIG. 1 illustrates an example in which the aperture stop area 18 is present between the first optical lens 11 and the second optical lens 12).

Here, light beams 19 coming from the object P are transmitted through the optical lenses 11, 12, 13, and 14 and refracted, and then pass through the optical filter 15 to the object image formation member 16, forming a captured image corresponding to the object P (for reference, only light beams coming from an object point on the optical axis are shown in order to avoid unnecessary confusion that might be caused by those far from the gist of the present invention.

Meanwhile, as electronic devices equipped with such above-described optical lens system 10 for camera spread, there are various ongoing efforts to add new separate functions to the electronic devices, e.g., an object magnifying function (such as one by a microscope or magnifier).

As shown in FIG. 2, however, if the object P is brought close to the optical lens system 10 in order to utilize the camera optical lens system 10 for the purpose of object magnification, the light beams 19 coming from the object P after passing through the wide opening of the aperture stop 17, forms a series of dispersed focuses with to decreased focal depth and an increased width H1, resulting in formation of a very blurred image on the object image formation member 16. Therefore, the user of the electronic device may get in trouble in using the camera optical lens system for magnifying object (Of course, as shown in FIG. 2, as the object P is brought closer to the optical lens system 10, the light beams 19 from the object P would form a dispersed focus with a larger width H2.)

To overcome such difficulty, e.g., International Patent Application Publication No. WO 2006/083081 published on Aug. 10, 2006 or U.S. Patent Application Publication No. 2011/0292198 published on Dec. 1, 2011 discloses a technique in which a separate lens system for magnifying object is detachably provided in a front surface of an optical lens system for camera to guide the optical lens system to perform a series of object magnification functions, such as those by a microscope.

However, the conventional techniques take such a raw approach as independently attaching or detaching a separate lens system for magnifying object from a camera optical lens system, which renders the same difficult to carry and use along with the electronic device.

Resultantly, under such various issues, the conventional optical lens system for camera may merely perform its own basic captured image formation function but not a series of magnified image formation functions (i.e., object magnifying function). Due to a failure to perform the magnified image formation function, the manufacturer or user of the electronic device suffers from various issues (e.g., a deterioration of quality competitiveness of the electronic device or reduction in application of the electronic device).

SUMMARY

According to an embodiment of the present invention, the present invention aims to provide an optical lens system for camera in which a switching aperture is further disposed at the position where an aperture stop area is defined to perform a series of switching operations, such as increasing or decreasing its width of opening for width of transparent area) so that the light beam from the object has an increased or decreased width, thereby allowing a captured image or magnified image corresponding to the object to be selectively formed on the object image formation member.

Therefore, the optical lens system for camera may easily address various issues (e.g., a significant deterioration of the quality competitiveness of the product or reduction in application of the product) that the manufacturer or user of the electronic device may suffer due to a failure to form magnified images by allowing for flexible addition of a series of magnified image formation functions (i.e., object magnifying function) as well as its own basic captured image formation function even without, e.g., difficulty in attaching or detaching an additional lens system for magnified image or increase in the overall length of the product.

Other objects of the present invention will be apparent from the following detailed description taken in conjunction with the accompanying drawings.

To achieve the above objects, according to the present invention, there is disclosed an optical lens system for a camera for image capturing an object, the optical lens system comprising: an object image formation member for forming a captured image or a magnified image corresponding to the object, a light source supplying a light beam to the object when the magnified image is formed, optical lenses arranged in front of the object image formation member, an aperture stop area located in a front space of the optical lenses, a spacing space between the optical lenses, or a rear space of the optical lenses, and a switching aperture disposed in the aperture stop area, wherein the switching aperture includes a base plate having an opening for the captured image at as center thereof, a blade provided in the base plate and having a pin hole for the magnified image at a center thereof which may decrease a width of the light beam coming from the object to adjust the light beam to have an increased focal depth so that an magnified image corresponding to the object may be formed on the object image formation member, and a variable connecting member connected with the blade as a body and bent or unbent according to a power supply state to position the blade in an opening non-formation area for the captured image or an opening formation area for the captured image to guide the light beam from the object to pass through the opening for the captured image and form the captured image or to pass through the pin hole for the magnified image and form the magnified image.

The optical lens system may further comprise a micro-lens surface for the magnified image formed at a center of an optical lens surface right adjacent to the aperture stop area, and when the light beam coming from the object is guided to form the magnified image, the variable connecting member allows the light beam to pass through the micro-lens surface for the magnified image and the pin hole for the magnified image, and a blocking member may be disposed at a side of the blade or the variable connecting member to block the micro-lens surface for the magnified image when the blade is positioned in the opening non-formation area for the captured image so that the opening for the captured image is positioned in an incident path of the light beam.

The variable connecting member may further include a wrinkle in a direction perpendicular to the base plate to allow the blade to move in parallel with the base plate.

The variable connecting member may be formed of an electro-active polymer (EAP) material or piezoelectric material.

Further, according to another aspect of the present invention, there is disclosed an optical lens system for a camera for image capturing an object, the optical lens system comprising: an object image formation member for forming a captured image or a magnified image corresponding to the object, a light source supplying a light beam to the object when the magnified image is formed, optical lenses arranged in front of the object image formation member, an aperture stop area located in a front space of the optical lenses, a spacing space between the optical lenses, or a rear space of the optical lenses, and a switching aperture disposed in the aperture stop area, wherein the switching aperture includes a base plate having an opening for the captured image at a center thereof, a blade provided in the base plate and having a pin hole for the magnified image at a center thereof, which may decrease as width of the light beam coming from the object to adjust the light beam to have an increased focal depth so that a magnified image corresponding to the object may be formed on the object image formation member, a link member connected with the blade as a body, and an actuator connected via the link member with the blade as a body and rotating the link member according to a power supply state to position the blade in an opening non-formation area for the captured image or an opening formation area for the captured image to guide the light beam from the object to pass through the opening for the captured image and form the captured image or to pass through the pin hole for the magnified image and form the magnified image.

The optical lens system may further comprise a micro-lens surface for the magnified image formed at a center of an optical lens surface right adjacent to the aperture stop area, and when the light beam coming from the object is guided to form the magnified image, the actuator may allow the light beam to pass through, the micro-lens surface far the magnified image and the pin hole for the magnified image, and a blocking member may be disposed at a side of the blade or the link member to block the micro-lens surface for the magnified image when the blade is positioned in the opening non-formation area for the captured image so that the opening for the captured image is positioned in an incident path of the light beam.

The actuator may be any one of a voice coil motor (VCM)-type actuator or a micro electro mechanical system (MEMS)-type actuator.

The machine aperture may further include a cap having an opening corresponding to the opening for the captured image at a center thereof and coupled with the base plate as a body.

The pin hole may have a diameter of 0.3 mm to 0.3 mm.

A micro-lens having a positive refractive power may be further mounted on the pin hole for magnified image to converge the light beam coming from the object.

Further, according to still another aspect of the present invention, there is disclosed an optical lens system for a camera for image capturing an object, the optical lens system comprising: an object image formation member for forming a captured image or a magnified image corresponding to the object, a light source supplying a light beam to the object when the magnified image is formed, optical lenses arranged in front of the object image formation member, an aperture stop area located in a front space of the optical lenses, a spacing space between the optical lenses, or a rear space of the optical lenses, and a switching aperture disposed in the aperture stop area, wherein the switching aperture includes a first transparent plate having a central transparent electrode, a second transparent plate coupled with the first transparent plate as a body to form a spacing space and having a transparent electrode for the captured image, a transparent electrode for the magnified image disposed at a center of the second transparent plate while electrically separated from the transparent electrode for the captured image and decreasing at width of the light beam coming from the object to adjust the light beam to have an increased focal depth so that the magnified image corresponding to the object may be formed on the object image formation member, and a polymer dispersed liquid crystal layer disposed in the spacing space between the first transparent plate and the second transparent plate, forming a regular or irregular arrangement state depending on a state of being supplied power from the transparent electrode for the captured image or the transparent electrode for the magnified image while power is supplied to the central transparent electrode to adjust an area corresponding to the transparent electrode for the captured image or an area corresponding to the transparent electrode for the magnified image into a transparent state or opaque state so as to guide the light beam coming from the object to pass through the transparent electrode for the captured image to form the captured image or guide the light beam to pass through the transparent electrode for the magnified image to form the magnified image.

A micro-lens surface for the magnified image corresponding to the transparent electrode for the magnified image may be further formed at a center of an optical lens surface right adjacent to the aperture stop area.

The transparent electrode for magnified image may have a diameter of 0.03 mm to 0.3 mm.

A micro-lens having a positive refractive power may be further mounted on the transparent electrode for magnified image to converge the light beam coming from the object.

The polymer dispersed liquid crystal layer may include a polymer, a liquid crystal particle, and a pigment.

The transparent electrode for the magnified image may be further formed at a center of the central transparent electrode provided in the first transparent plate.

According to the present invention, a switching aperture may be further disposed at the position where an aperture stop area is defined to perform a series of switching operations, such as increasing or decreasing its width of opening (or width of transparent area) so that the light beam from the object has an increased or decreased width, thereby allowing a captured image or magnified image corresponding to the object to be selectively formed on the object image formation member.

Accordingly under an environment where the present invention is implemented, the optical lens system for camera may flexibly add a series of magnified image formation functions (i.e., object magnifying function) as well as its own basic captured image formation function even without, e.g., difficulty in attaching or detaching an additional lens system for mainlined image or increase in the overall length of the product.

Therefore, the manufacturer or user of the electronic device may easily avoid various issues (e.g., a significant deterioration of the quality competitiveness of the product or reduction in application of the product).

DETAILED DESCRIPTION OF EXEMPLARY EMBODIMENTS

Hereinafter an optical lens system for a camera according to the present invention is described in greater detail with reference to the accompanying drawings.

Figure 1:
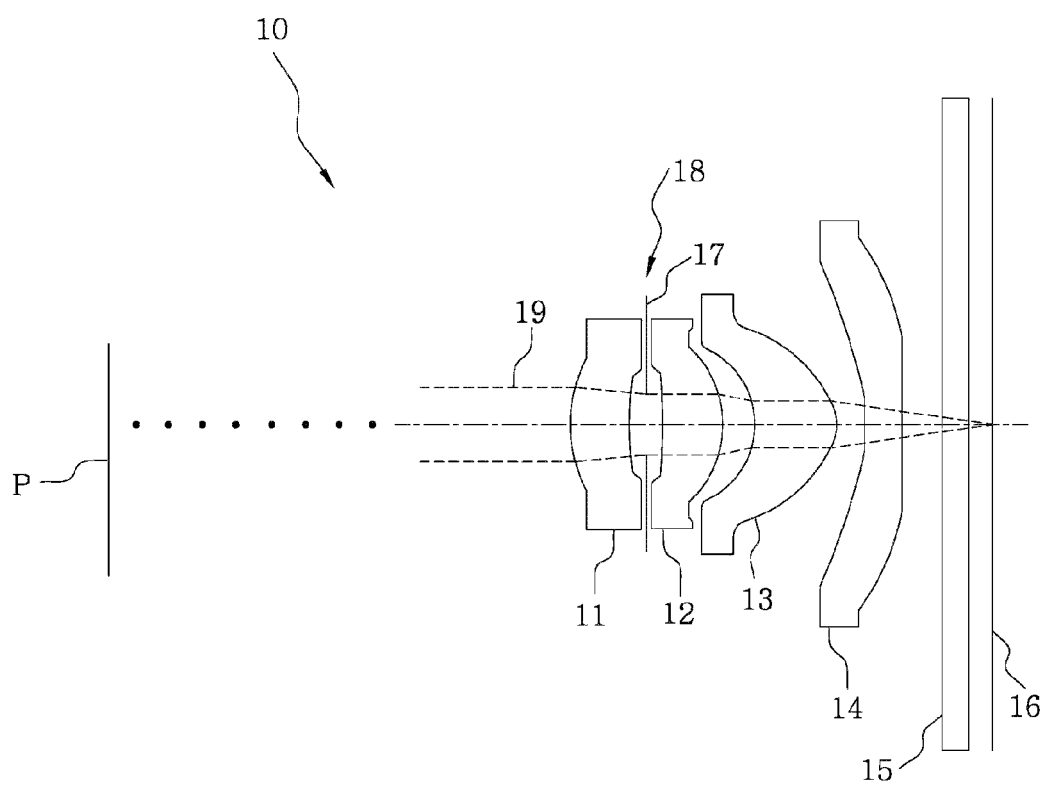
FIGS. 1 and 2 are views conceptually illustrating an optical lens system for a camera according to the prior art.
Figure 2:
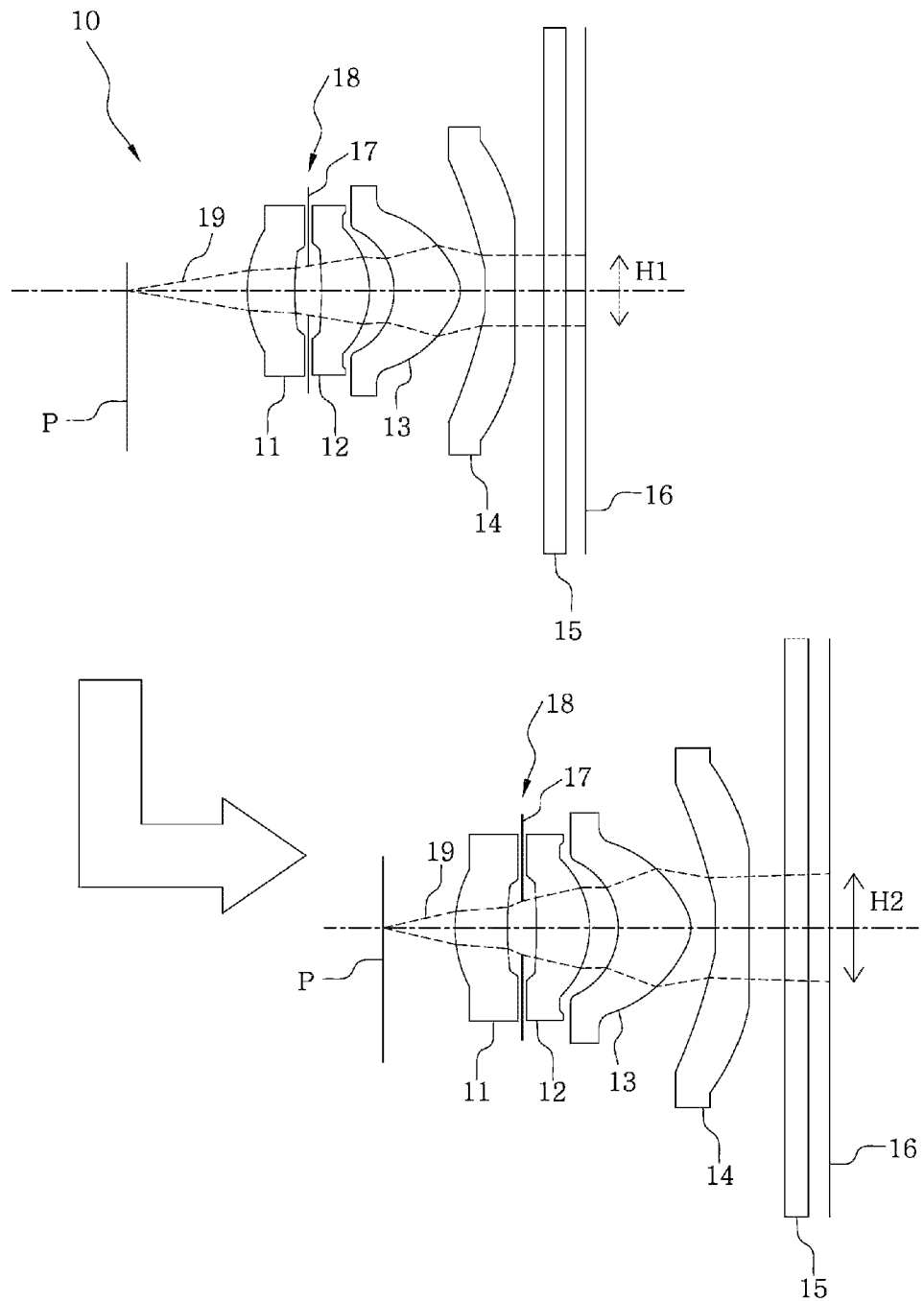
Figure 3:
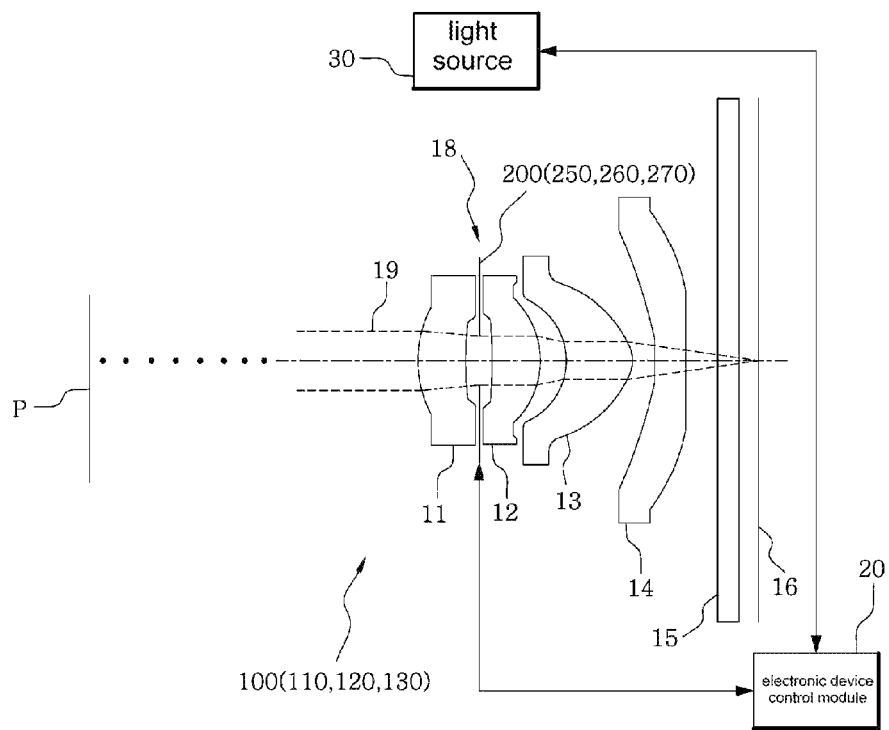
FIGS. 3 and 4 are views conceptually illustrating an optical lens system for a camera according to an embodiment of the present invention.
Figure 4:
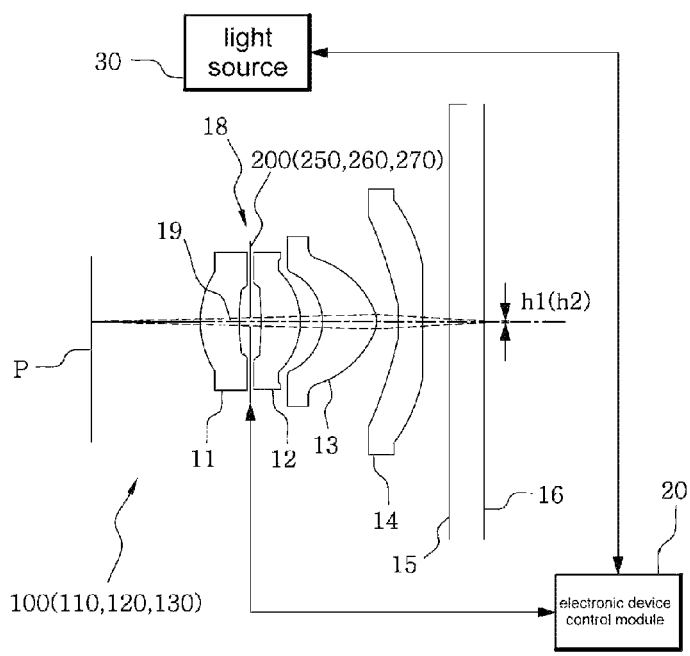

As shown in FIGS. 3 and 4, according to an embodiment of the present invention, an optical lens system 100 is systematically configured with an object image formation member 16 for forming a captured image corresponding to an object P, which has a CCD device or CMOS device for forming images disposed therein, optical lenses 11, 12, 13, and 14 arranged ahead of the object image formation member 16, an aperture stop area positioned in a front space of the optical lenses 11, 12, 13, and 14, gap spaces between the optical lenses 11, 12, 13, and 14, or a rear space of the optical lenses 11, 12, 13, and 14, and an optical filter 15 disposed before the object image formation member 16 to cut off unnecessary light beams (for reference, there may be one or more optical lenses 11, 12, 13, and 14. Here, in case there is one optical lens, the aperture stop area 18 is positioned before or behind the optical lens.)

In such case, the aperture stop area 18 may freely be positioned anywhere in the optical lens system 100 depending on the feature of the optical lens system 100 or an electronic device adopting the same—Of course, the aperture stop area 18 is an essential component as a position of an aperture stop that should be provided in all optical lens systems 100. For reference, FIGS. 3 and 4 illustrate art example in which the aperture stop area 18 is present between the first optical lens 11 and the second optical lens 12).

Here, light beams 19 coming from the object P are transmitted through the optical lenses 11, 12, 13, and 14 and refracted, and then pass throughout the optical filter 15 to the object image formation member 16, forming a captured image corresponding to the object P (refer to FIG. 3).

Of course, in order to add a separate, new function, e.g., an object magnifying function, such as one by a microscope or magnifier, to the above-described optical lens system 100 for camera, an additional unique measure needs to be taken accordingly.

According to the present invention, such a measure has been conceived as to add a unique switching aperture 200 at a position where the aperture stop area 18 is defined.

In this case, according to an embodiment of the present invention, the switching aperture 200 may perform a series of switching operations of increasing the width of its opening (as shown in FIG. 3) or decreasing the width of the opening as shown in FIG. 4) according to a power supply state under the control of an electronic device control module 20 to induce the light beams from the object P to widen or narrow, thereby functioning as a guide to selectively form in a captured image corresponding to the object P (as shown in FIG. 3) or a magnified image corresponding to the object P (as shown in FIG. 4) on the object image formation member 16 (for reference, no detailed description of various circuitry components for supplying or cutting off power to the electronic device control module 20 is given in the following description for ease of description).

Of course, according to an embodiment of the present invention, the switching aperture 200 may fully escape from the conventional raw approach of independently attaching/detaching a separate lens system for magnifying object from the optical lens system for camera, and rather, it is stably embedded in the optical lens system it for camera. Thus, under the implementation environment according to the present invention, the user may freely obtain magnified images as well as his/her desired captured in without any trouble in portability of the electronic device.

Here, in such a phase that the opening of the switching aperture 200 is narrowed so that a magnified image (as shown in FIG. 4) corresponding to the object P is selectively formed on the object image formation member 16, the light source 30 is turned on under the control of the electronic device control module 20, and it may thus function as a guide for supplying a series of light beams to the object P (for reference, as shown in FIG. 3, in case a captured image corresponding to the object P is formed on the object image formation member 16, the light source 30 is turned off under the control of the electronic device control module 20).

Figure 5:
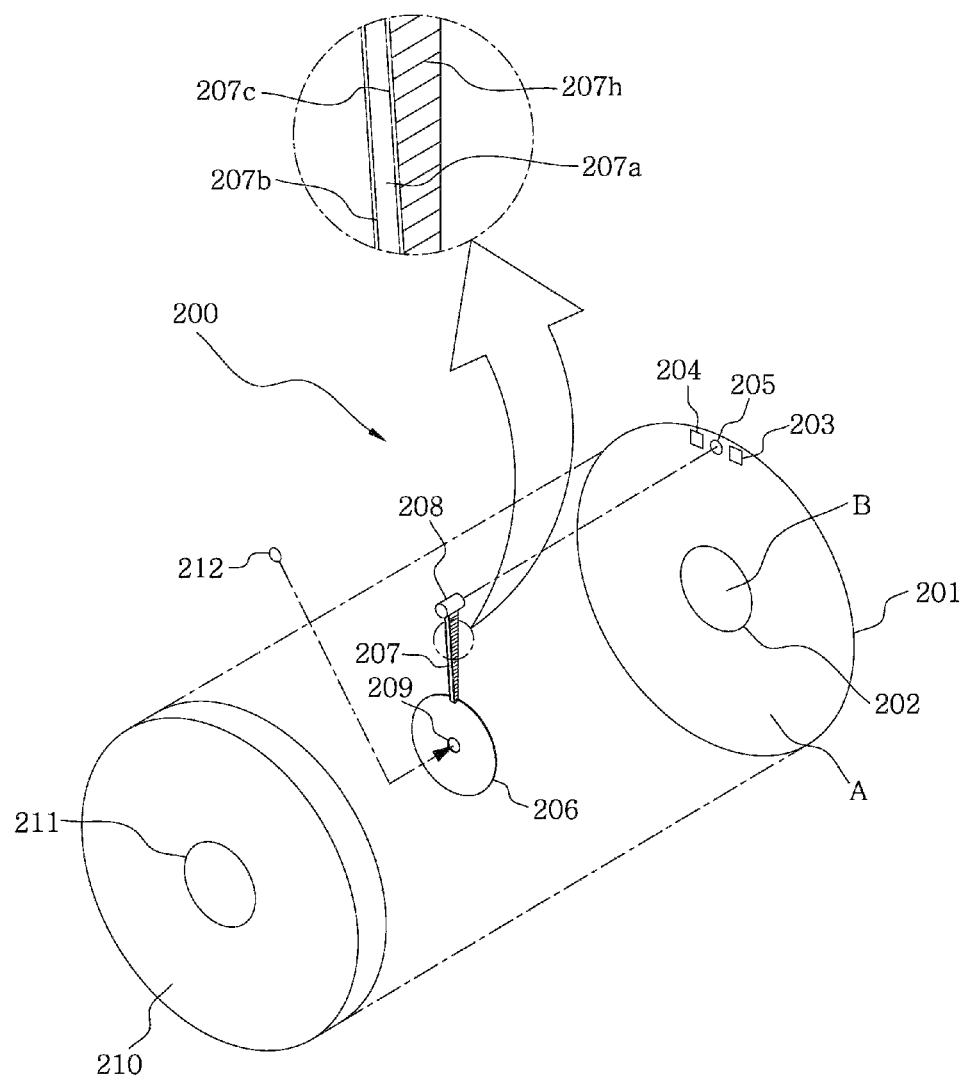
FIGS. 5 to 7 are views conceptually illustrating a detailed structure of a switching aperture and a process of performing functions according to another embodiment of the present invention.
Figure 6:
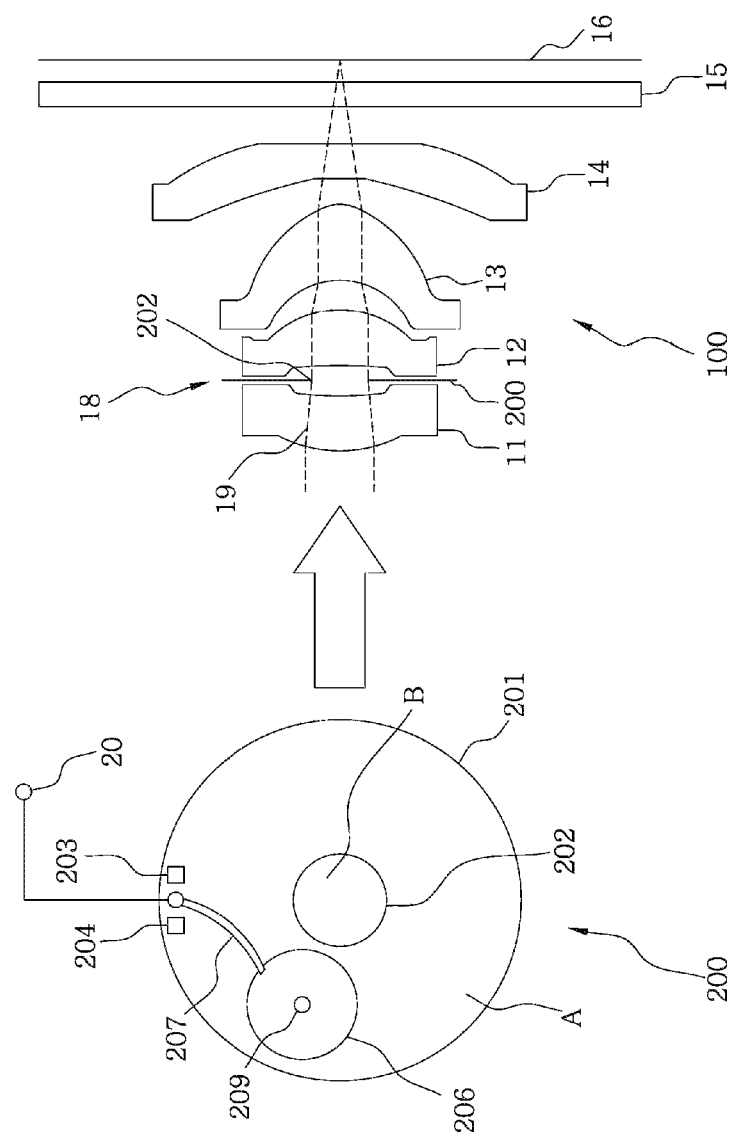
Figure 7:
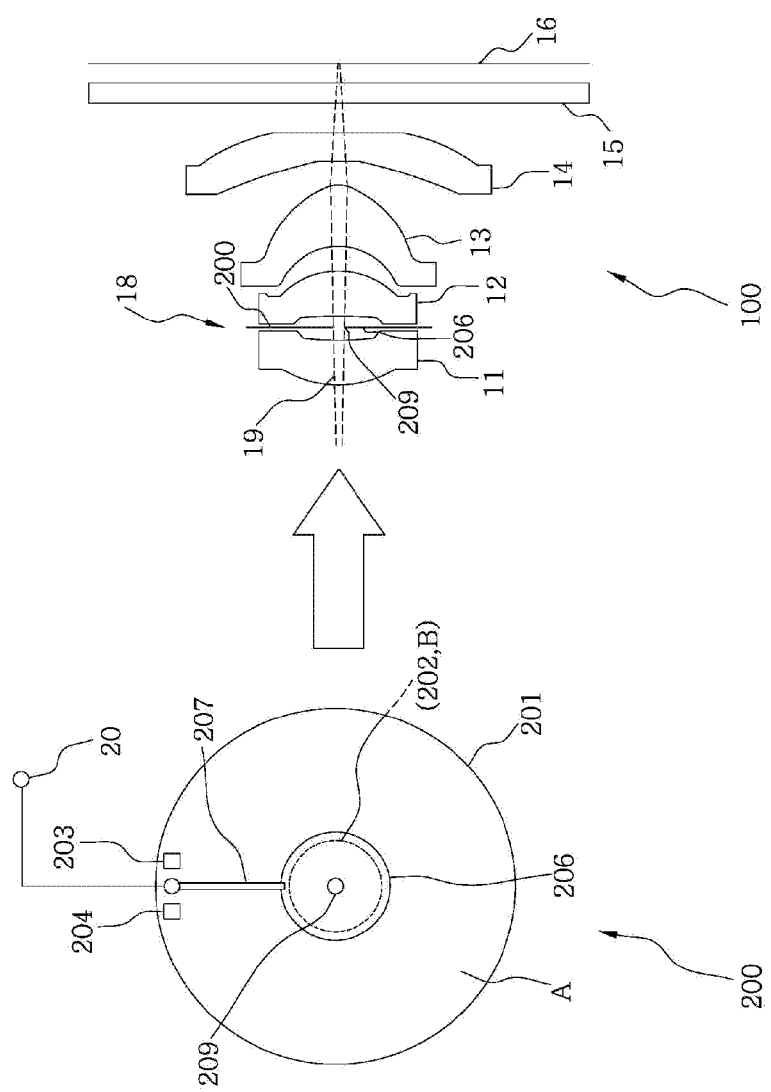

As shown in FIGS. 5 to 7, the switching aperture 200 according to an embodiment of the present invention includes a systematically combined configuration of a base plate 201 having an opening 202 at a center thereof to function as an opening of an aperture for camera, a blade 206 provided in the base plate 201 and having a pin hole 209 for a magnified image provided at a center thereof to decrease the width of the light beams 19 coming from the object P to thereby adjust the light beams 19 to have an increased focal depth so that a magnified image corresponding to the object P may be formed on the object image formation member 16, and a variable connecting member 207 connected with the blade 206 as a body and bent or unbent according to a power supply state by the electronic device control module 20 (refer to FIGS. 6 and 7) to position the blade 206 in an opening non-formation area A for captured image or an opening formation area B for captured image to guide the light beams 19 from the object P to pass through the opening 202 for captured image and form a captured image (refer to FIGS. 3 and 6) or to pass through the pin hole 209 for magnified image and form a magnified image (refer to FIGS. 4 and 7).

Here, a fastening protrusion inserting hole 205 is additionally provided in an edge of the base plate 201 for insertion of a fastening protrusion 208 formed in the variable connecting member 207 to fasten the variable connecting member 207 to be movable on the base plate 201. Electrode terminals 203 and 204 are additionally provided at both sides of the fastening protrusion inserting hole 205 for electrical connection with the variable connecting member 207 through an electrical line (not shown).

Here, the variable connecting member 207 bent or unbent according to the state of being supplied with power includes, e.g., an electro-active polymer (EAP).

In such case, the variable connecting member 207 includes a systematically combined conformation of a body 207a formed of, e.g., electronic EAP material (Unimorph type) or ionic EAP material and electrodes 207b and 207c electrically connected with the electrode terminals 203 and 204 while attached to left and right surfaces, respectively, of the body 207a. Here, the variable connecting member 207 further includes multiple wrinkles 207b for inducing the blade to 206 to move in parallel with respect to the base plate 201.

Now described in detail is a process for selectively thrilling a captured image or magnified image according to the state of being supplied power by an clinical lens system 100 for camera, including the switching aperture 200, according to an embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of supplying power to the electrodes 207b and 207c of the variable connecting member 207 via the electrode terminals 203 and 204.

Accordingly, when power is supplied, the body 207a of the variable connecting member 207 formed of electronic or ionic EAP material undergoes electronic polarization (in case of electronic EAP material) or movement or diffusion of ions in case of ionic EAP material) and is bent by way of the multiple wrinkles 207h to move in parallel with the base plate 201, so that the body 207a is located in the opening non-formation area A for captured image as shown in FIG. 6.

Of coarse, if the blade 206 is located in the opening non-formation area A for captured image as the variable connecting member 207 is bent, and resultantly, the opening 202 for captured image is opened, light beams 19 coming from the object P pass through the wide opening 202 for captured image and form a captured image corresponding to the object P on the object image formation member 16, so that the user may easily obtain his/her desired captured image (refer to FIGS. 3 and 6).

Next if the user performs a procedure for bringing the optical lens system 100 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and cuts off power to the variable connecting member 207.

If power is cut off, the body 207a of the variable connecting member 207 formed of electronic or ionic EAP material straightens out and allows the blade 206 connected therewith as a body to be located in the opening formation area B for captured image (in this case, a stopper may be provided around the opening formation area B for captured image to accurately position the blade 206 in the opening formation area B for captured image) (the same is true for the following cases, and thus, no repetitive description is given).

Of course, if the blade 206 is located in the opening for area B for captured image as the variable connecting member 207 straightens out, and thus, the opening 202 for captured image is blocked by the blade 206, light beams 19 coming from the object P pass through the narrow pin hole 209 for magnified image provided in the blade 206 and form a magnified image corresponding to the object P on the object image formation member 16, so that the user may easily obtain his/her desired magnified image (refer to FIGS. 4 and 7).

Here, the pin hole 209 for magnified image has a small diameter, preferably 0.03 mm to 0.3 mm to significantly narrow the width of light beams 19 coming front the object P, as contrasted to the conventional aperture stop. Thus, under a unique environment for implementing a magnified image according to the present invention, light beams 19 coming from the object P pass through the narrow opening of the pin hole 209 for magnified image and then forms a series of converging focuses with a small width h1 and large focal depth (refer to FIG. 4), thereby forming a very clear magnified image. Resultantly, the user of the electronic device has no difficulty in utilizing the optical lens system 100 for camera for magnifying object in contrast to the conventional art.

Here, if the diameter of the pin hole 209 for magnified image is rendered to be smaller than 0.03 mm, power supplied to the light source 30 needs to be increased, causing more power consumption in the electronic device. If the diameter of the pin hole 209 of magnified image is larger than 0.3 mm, light beams may be more likely to diffuse. Accordingly, according to the present invention, the diameter of the pin hole 209 for magnified image preferably remains in a range from 0.03 mm to 0.3 mm.

Meanwhile, according to the present invention, the supply cutoff of power may be flexibly changed when performing the above-described process (i.e., the process of selectively forming a captured image or magnified image).

First, if the user performs a series of computational manipulation procedures (e.g., a procedure for driving camera function-related buttons of the electronic device or icons or software, etc.) to utilize the camera function of the electronic device, the electronic device control module 20 performs the procedure of cutting off power to the variable connecting member 207 (or a procedure for maintaining the power cutoff state).

Accordingly, when supply of power is cut off (or if the power cutoff state is maintained), the body 207a of the variable connecting member 207 formed of electronic or ionic EAP material remains bent by continuously maintaining its own residual stress, allowing the blade 206 connected therewith as a body to be located in the opening non-formation area A as shown in FIG. 6.

Of course, if the blade 206 is located in the opening non-formation area A for captured image as the variable connecting member 207 remains bent, and resultantly, the opening 202 for captured image is opened, light beams 19 coming horn the object P pass through the wide opening 202 for captured image and form a captured image corresponding to the object P on the object image formation member 16, so that the user may easily obtain his/her desired captured image (refer to FIGS. 3 and 6).

Next, if the user performs a procedure for bringing the optical lens system 100 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and supplies power to the electrodes 207b and 207c of the variable connecting member 207 in the electrode terminals 203 and 204.

Accordingly, when power is supplied, the both 207a of the variable connecting member 207 formed of electronic or ionic EAP material undergoes electronic polarization or movement or diffusion of ions and is straightened out by way of the multiple wrinkles 207h to move in parallel with the base plate 201, leaving the blade 206 to be located in the opening formation area B for captured image as shown in FIG. 7.

Of course, if the blade 206 is located in the opening formation area B for captured image as the variable connecting member 207 straightens out, and thus, the opening 202 for captured image is blocked by the blade 206, light beams 19 coming from the object P pass through the narrow pin hole 209 for magnified image provided in the blade 206 and form a magnified image corresponding to the object P on the object image formation member 16, so that the user may easily obtain his/her desired magnified image (refer to FIGS. 4 and 7).

Meanwhile, as shown in FIG. 5, according to the present invention, the switching aperture 200 may further include a cap 210 having an opening 211 corresponding to the opening 202 for captured image at the center thereof and coupled with the base plate 201 as a body. In this case, the opening 211 of the cap 210 may have a size identical or slightly larger than the opening 202 for captured image which functions as an aperture stop for captured image to prevent a deterioration of the functionality of the opening 202 of captured image as an aperture stop for captured image.

Of course, in the case of further including the cap 210, the switching aperture 200 configures a complete unit in which the base plate 201, blade 206, and variable connecting member 207 are combined with the cap 210, benefiting in light of treatment or distribution.

Also under the circumstance where the cap 210 is hither provided, if the blade 206 is located in the opening non-formation area A for captured image as the variable connecting member 207 is bent, and resultantly, the opening 202 for captured image is opened, light beams 19 coming from the object P pass through the wide opening 211 and opening 202 for captured image and form a captured image corresponding to the object P on the object image formation member 16, so that the user may easily obtain his/her desired captured image (refer to FIGS. 3, 5, and 6).

In the circumstance where the cap 210 is further provided, if the blade 206 is located in the opening formation area B for captured image as the variable connecting member 207 straightens out, and thus, an intermediate surface between the opening 211 and the opening 202 for captured image is blocked by the blade 206, light beams 19 coming from the object P pass through the narrow pin hole 209 for magnified image provided in the blade 206 and form a magnified image corresponding to the object P on the object image formation member 16, so that the user may easily obtain his/her desired magnified image (refer to FIGS. 4, 5, and 7).

Meanwhile, as shown in FIG. 5, according to the present invention, a micro-lens 212, which has a positive refractive power to converge light beams 19 coming, from the object P, may be further provided on the pin hole 209 for magnified image provided in the blade 206.

Of course, also under such circumstance where the micro-lens 212 is further provided, if the blade 206 is located in the opening formation area B for captured image as the variable connecting member 207 straightens out, and thus, the opening 202 for captured image is blocked b the blade 206, light beams 19 coming from the object P pass through the micro-lens 212 formed on the pin hole 209 for magnified image and the narrow pin hole 209 for magnified image provided in the blade 206 and form a magnified image corresponding to the object P on the object image formation member 16, so that the user may easily obtain his/her desired magnified image (refer to FIGS. 4, 5, and 7).

Of course, according to another embodiment of the present invention, since the micro-lens 212 having a positive refractive power for conserving light beams 19 coming from the object P is further provided on the pin hole 209 for magnified image, the light beams 19 under another environment for implementing a magnified image pass through the micro-lens 212 and the narrow opening of the pin hole 20 for magnified image and then form a series of converging focuses with a smaller width h2 on the object image formation member 16 (refer to FIG. 4), allowing for formation of a clearer magnified image.

Figure 8:
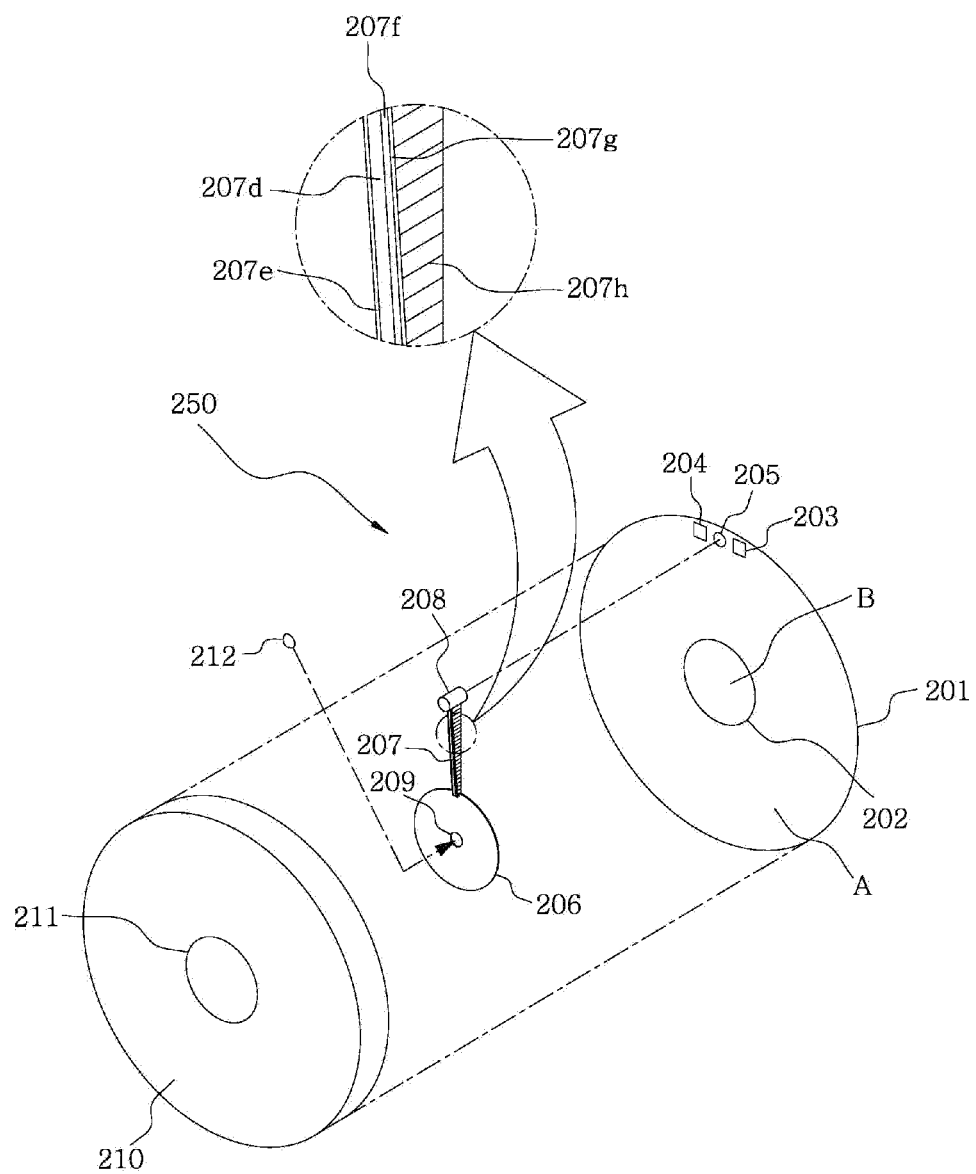
FIGS. 8 to 10 are views conceptually illustrating a detailed structure of a switching aperture and a process of performing functions according to another embodiment of the present invention.

Meanwhile, as shown in FIG. 8, in a switching aperture 250 according to another embodiment of the present invention, the variable connecting member 207 which is bent or straightened depending on the state of supply of power has, e.g., a piezo-electric material.

In such case, the variable connecting member 207 has a configuration in which as piezo-electric material layer 207d, a non-piezo-electric material layer 207f, and electrodes 207e and 207g respectively attached to the piezo-electric material layer 207d and non-piezo-electric material laser 207f and electrically connected with the electrode terminals 203 and 204 are systematically combined. Also in this case, the variable connecting member 207 further includes multiple wrinkles 207h formed in a direction perpendicular to the base plate 20 to induce the blade 206 to move in parallel with the base plate 201.

Now described in detail is a process for selectively forming a captured image or magnified image according to the state of being supplied power by an optical lens system 110 for camera, including the switching aperture 250, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of supplying power to the electrodes 207e and 207g of the variable connecting member 207 via the electrode terminals 203 and 204 (e.g., supply a (+) voltage to the electrode 207e and a (−) voltage to the electrode 207g).

If power is supplied, such polarization occurs where (−) electric charges in the piezo-electric material laser 207d move in an upper direction (direction to electrode 207e) and (+) electric charges in the piezo-electric material layer 207d move in a lower direction (direction to electrode 207g), causing the volume of piezo-electric material layer 207d to expand in upper and lower directions while the non-piezo-electric material layer 207f is not subject to volume expansion. As a result, the variable connecting member 207 is bent (or curved) by way of the multiple wrinkles 207h to move in parallel with the base plate 201 allowing the blade 206 connected therewith as a body to be located in the opening non-formation area A for captured image, as shown in FIG. 9.

Figure 9:
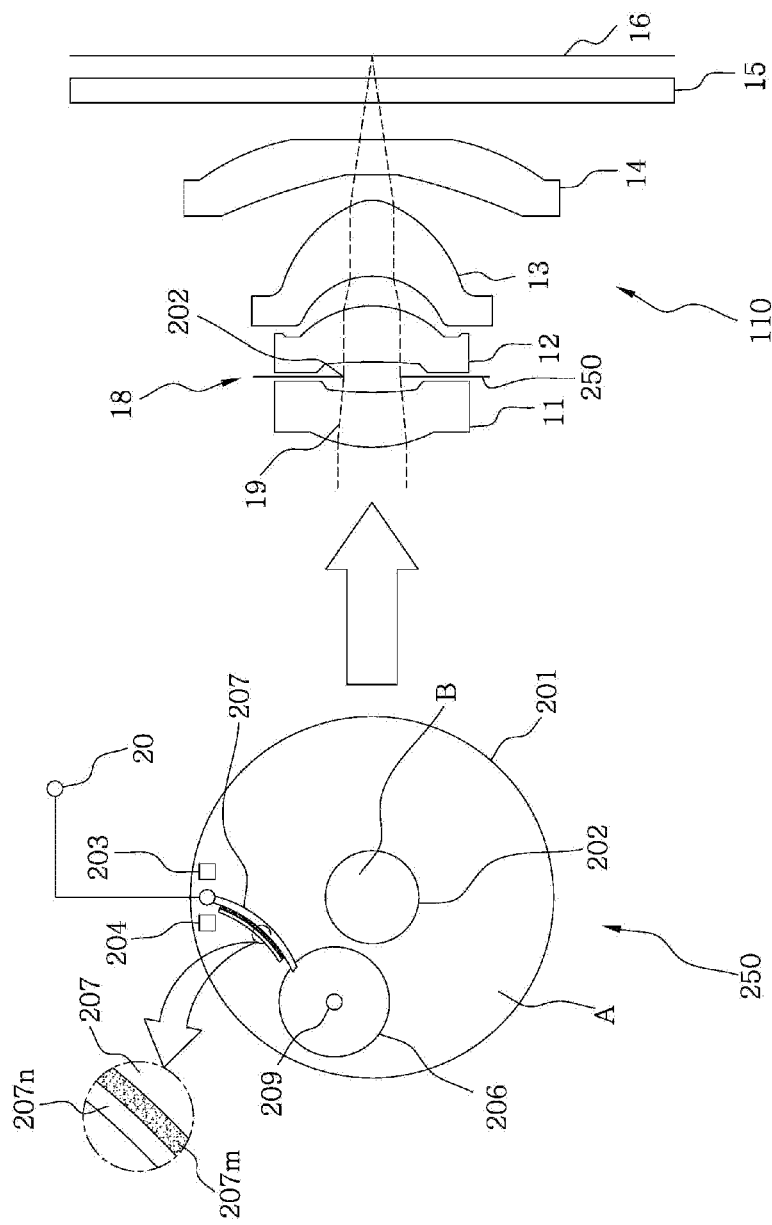

Here, in order to induce the variable connecting member 207 to be smoothly bent even at a lower voltage, a guide electrode 207n having a nonconductor 207m is added which remains coupled and fastened to the base plate 201 (refer to FIG. 9). Under such situation, if a (−) voltage is applied to the guide electrode 207n when the electrode 207e is positive (+), a series of electrostatic forces are generated allowing the electrode 207e and the guide electrode 207n to attract each other. Thus, the variable connecting member 207 may be more smoothly bent.

Of course, if the blade 206 is located in the opening non-formation area A for captured to image as the variable connecting member 207 is bent (curved), and resultantly, the opening 202 for captured image is opened, light beams 19 coming from the object P pass through the wide opening 202 for captured image and form a captured image corresponding to the object P on the object image formation member 16 so that the use may easily obtain his/her desired captured image (refer to FIGS. 3 and 9).

Next, if the user performs a procedure for bringing the optical lens system 100 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and cuts off power to the variable connecting member 207.

Figure 10:
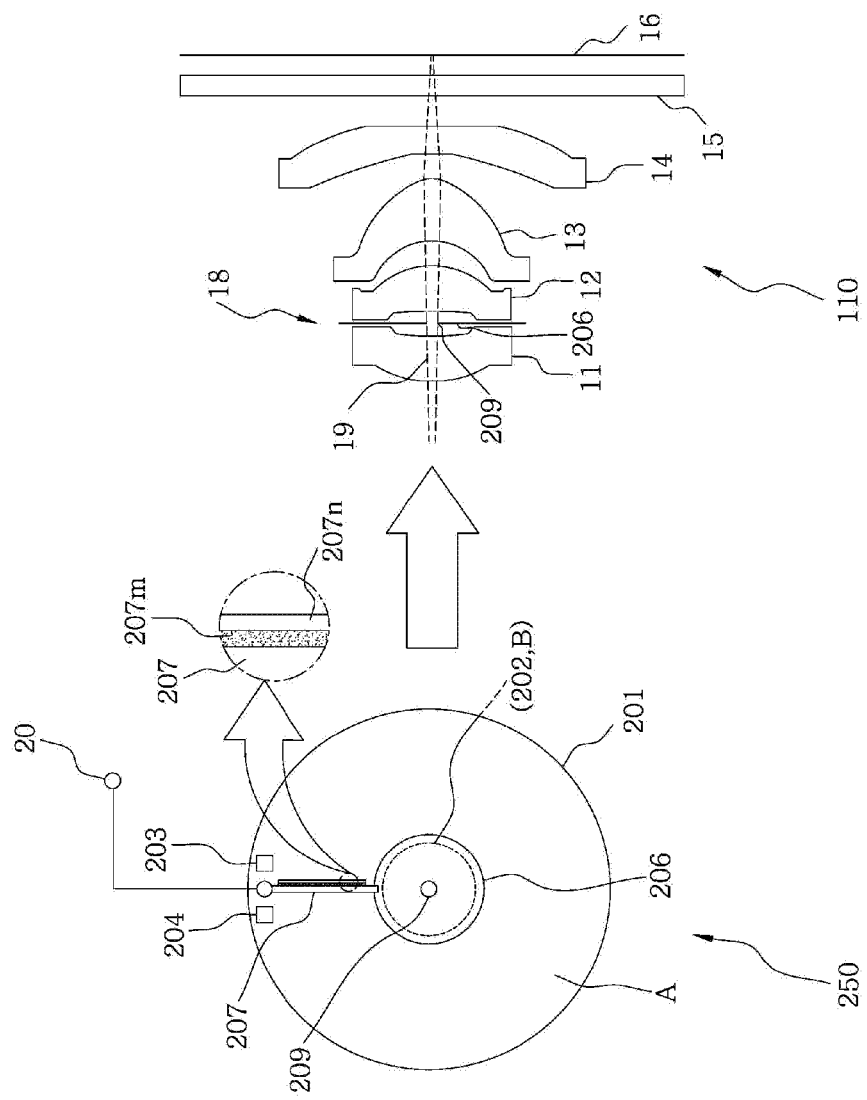

Accordingly, when power is cut off, the variable connecting member 207 formed of piezo-electric material straightens out, allowing the blade 206 connected therewith as a body to be located in the opening formation area B for captured image as shown in FIG. 10.

Of course, if the blade 206 is located in the opening formation area B for captured image as the variable connecting member 207 straightens out and thus, the opening 202 for captured image is blocked by the blade 206 light beams 19 coming from the object P pass through the narrow pin hole 200 for magnified image provided in the blade 206 and form a magnified image corresponding to the object p on the object image formation member 16, so that the user may easily obtain his/her desired magnified image (refer to FIGS. 4 and 10).

Also in this case, the pin hole 209 for magnified image has a small diameter, preferably 0.03 mm to 0.3 mm to significantly narrow the width of light beams 19 coming from the object P, as contrasted to the conventional aperture stop. Thus, under a unique environment for implementing a magnified image according to the present invention, light beams 19 coming from the object P pass through the narrow opening of the pin hole 209 for magnified image and then forms a series of converging focuses with a small width h1 and large focal depth (refer to FIG. 4), thereby forming a very clear image. Resultantly, the user of the electronic device has no difficulty in utilizing the optical lens system 110 for camera for magnifying object in contrast to the conventional art.

Meanwhile, also in the above-described embodiment, the supply/cutoff of power may be flexibly changed when performing the above-described process (i.e., the process of selectively forming a captured image or magnified image).

First, if the user performs a series of computational manipulation procedures (e.g., a procedure for driving camera function-related buttons of the electronic device or icons or software, etc.) to utilize the camera function of the electronic device, the electronic device control module 20 performs the procedure of cutting off power to the variable connecting member 207 (or a procedure for maintaining the power cutoff state) (in this case, the variable connecting member 207 has a previously formed structure in which the piezo-electric material layer 207d and the non-piezo-electric material layer 207f are switched in position.

Accordingly, when supply of power is cut off (or if the power cutoff state is maintained), the variable connecting member 207 formed of piezo-electric material remains bent by continuously maintaining its own residual stress, allowing the blade 20 connected therewith as a body to be located in the opening non-formation area A as shown in FIG. 9.

Of course, if the blade 206 is located in the opening non-formation area A for captured image as the variable connecting member 207 remains bent, and resultantly, the opening 202 for captured image is opened, light beams 19 coming from the object P pass through the wide opening 202 for captured image and form a captured image corresponding to the object P on the object image formation member 16, so that the user may easily obtain his/her desired captured image (refer to FIGS. 3 and 9).

Next, if the user performs a procedure for bringing the optical lens system 110 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and supplies power to the electrodes 207e and 207g of the variable connecting member 207 in the electrode terminals 203 and 204.

Accordingly, when power is supplied the variable connecting member 207 formed of piezo-electric material is straightened out by way of the multiple wrinkles 207h to move in parallel with the base plate 201, so that the blade 206 is located in the opening formation area B for captured image as shown in FIG. 10.

Also here, in order to induce the variable connecting member 207 to smoothly straighten out even at a lower voltage, a guide electrode 207n having a nonconductor 207m is added which remains coupled and fastened to the base plate 201 (refer to FIG. 10). Under such situation, if a (−) voltage is applied to the guide electrode 207n when the electrode 207g is positive (+), a series of electrostatic forces are generated allowing the electrode 207g and the guide electrode 207n to attract each other. Thus, the variable connecting member 207 may straighten out more smoothly.

Meanwhile, as shown in FIG. 8, also in the other embodiment of the present invention, the switching aperture 250 may further include a cap 210 having an opening 211 corresponding to the opening 202 for captured image at the center thereof and coupled with the base plate 201 as a body. Also in this case, the opening 211 of the cap 210 may have a site identical or slightly larger than the opening 202 for captured image which functions as an aperture stop for captured image to prevent a deterioration of the functionality of the opening 202 of captured image as an aperture stop for captured image.

Of course, in the case of further including the cap 210, like in the above case, the switching aperture 250 configures a complete unit in which the base plate 201, blade 206, and variable connecting member 207 are combined with the cap 210, benefiting in light of treatment or distribution.

Also under the circumstance where the cap 210 is further provided, if the blade 206 is located in the opening non-formation area A for captured image as the variable connecting member 207 is bent, and resultantly, the opening 202 for captured image is opened, light beams 19 coming from the object P pass through the wide opening 211 and opening 202 for captured image and form a captured image corresponding to the object P on the object image formation member 16, so that the user may easily obtain his/her desired captured image (refer to FIGS. 3, 8, and 9).

In the circumstance where the cap 210 is further provided, if the blade 206 is located in the opening formation area B for captured image as the variable connecting member 207 straightens out, and thus, an intermediate surface between the opening 211 and the opening 202 for captured image is blocked by the blade 206, light beams 19 coming from the object P pass through the narrow pin hole 209 for magnified image provided in the blade 206 and form a magnified image corresponding to the object P on the object image formation member 16, so that the user may easily obtain his/her desired magnified image (refer to FIGS. 4, 8, and 10).

Meanwhile, as shown in FIG. 8, also in the other embodiment of the present invention, a micro-lens 212, which has a positive refractive power to converge light beams 19 coming from the object P, may be further provided on the pin hole 209 for magnified image provided in the blade 206.

Of course, also under such circumstance where the micro-lens 212 is further provided, if the blade 206 is located in the opening formation area B for captured image as the variable connecting member 207 straightens out, and thus, the opening 202 for captured image is blocked by the blade 206, light beams 19 coming from the object P pass through the micro-lens 212 formed on the pin hole 209 for magnified image and the narrow pin hole 209 for magnified image provided in the blade 206 and form a magnified image corresponding to the object P on the object image formation member 16, so that the user may easily obtain his/her desired magnified image (refer to FIGS. 4, 8, and 10).

Of course, according to another embodiment of the present invention, since the micro-lens 212 having a positive refractive power for converging light beams 19 coming from the object P is further provided on the pin hole 209 for magnified image, the light beams 19 under another environment for implementing a magnified image pass through the micro-lens 212 and the narrow opening of the pin hole 209 for magnified image and then form a series of converging focuses with a smaller width h2 on the object image formation member 16 (refer to FIG. 4), allowing for formation of a clearer magnified image.

Figure 11:
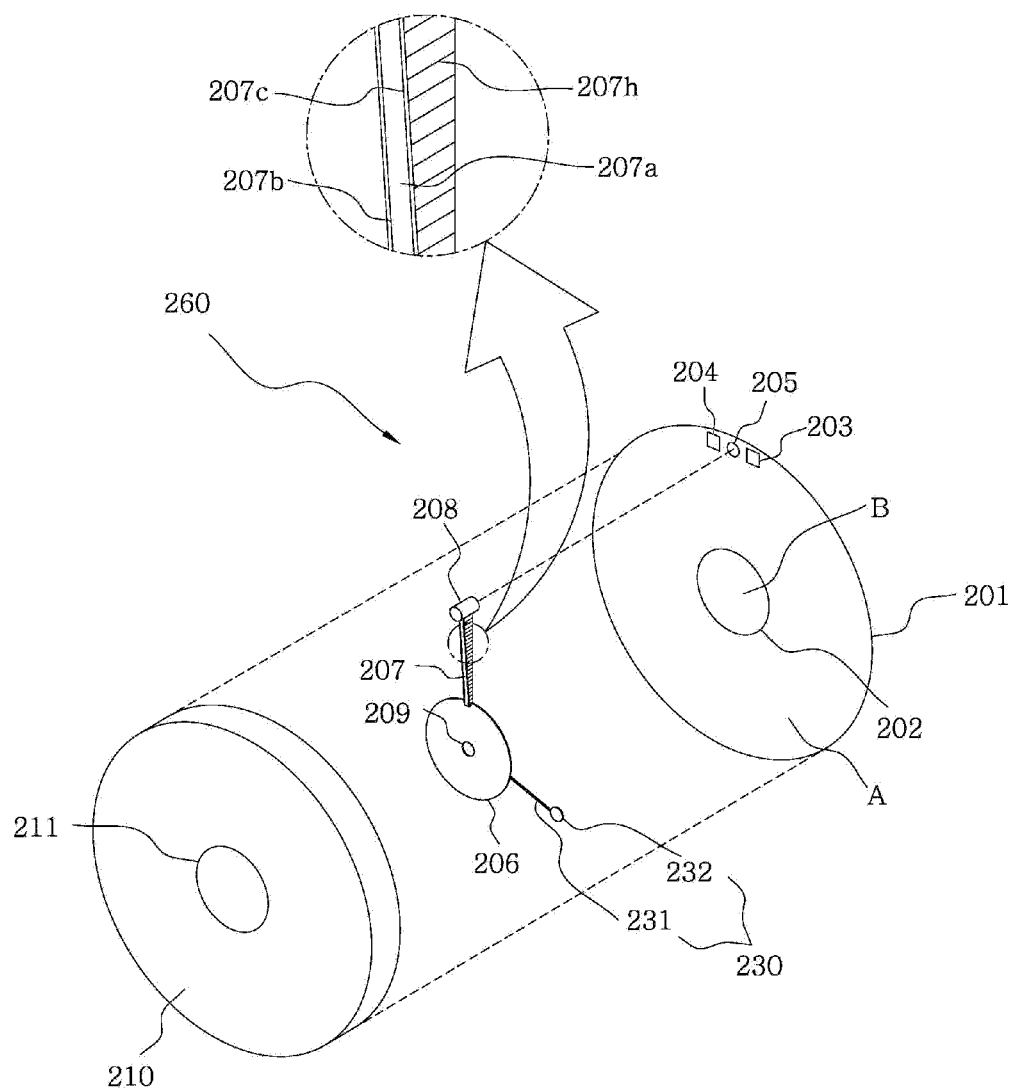
FIGS. 11 to 13 are views conceptually illustrating a detailed structure of a switching aperture and a process of performing functions according to another embodiment of the present invention.
Figure 12:
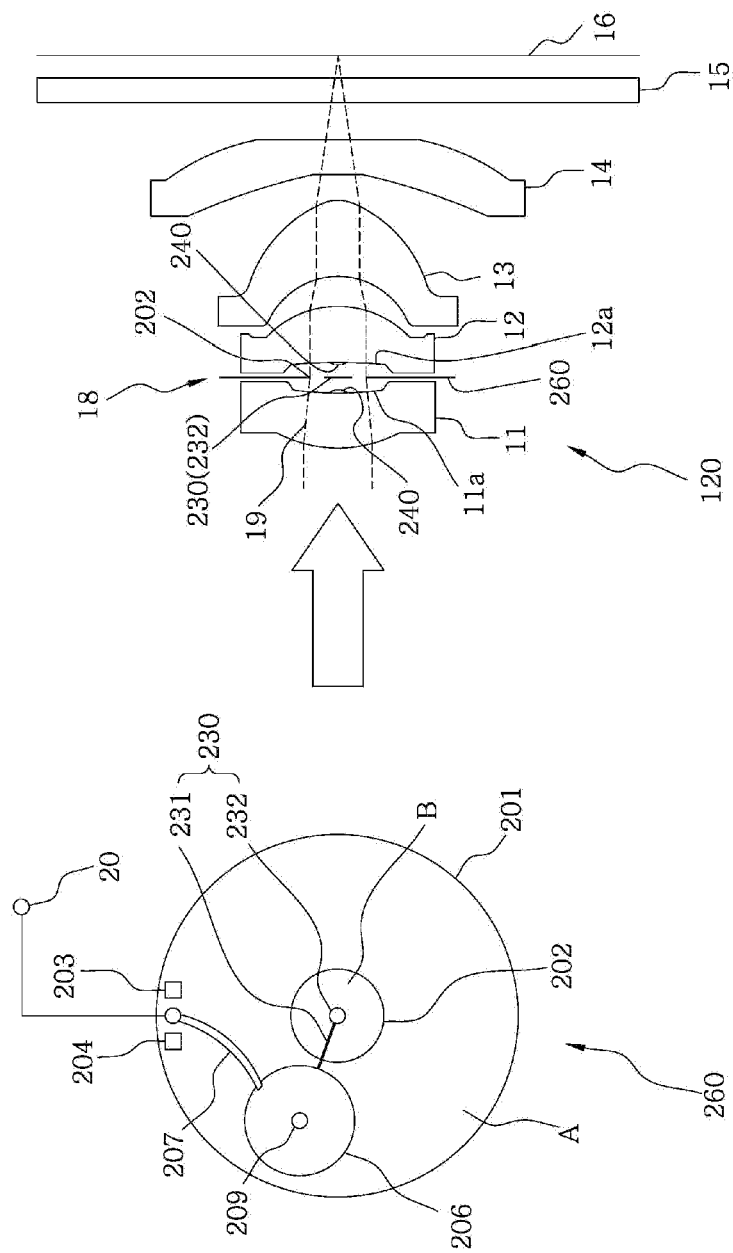
Figure 13:
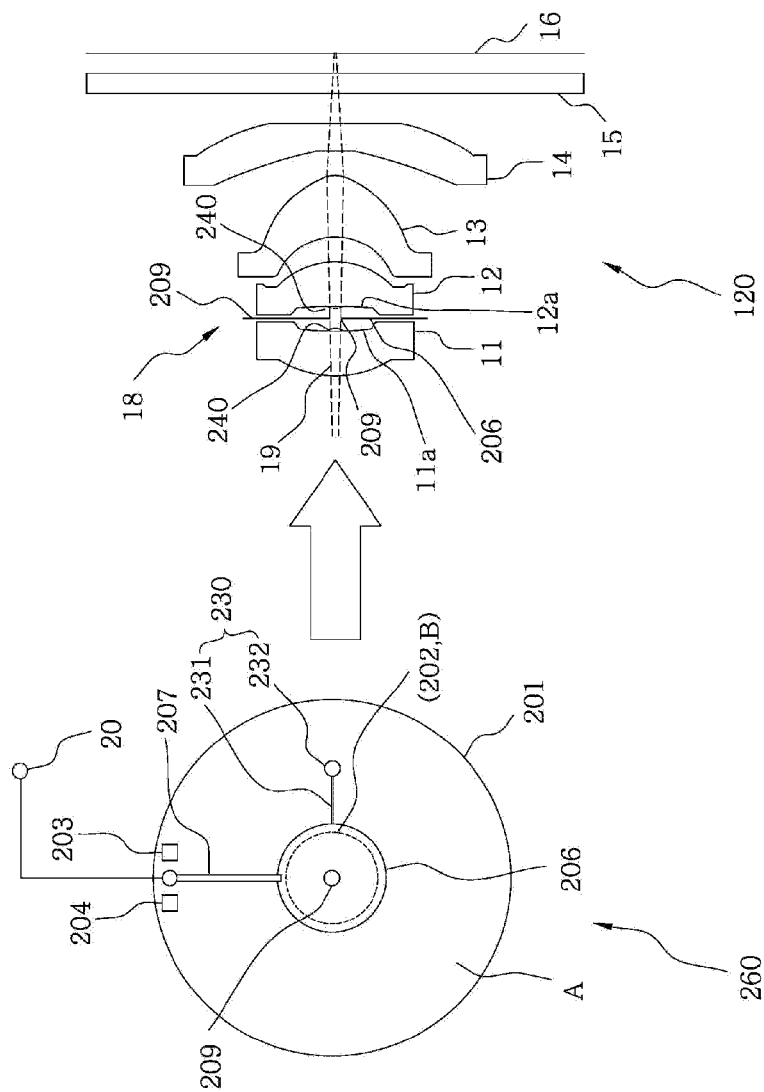

Meanwhile, as shown in FIGS. 11 to 13, according to another embodiment of the present invention, in a switching aperture 260, a micro-lens surface 240 for magnified image may be further provided at centers of optical lens surfaces immediately adjacent to the aperture stop area 18, e.g., a center of an optical lens surface 11a right ahead of the aperture stop area 18, a center of an optical lens surface 12a right behind the aperture stop area 18, or a center of each of the optical lens surface 11a right ahead of the aperture stop area 18 and the optical lens surface 12a right behind the aperture stop area 18, and a blocking member 230 may be further provided at a side of the blade 206 to block the micro-lens surface 240 for magnified image when the blade 206 is located in the opening non-formation area A for captured image, and thus, the opening 202 for captured image is located on a path where the light beams 19 are incident (refer to FIG. 12).

In this case, the center of the optical lens surface 11a further including the micro-lens surface 240 for magnified image or the center of the optical lens surface 12a is rendered to have a larger refractive power than that of the original optical lens surface 11a or 12a before the micro-lens surface 240 for magnified image is formed. The blocking member 230 includes a blocking plate 232 defining a blocking area and a connecting rod 231 connecting the blocking plate 232 with the blade 206 as a body.

Here, the variable connecting member 207 is formed of, e.g., an electro-active polymer (EAP) material. Also in such case, the variable connecting member 207 includes a systematically combined configuration of a body 207a formed of e.g., electronic EAP material or ionic EAP material and electrodes 207b and 207c electrically connected with the electrode terminals 203 and 204 while attached to left and right surfaces, respectively, of the body 207a. Here, the variable connecting member 207 further includes multiple wrinkles 207h for inducing the blade 206 to move in parallel with respect to the base plate 201.

Now described in detail is a process for selectively forming a captured image or magnified image according to the state of being supplied power by an optical lens system 120 for camera, including the switching aperture 260, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of supplying power to the electrodes 207b and 207c of the variable connecting member 207 via the electrode terminals 203 and 204.

Accordingly, when power is supplied, the body 207a of the variable connecting member 207 formed of electronic or ionic EAP material undergoes electronic polarization or movement or diffusion of ions and is bent by way of the multiple wrinkles 207h to move in parallel with the base plate 201, so that the blade 206 is located in the opening non-formation area A for captured image as shown in FIG. 12.

Of course, if the blade 206 is located in the opening non-formation area A for captured image as the variable connecting member 207 is bent, and resultantly, the opening 202 for captured image is opened, light beams 19 coming from the object P pass through the wide opening 202 for captured image and form a captured image corresponding to the object P on the object image formation member 16, so that the user may easily obtain his/her desired captured image (refer to FIG. 12).

In such captured image formation aspect, if the blade 206 is located in the opening non-formation area A of captured image as the variable connecting member 207 is bent, and thus, the opening 202 for captured image is opened, then the blocking plate 232 of the blocking member 230 provided at a side of the blade 206 is naturally located in the opening formation area B for captured image in accordance with the bending of the variable connecting member 207, blocking the micro-lens surface 240 of captured image (refer to FIG. 12).

Of course, in such a blocking aspect of the blocking member 230, the micro-lens surface 240 for magnified image has no negative influence on the formation of captured image, and resultantly, the user of the electronic device may normally obtain his/her desired captured image even when the micro-lens surface 240 for magnified image is further provided.

Next, if the user performs a procedure for bringing the optical lens system 120 (or electronic device) close to the object P and a series of computational manipulation procedures (e.g., procedures for driving buttons, icons or software related to magnifying the object of the electronic device) in order to utilize the object magnifying function, the electronic device control module 20 supplies power to the optical source 30 to turn on the light source 30 and cuts off power to the variable connecting member 207.

Accordingly, when power is cut off, the body 207a of the variable connecting member 207 formed of electronic or ionic EAP material straightens out, allowing the blade 206 connected therewith as a body to be located in the opening formation area B for captured image as shown in FIG. 13.

Of course, if the blade 206 is located in the opening formation area B for captured image as the variable connecting member 207 straightens out, and thus, the opening 202 for captured image is blocked by the blade 206, light beams 19 coming from the object P pass through the micro-lens surface 240 for magnified image and the narrow pin hole 209 for magnified image provided in the blade 206 and form a magnified image corresponding to the object P on the object image formation member 16, so that the user may easily obtain his/her desired magnified image (refer to FIG. 13).

Of course, in such an aspect of forming a magnified image, since the micro-lens surface 240 for magnified image which has a larger refractive power than thin of the original optical lens surface 11a or 12a is further provided at the center of an optical lens surface 11a right ahead of the aperture stop area 18, the center of an optical lens surface 12a right behind the aperture stop area 18, or the center of each of the optical lens surface 11a right ahead of the aperture stop area 18 and the optical lens surface 12a right behind the aperture stop area 18 which is located on the path where the light beams 19 are incident, the light beams 19 coming from the object P under another environment or implementing a magnified image according to the present invention may pass through the micro-lens surface 240 for magnified image and the narrow opening of the pin hole 209 for magnified image and then form a series of converging focuses with a smaller width on the object image formation member 16 (refer to FIG. 13), allowing for formation of a clearer magnified image.

In such magnified image formation aspect, if the blade 206 is located in the opening formation area B of captured image as the variable connecting member 207 straightens out, and thus, the opening 202 for captured image is blocked by the blade 206, the blocking plate 232 of the blocking member 230 provided at a side of the blade 206 is naturally located in the opening non-formation area A for captured image in accordance with the bending of the variable connecting member 207, unblocking the micro-lens surface 240 of magnified image (refer to FIG. 13).

Of course, in such an unblocking aspect, the blocking member 230 has no negative influence on the formation of magnified image by the micro-lens surface 240 for magnified image, and resultantly, the user of the electronic device may normally obtain his/her desired magnified image even when the blocking member 230 is further provided.

Meanwhile, also in another embodiment of the present invention (an aspect of including the micro-lens surface 240 for magnified image and the blocking member 230), the supply/cutoff of power may be flexibly changed when performing the above process (i.e., the process of selectively forming a captured image or magnified image), but its detailed description thereof is omitted for convenience).

Meanwhile, as shown in FIG. 11, also in the other embodiment of the present invention, the switching aperture 260 may further include a cap 210 having an opening 211 corresponding to the opening 202 for captured image at the center thereof and coupled with the base plate 201 as a body. Also in this case, the opening 211 of the cap 210 may have a size identical or slightly larger than the opening 202 for captured image which functions as an aperture stop for captured image to prevent a deterioration of the functionality of the opening 202 of captured image as an aperture stop for captured image.

Of course, also in the case of further including the cap 210 the switching aperture 200 configures a complete unit in which the base plate 201, blade 206, and variable connecting member 207 are combined with the cap 210, benefiting in light of treatment or distribution (for convenience, the process of forming a captured image/magnified image when the cap 210 is further provided is omitted).

Figure 14:
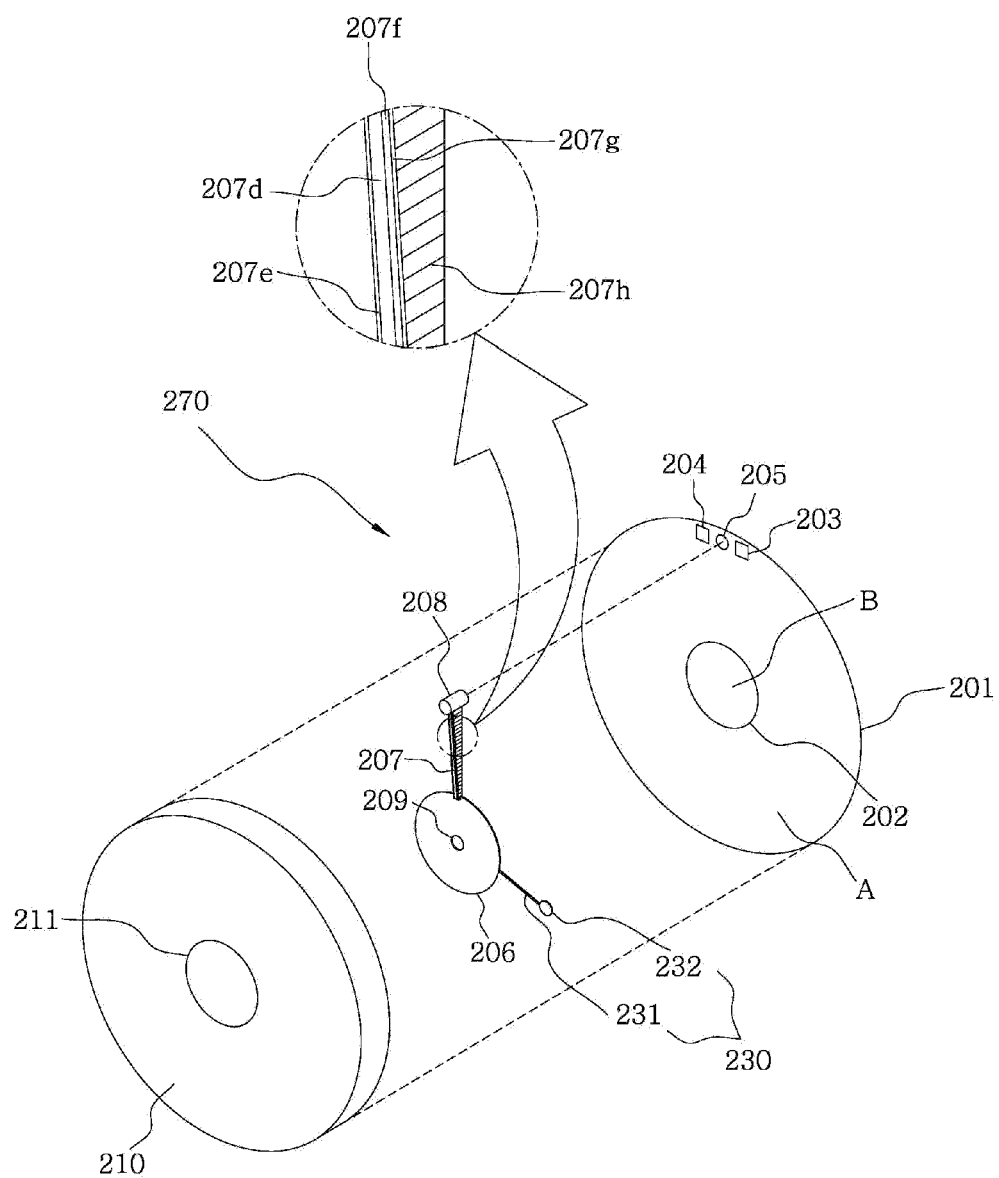
FIGS. 14 to 16 are views conceptually illustrating as detailed structure of a switching aperture and a process of performing functions according to another embodiment of the present invention.
Figure 15:
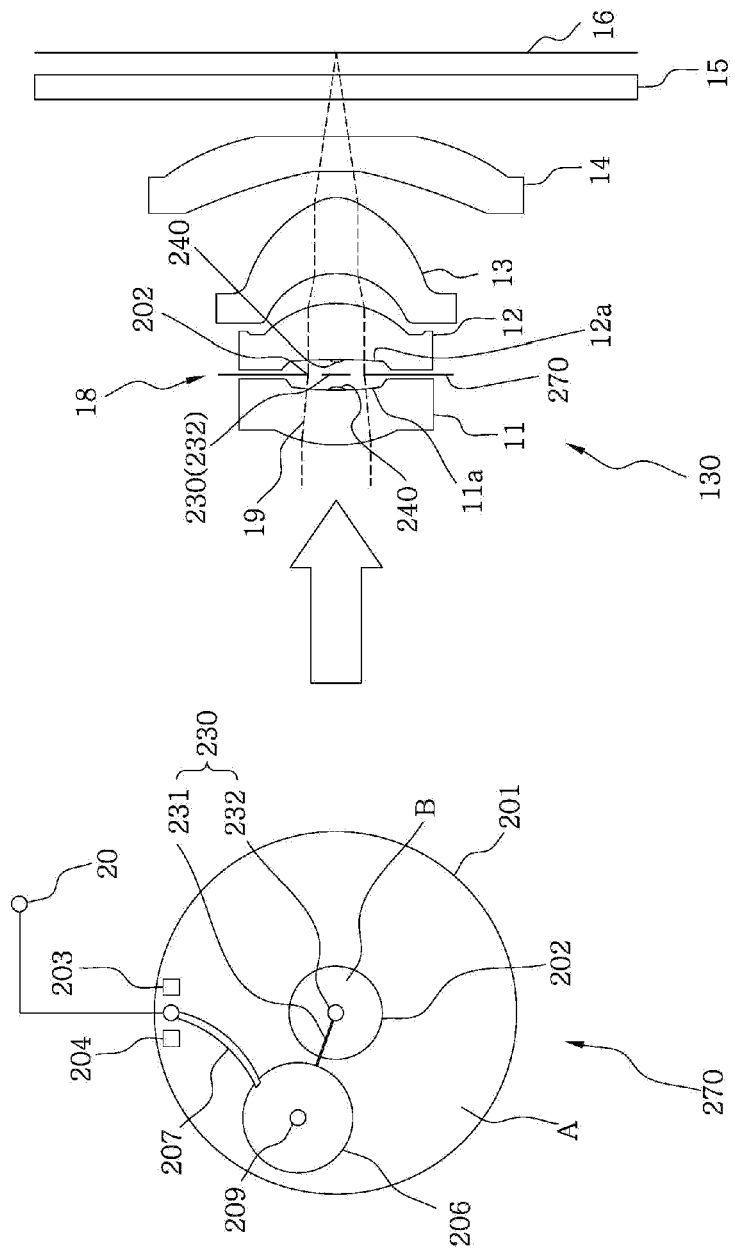
Figure 16:
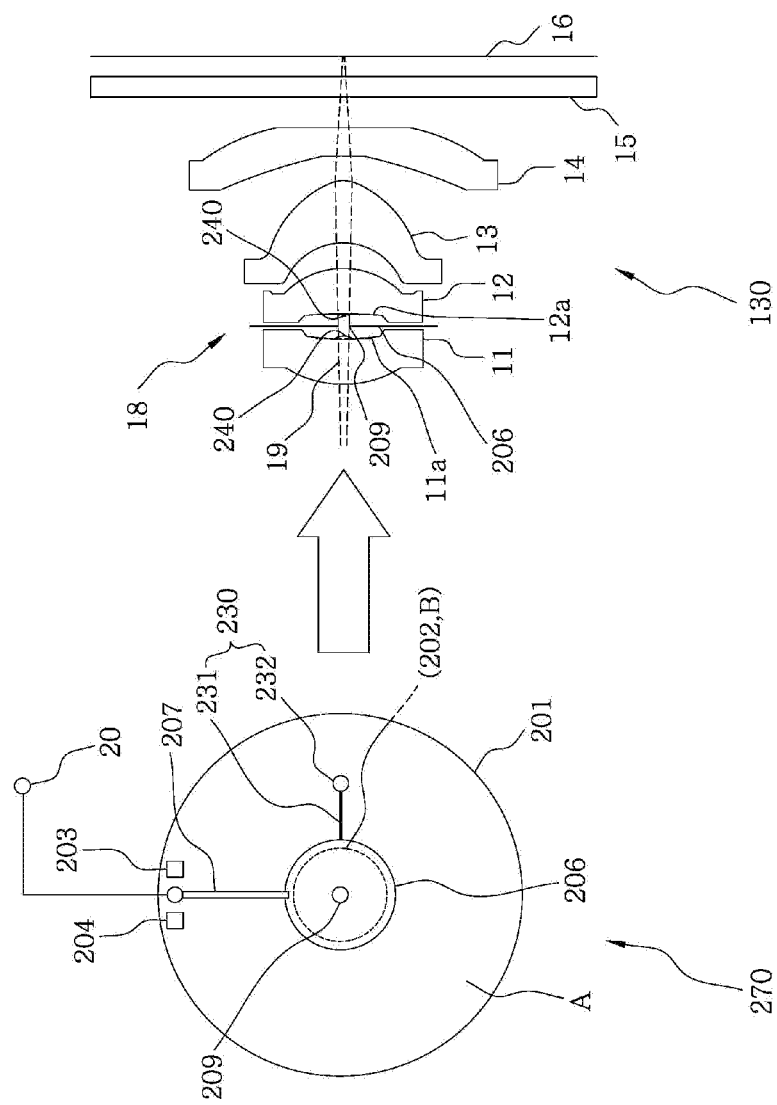

Meanwhile, as shown in FIGS. 14 to 16, according to another embodiment of the present invention, the variable connecting member 207 provided in the switching aperture 270 is formed of e.g., a piezo-electric material. Also in such case, the variable connecting member 207 has a configuration in which at piezo-electric material layer 207d, as non-piezo-electric material layer 207f, and electrodes 207e and 207g respectively attached to the piezoelectric material layer 207d and non-piezo-electric material layer 207f and electrically connected with the electrode terminals 203 and 204 are systematically combined, and also in this case, the variable connecting member 207 further includes multiple wrinkles 207h for inducing the blade 206 to move in parallel with respect to the base plate 201.

Also in the other embodiment of the present invention, in a switching aperture 260, a micro-lens surface 240 for magnified image may be further provided at centers of optical lens surfaces immediately adjacent to the aperture stop area 18, e.g., a center of an optical lens surface 11a right ahead of the aperture stop area 18, a center of an optical lens surface 12a right behind the aperture stop area 18, or a center of each of the optical lens surface 11a right ahead of the aperture stop area 18 and the optical lens surface 12a right behind the aperture stop area 18, and a blocking member 230 may be further provided at a side of the blade 206 to block the micro-lens surface 240 for magnified image when the blade 206 is located in the opening non-formation area A for captured image, and thus, the opening 202 for captured image is located on a path where the light beams 19 are incident (refer to FIG. 15).

Also in this case, the center of the optical lens surface 11a further including the micro-lens surface 240 for magnified image or the center of the optical lens surface 12a is rendered to have a larger refractive power than that of the original optical lens surface 11a or 12a before the micro-lens surface 240 for magnified image is formed. The blocking member 230 includes a blocking plate 232 defining a blocking area and a connecting rod 231 connecting the blocking plate 232 with the blade 206 as a body.

Now described in detail is a process for selectively thrilling a captured image or magnified image according, to the state of being supplied power by an optical lens system 130 for camera, including the switching aperture 270, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of supplying power to the electrodes 207e and 207g of the variable connecting member 207 via the electrode terminals 203 and 204 (e.g., supply a (+) voltage to the electrode 207e and a (−) voltage to the electrode 207g).

If power is supplied, such polarization occurs where electric charges in the piezo-electric material layer 207d mote in an upper direction (direction to electrode 207e) and (+) electric charges in the piezo-electric material layer 207d move in a lower direction (direction to electrode 207g), causing the volume of piezo-electric material layer 207d to expand in upper and lower directions while the non-piezo-electric material layer 207f is not subject to volume expansion. As a result, the variable connecting member 207 is bent (or curved) by way of the multiple wrinkles 207h to move in parallel with the base plate 201 allowing the blade 206 connected therewith as a body to be located in the opening non-formation area A for captured image as shown in FIG. 15 (also in this case, the above-described guide electrode may, of course, be used, and the detailed showing or description thereof is omitted for convenience).

Of course, if the blade 206 is located in the opening non-formation area A for captured image as the variable connecting member 207 is bent (curved), and resultantly, the opening 202 for captured image is opened, light beams 19 coming from the object P pass through the wide opening 202 for captured image and for a captured image corresponding to the object P on the object image formation member 16, so that the user may easily obtain his/her desired captured image (refer to FIG. 15).

In such captured image formation aspect, if the blade 206 is located in the opening non-formation area A of captured image as the variable connecting member 207 is bent, and thus, the opening 202 for captured image is opened, then the blocking plate 232 of the blocking member 230 provided at a side of the blade 206 is naturally located in the opening formation area B for captured image in accordance with the bending of the variable connecting member 207, blocking the micro-lens surface 240 of captured image (refer to FIG. 15).

Of course, in such a blocking aspect of the blocking member 230, the micro-lens surface 240 for magnified image has no negative influence on the formation of captured image, and resultantly, the user of the electronic device may normally obtain his/her desired captured image even when the micro-lens surface 240 for magnified image is further provided.

Next, if the user performs a procedure for bringing the optical lens system 130 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and cuts off power to the variable connecting member 207.

Accordingly, when power is cut off, the variable connecting member 207 formed of piezo-electric material straightens out, allowing the blade 206 connected therewith as a body to be located in the opening formation area B for captured image as shown in FIG. 16.

Of course, if the blade 206 is located in the opening formation area B for captured image as the variable connecting member 207 straightens out and thus, the opening 202 for captured image is blocked by the blade 206, light beams 19 coming from the object P pass through the micro-lens surface 240 for magnified image, and the narrow pin hole 209 for magnified image provided in the blade 206 and form a magnified image corresponding to the object P on the object image formation member 16, so that the user may easily obtain his/her desired magnified image (refer to FIG. 16).

Of course, in such an aspect of forming a magnified image, since the micro-lens surface 240 for magnified image which has a larger refractive power than that of the original optical lens surface 11a or 12a before the micro-lens surface 240 for magnified image is formed is further provided at the center of an optical lens surface 11a right ahead of the aperture stop area 18, the center of an optical lens surface 12a right behind the aperture stop area 18, or the center of each of the optical lens surface 11a right ahead of the aperture stop area 18 and the optical lens surface 12a right behind the aperture stop area 18, which is located on the path where the light beams 19 are incident, the light beams 19 coming from the object P under another environment for implementing a magnified image according to the present invention may pass through the micro-lens surface 240 for magnified image and the narrow opening of the pin hole 209 for magnified image and then form a series of converging focuses with to smaller width on the object image formation member 16 (refer to FIG. 16), allowing for formation of a clearer magnified image.

In such magnified image formation aspect, if the blade 206 is located in the opening formation area B of captured image as the variable connecting member 207 straightens out, and thus, the opening 202 for captured image is blocked by the blade 206, then the blocking plate 232 of the blocking member no provided at a side of the blade 206 is naturally located in the opening non-formation area A for captured image in accordance with the straightening of the variable connecting member 207, unblocking the micro-lens surface 240 of magnified image (refer to FIG. 16).

Of course, in such an unblocking aspect, the blocking member 230 has no negative influence on the formation of magnified image by the micro-lens surface 240 for magnified image, and resultantly, the user of the electronic device may normally obtain his/her desired magnified image even when the blocking member 230 is further provided.

Meanwhile, also in another embodiment of the present invention (an aspect of including the micro-lens surface 240 for magnified image and the blocking member 230), the supply/cutoff of power may be flexibly changed when performing the above process (i.e., the process of selectively forming a captured image or magnified image), but its detailed description thereof is omitted for convenience).

Meanwhile, as shown in FIG. 14, also in the other embodiment of the present invention, the switching aperture 270 may further include a cap 210 having an opening 211 corresponding to the opening 202 for captured image at the center thereof and coupled with the base plate 201 as a body. Also in this case, the opening 211 of the cap 210 may have a size identical or slightly larger than the opening 202 for captured image which functions as an aperture stop for captured image to prevent a deterioration of the functionality of the opening 202 of captured image as an aperture stop for captured image.

Of course, also in the case of further including the cap 210 the switching aperture 270 configures a complete unit in which the base plate 201, blade 206 and variable connecting member 207 are combined with the cap 210, benefiting in light of treatment or distribution (for convenience, the process of forming a captured image/magnified image when the cap 210 is further provided is omitted).

Figure 17:
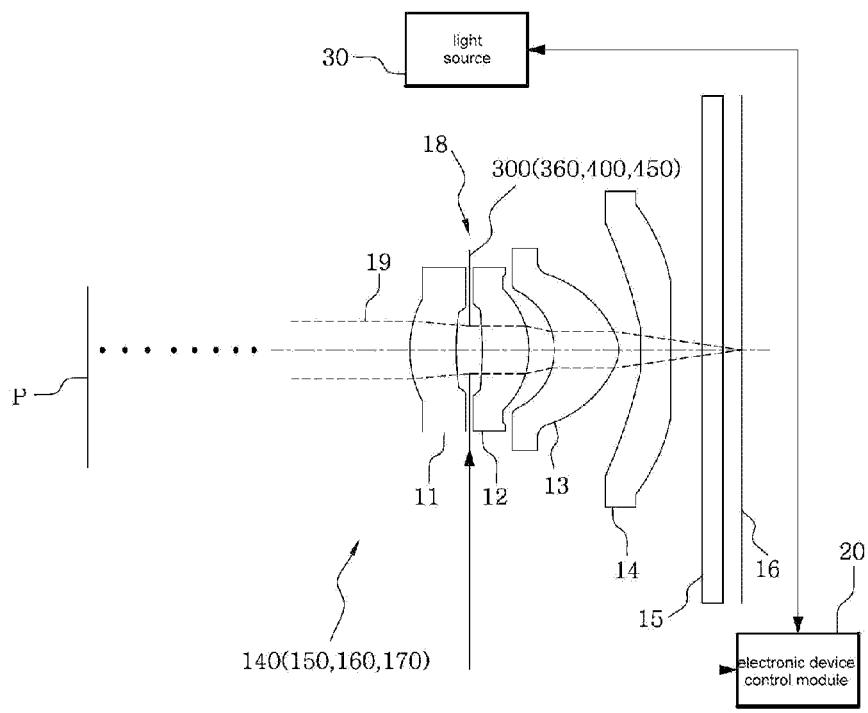
FIGS. 17 and 18 are views conceptually illustrating an optical lens system for a camera according to another embodiment of the present invention.
Figure 18:
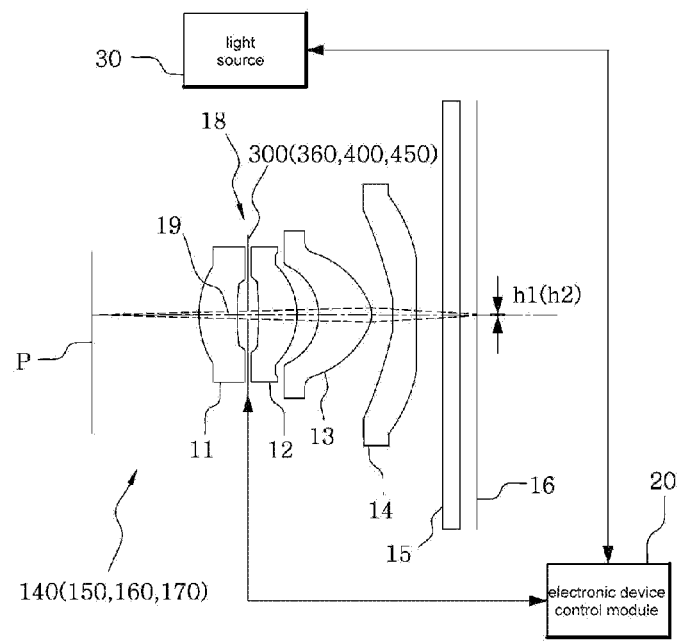

Meanwhile, as shown in FIGS. 17 and 18, also in another embodiment of the present invention, a unique switching aperture 300 according to the present invention may be additionally disposed at a position where the aperture stop area 18 is defined.

Also in this case, according to the other embodiment of the present invention, the switching aperture 300 may perform a series of switching operations of increasing the width of its opening (as shown in FIG. 17) or decreasing the width of the opening (as shown in FIG. 18) according to a power supply state under the control of an electronic device control module 20 to induce the light beams from the object P to widen or narrow, thereby functioning as a guide to selectively form a captured image corresponding to the object P (as shown in FIG. 17) or a magnified image corresponding to the object P (as shown in FIG. 18) on the object image formation member 16.

Also here, in such a phase that the opening of the switching aperture 300 is narrowed so that a magnified image (as shown in FIG. 18) corresponding to the object P is selectively formed on the object image formation member 16, the light source 30 is turned on under the control of the electronic device control module 20, and it may thus function as at guide for supplying a series of light beams to the object P (for reference, as shown in FIG. 17, in case a captured image corresponding to the object P is formed on the object image formation member 16, the light source 30 is turned off under the control of the electronic device control module 20).

Figure 19:
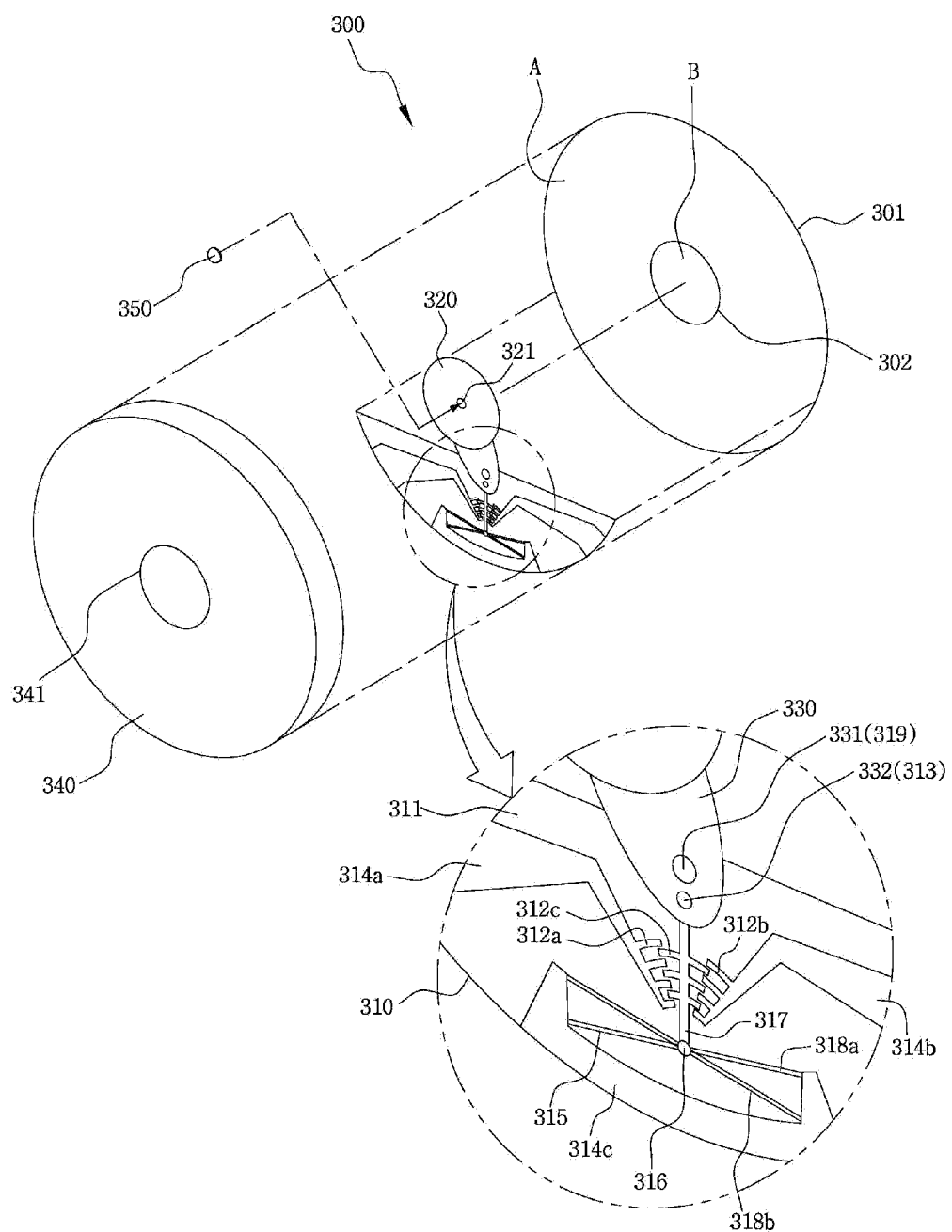
FIGS. 19 to 22 are views conceptually illustrating a detailed structure of a switching aperture and a process of performing functions according to another embodiment of the present invention.

As shown in FIG. 19, the switching aperture 300 according to another embodiment of the present invention includes a systematically combined configuration of a base plate 301 having an opening 302 at a center thereof to function as an opening of an aperture for camera, a blade 320 provided in the base plate 301 and having a pin hole 321 for a magnified image provided at a center thereof to decrease the width of the link beams 19 coming from the object P to thereby adjust the light beams 19 to have an increased focal depth so that a magnified image corresponding to the object P may be formed on the object image formation member 16, a link member 330 connected with the blade 320 as a body, and an actuator 310 connected with the blade 320 as a body by way of the link member 330 to rotate the link member 330 according to a power supply state by the electronic device control module 20 (refer to FIGS. 21 and 22) to position the blade 320 in an opening non-formation area A for captured image or an opening formation area B for captured image to guide the light beams 19 from the object P to pass through the opening 302 for captured image and form a captured image (refer to FIGS. 17 and 21) or to pass through the pin hole 321 for magnified image and form a magnified image (refer to FIGS. 18 and 7).

Here, the unique actuator 310 to rotate the link member 330 according to the state of supplying power, according to the present invention, has the characteristics of, e.g., micro electro mechanical system (MEMS)-type actuator (typically, a MEMS-type actuator is manufactured using such a method as photolithography, micromachining, doping, bonding, or polishing, based on a material, such as silicon, and conductive material.

Figure 20:
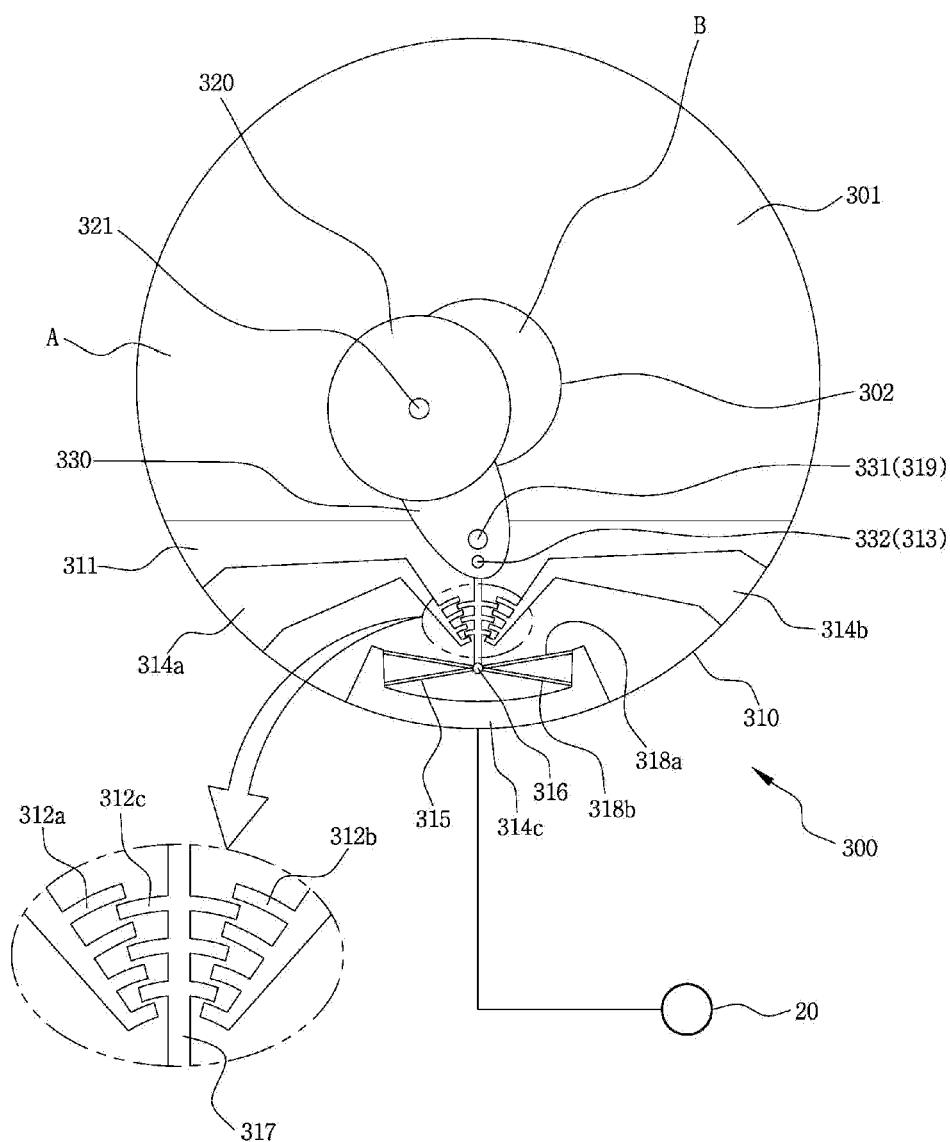

Here, the MEMS-type actuator 310 uses the principle of a comb drive actuator formed on e.g., a silicon plate 311, and as shown in FIGS. 19 and 20, the MEMS-type actuator 310 includes, as its components, electrodes 314a and 314b having ends respectively electrically connected with comb-shape electrodes 312a and 312b, an elastic member 315 electrically connected with another electrode 314c and serving as a X-shaped hinge, a rotating member 317 having comb-shaped electrodes 312c that are movable on a central point 316 where they meet, as a rotational axis (pivot), and a ring 313 formed at an end of the rotating; member 317.

Here, the elastic member 315 and the rotating member 317, and the comb electrodes 312c formed in the rotating member 317 all are formed to be movable without touching the silicon plate 311 (for reference, the number or shape of the comb electrodes may be varied depending on circumstances).

In such circumstance, if a voltage is applied between the two electrodes 314a and 314c of the actuator 310, the comb electrodes 312a and 312c function as a capacitor, and because the voltage is applied thereto, a force acts to attract each other. Accordingly, the rotating member 317 moves towards the comb electrode 312a.

If the electrode 314a is connected with the electrode 314c (ground electrode), and a voltage is applied between the two electrodes 314b and 314c, the electrostatic energy stored between the comb electrodes 312a and 312c functioning as a capacitor dissipates, and at this time the comb electrodes 312c and 312b turn a capacitor so that the rotating member 317 moves towards the comb electrode 312b.

If the rotating member 317 moves, a series of elastic force acts on X-shaped elastic member 315 to get it back to the original position. Accordingly, without application of voltage, the rotating member 317 is brought back to its original position by the elasticity of the X-shaped elastic member 315.

According to context, the displacement of the comb drive actuator 310 might not be large enough to switch the link member 330 according to the present invention into one for captured image/magnified image. In such case, according to the present invention, a rotational shaft 319 of the link member 330 is formed on the silicon plate 311 to induce the link member 330 for blade 320) to be rotated at a desired angle by a small displacement of the ring 313 formed at the end of the rotating member 317.

Here, the link member 330 further includes a rotational central shaft coupling member 331 coupled to the rotational shaft 319 to allow the blade 320 to freely rotate around the rotational shaft 319 provided in the actuator 310. The link member 330 further includes a rotational hole 332 for rotating the blade 320 with respect to the rotational shaft 319 corresponding to when the rotating member 317 is rotated while inserted into the ring 313 provided in the rotating member 317.

Now described in detail is a process for selectively forming a captured image or magnified image according to the state of being supplied power by an optical lens system 140 for camera, including the switching aperture 300, according to another embodiment of the present invention.

First, if no power is supplied as normal as shown in FIG. 20, the blade 320 is positioned about in half in the opening non-formation area A for captured image while covering about a half of the opening 302 for captured image.

At this time, if the user performs a series of computational manipulation procedures (e.g., a procedure for driving camera function-related buttons of the electronic device or icons or software, etc.) to utilize the camera function of the electronic device, the electronic device control module 20 performs the procedure of applying a voltage between the two electrodes 314b and 314c of the actuator 310.

Accordingly, if the voltage is applied between the two electrodes 314b and 314c of the actuator 310, the comb electrodes 312b and 312c become a capacitor, and as a result, a force acts to attract each other. Thus, the rotating member 317 moves to the comb electrode 312b to move the rotational hole 332 of the link member 330 to the right, and the link member 330 thus rotates to the left with respect to the rotational shaft 319, resulting in the blade 320 connected therewith as a body being located in the opening non-formation area A for captured image as shown in FIG. 21.

Figure 21:
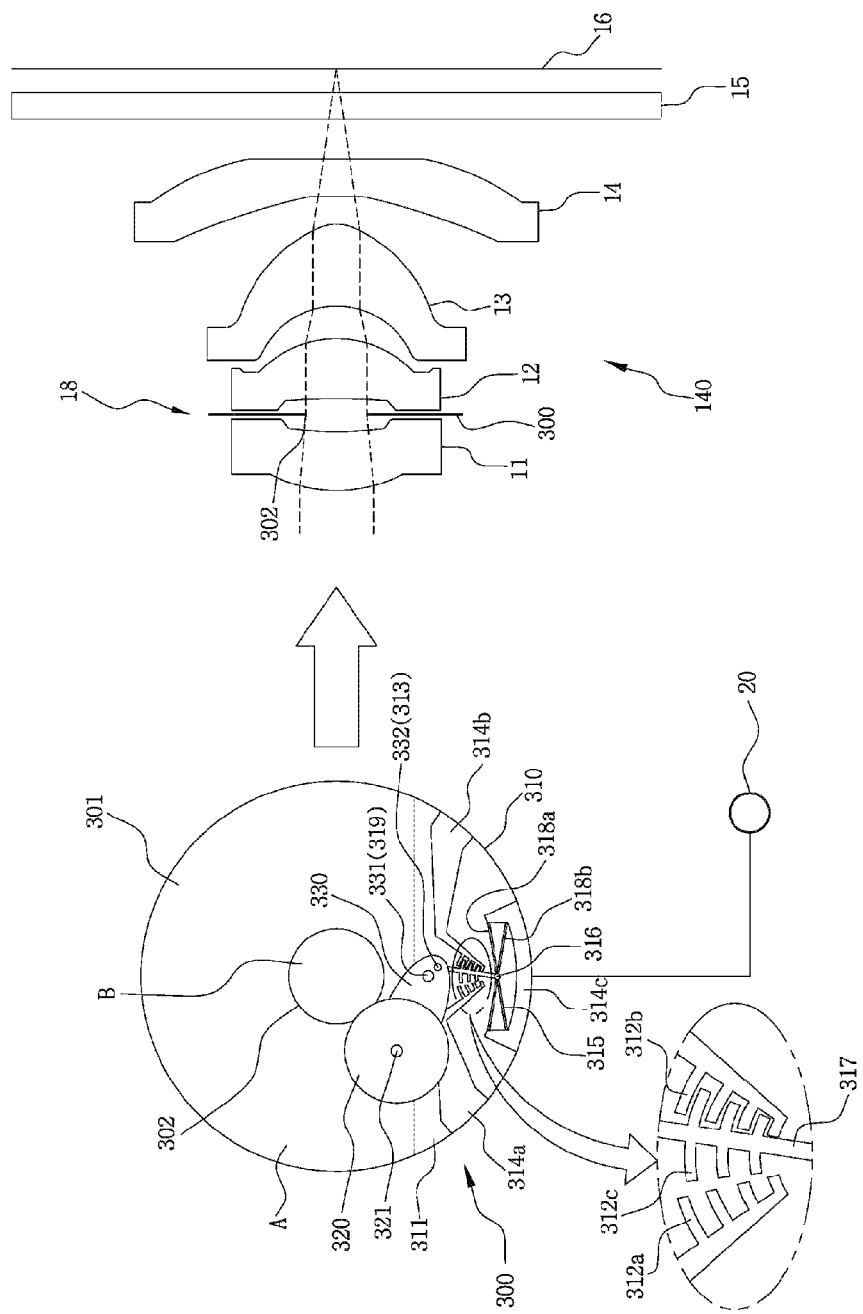

Of course, if the blade 320 is located in the opening non-formation area A for captured image by the rotation of the link member 330 by the actuator 310, and resultantly, the opening 302 for captured image is opened, light beams 19 coming from the object P pass through the wide opening 302 for captured image and form a captured image corresponding to the object P on the object image formation member 16, so that the user may easily obtain his/her desired captured image (refer to FIGS. 17 and 21).

Next, if the user performs a procedure for bringing the optical lens system 140 (or electronic device) close to the object P and a series of computational manipulation procedures (e.g., procedures for driving buttons, icons, at software related to magnifying the object of the electronic device) in order to utilize the object magnifying function, the electronic device control module 20 supplies power to the optical source 30 to turn on the light source 30 and applies voltage between the two electrodes 314a and 314c of the actuator 310.

Accordingly, if the voltage is applied between the two electrodes 314a and 314c of the actuator 310, the comb electrodes 312a and 312c become a capacitor, and as a result, a force acts to attract each other. Thus, the rotating member 317 moves to the comb electrode 312a to move the rotational hole 332 of the link member 330 to the left, and the link member 330 thus rotates to the right with respect to the rotational shaft 319, resulting in the blade 320 connected therewith as a body being located in the opening formation area B for captured image as shown in FIG. 22.

Figure 22:
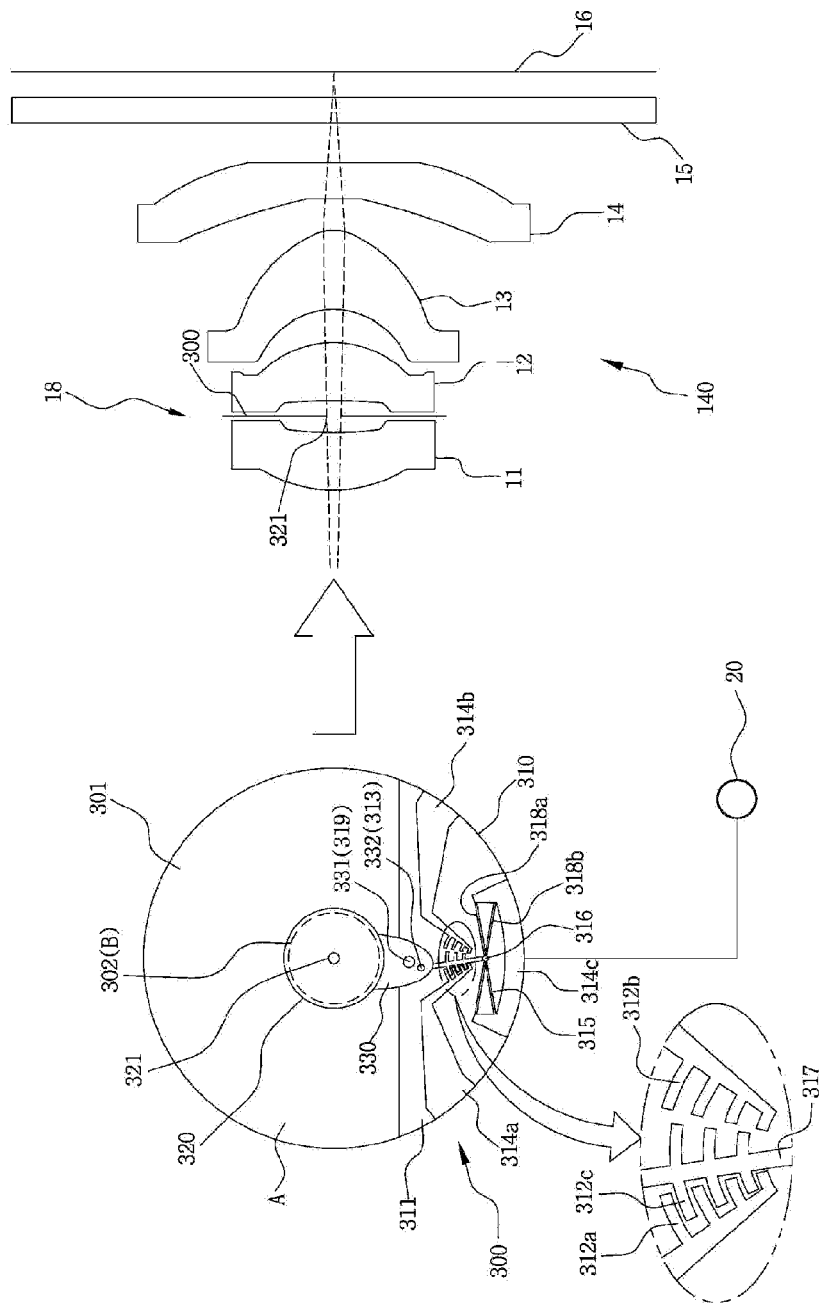

Of course, if the blade 320 is located in the opening formation area B for captured image by the rotation of the link member 330 by the actuator 310 and thus, the opening 302 for captured image is blocked by the blade 320, light beams 19 coming from the object P pass through the narrow pin hole 321 for magnified image provided in the blade 320 and form a magnified image corresponding to the object P on the object image formation member 16, so that the user may easily obtain his/her desired magnified image (refer to FIGS. 18 and 22).

Also in this case, the pin hole 321 for magnified image has a small diameter, preferably 0.03 mm to 0.3 mm to significantly narrow the width of light beams 19 coming from the object P, as contrasted to the conventional aperture stop. Thus, under a unique environment for 110 implementing a magnified image according to the present invention, light beams 19 coming from the object P pass through the narrow opening of the pin hole 321 for magnified image and then forms a series of converging focuses with a small width h1 and large focal depth (refer to FIG. 18), thereby forming a very clear magnified image. Resultantly, the user of the electronic device has no difficulty in utilizing the optical lens system 140 for camera for magnifying object in contrast to the conventional art.

Also here, if the diameter of the pin hole 321 for magnified image is rendered to be smaller than 0.03 mm, power supplied to the light source 30 needs to be increased, causing more power consumption in the electronic device. If the diameter of the pin hole 321 of magnified image is larger than 0.3 mm, light beams may be more likely to diffuse. Accordingly, according to the present invention, the diameter of the pin hole 321 for magnified image preferably remains in a range from 0.03 mm to 0.3 mm.

Meanwhile, as shown in FIG. 19, according to the present invention, the switching aperture 300 may further include a cap 340 having an opening 341 corresponding to the opening 302 for captured image at the center thereof and coupled with the base plate 301 as a body. In this case, the opening 341 of the cap 340 may have a size identical or slightly larger than the opening 302 for captured image which functions as an aperture stop for captured image to prevent a deterioration of the functionality of the opening 302 of captured image as an aperture stop for captured image.

Of course, also in the case of further including the cap 340, the switching aperture 300 configures a complete unit in which the base plate 301, blade 320, link member 330, and actuator 310 are combined with the cap 340, benefiting in light of treatment or distribution.

Also under the circumstance where the cap 340 is further provided, if the blade 320 is located in the opening non-formation area A for captured image by the rotation of the link member 330 by the actuator 310, and resultantly, the opening 302 for captured image is opened, light beams 19 coming from the object P pass through the wide opening 341 and opening 302 for captured image and form a captured image corresponding to the object P on the object image formation member 16, so that the user may easily obtain his/her desired captured image (refer to FIGS. 17, 19, and 21).

In the circumstance where the cap 340 is further provided, if the blade 320 is located in the opening formation area B for captured image by the rotation of the link member 330 by the actuator 310, and thus, an intermediate surface between the opening 341 and the opening 302 for captured image is blocked by the blade 320, light beams 19 coming from the object P pass through the narrow pin hole 321 for magnified image provided in the blade 320 and form a magnified image corresponding to the object P on the object image formation member 16, so that the user may easily obtain his/her desired magnified image (refer to FIGS. 18, 19, and 22).

Meanwhile, as shown in FIG. 19, also in the other embodiment of the present invention, a micro-lens 350, which has a positive refractive power to converge light beams 19 coming from the object P, may be further provided on the pin hole 321 for magnified image provided in the blade 320.

Of course, also under such circumstance where the micro-lens 350 is further provided, if the blade 320 is located in the opening formation area B for captured image by the rotation of the link member 330 by the actuator 310, and thus, the opening 302 for captured image is blocked by the blade 320, light beams 19 coming from the object P pass through the micro-lens 350 formed on the pin hole 321 for magnified image and the narrow pin hole 321 for magnified image provided in the blade 320 and form a magnified image corresponding to the object P on the object image formation member 16, so that the user may easily obtain his/her desired magnified image (refer to FIGS. 18, 19, and 22).

Of course, according to another embodiment of the present invention, since the micro-lens 350 having a positive refractive power for converging light beams 19 coming from the object P is further provided on the pin hole 321 for magnified image, the light beams 19 also under another environment for implementing a magnified image pass through the micro-lens 350 and the narrow opening of the pin hole 321 for magnified image and then form a series of converging focuses with a smaller width h2 on the object image formation member 16 (refer to FIG. 18), allowing for formation of a clearer magnified image.

For reference, although the actuator 310 using electrostatic force acting between comb capacitors has been primarily described in connection with the above embodiments, the actuator 310 according to the present invention is not limited thereto, and the actuator 310 according to the present invention may be replaced with other various actuators, such as stepper micro motor actuator, MEMS magnetic actuator, EAP actuator, or piezo-electric material actuator, depending on circumstances. Further, technology for turning the rotational movement of actuator into linear movement to linearly move the blade 320 to the opening non-formation area A for captured image or opening formation area B for captured image may belong to the scope of the present invention (this is why linear movement may also be regarded as rotational movement with a significantly large radius).

Figure 23:
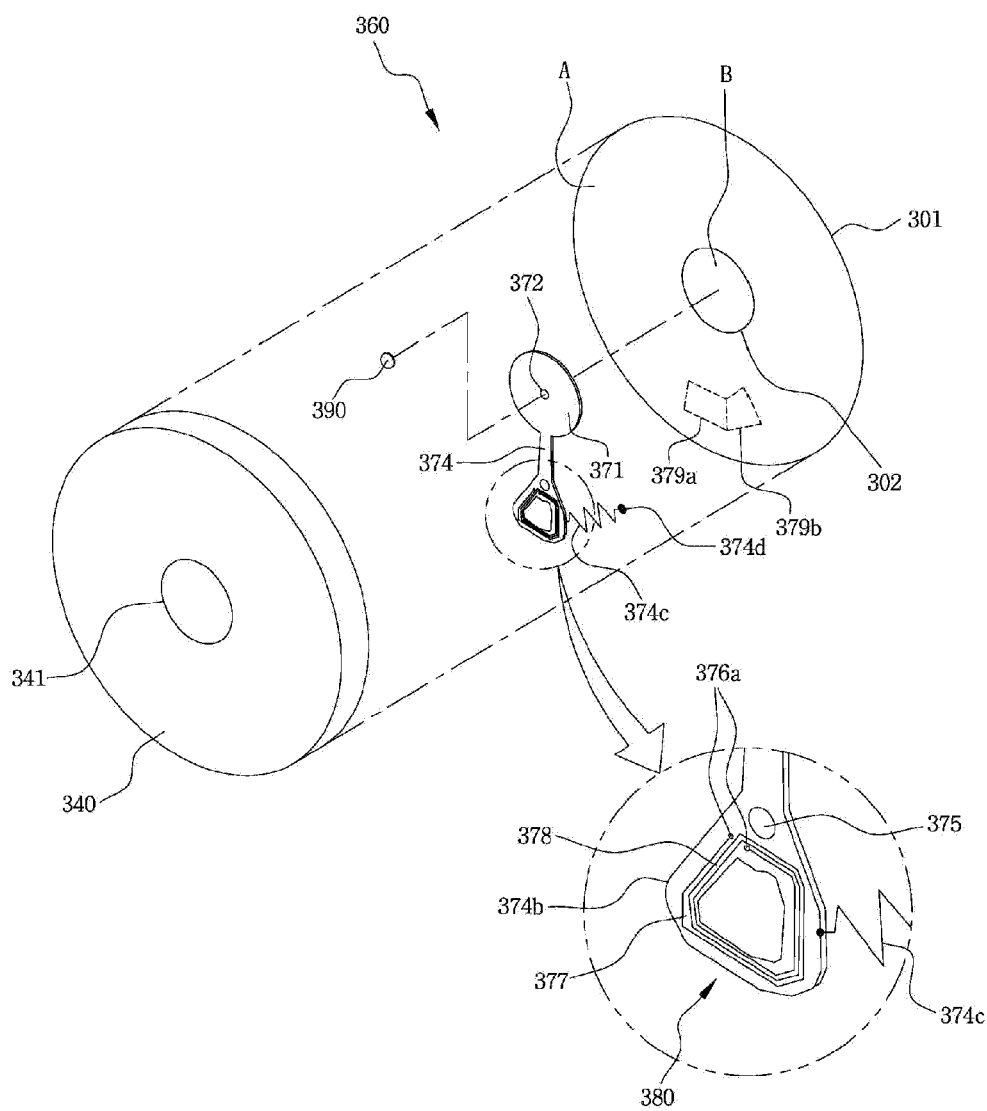
FIGS. 23 to 25 are views conceptually illustrating a detailed structure of a switching aperture and a process of performing functions according to another embodiment of the present invention.
Figure 24:
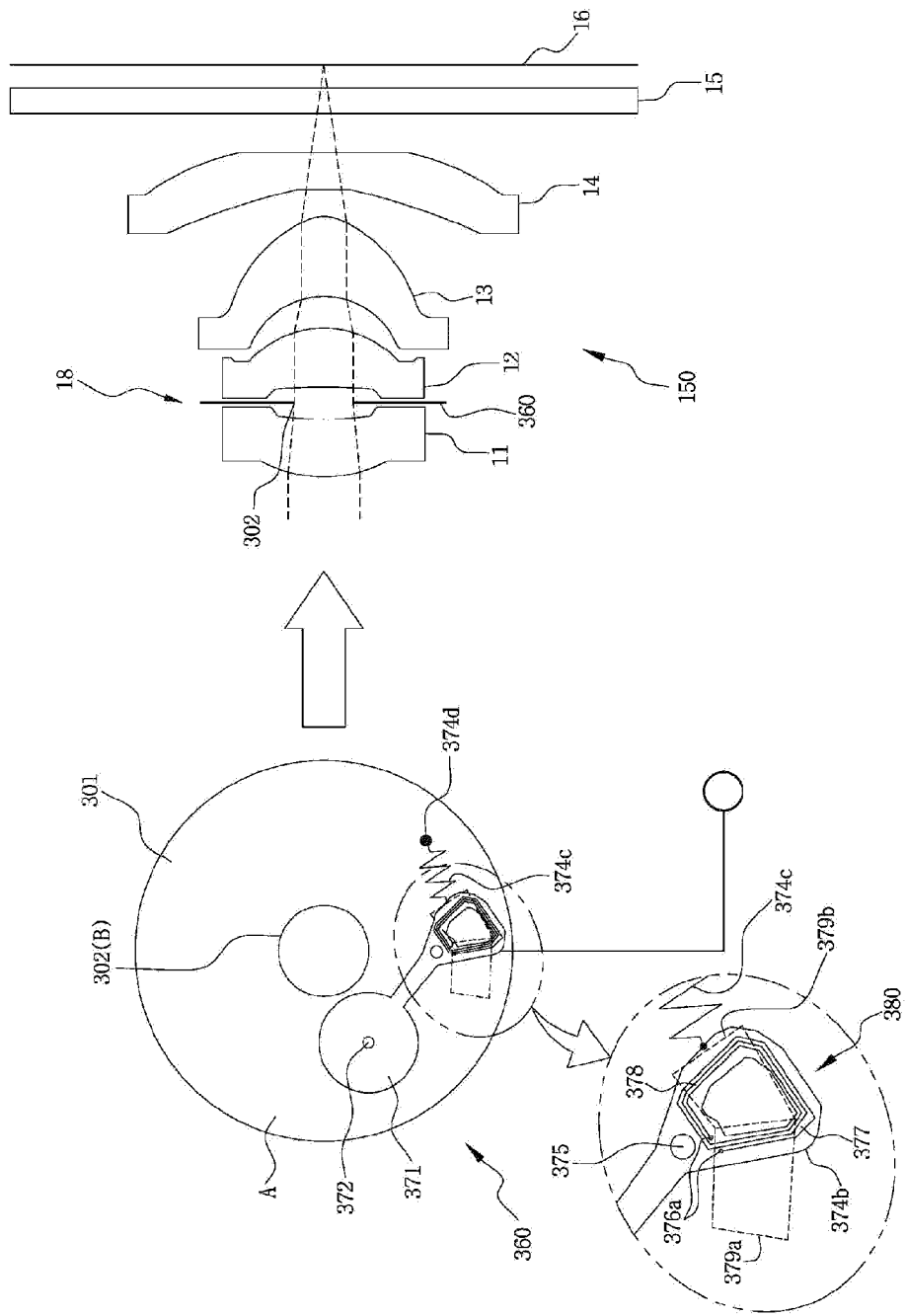
Figure 25:
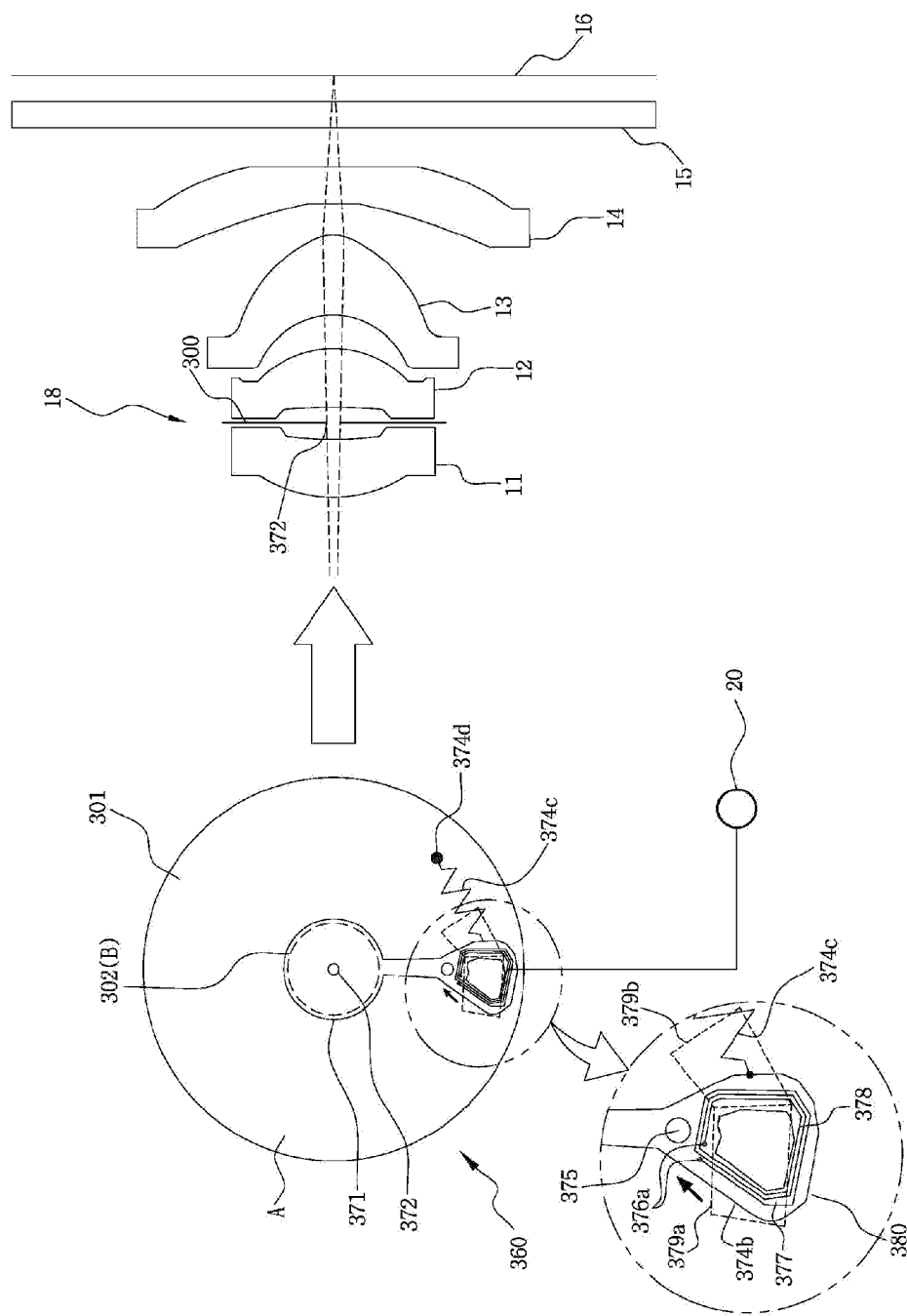

Meanwhile, as shown in FIG. 23, also in the other embodiment of the present invention, the switching aperture 360 includes a systematically combined configuration of a base plate 301 having an opening 302 at a center thereof to function as an opening of an aperture for camera, a blade 371 provided in the base plate 301 and having a pin hole 372 for a magnified image provided at a center thereof to decrease the width of the light beams 19 coming from the object P to thereby adjust the light beams 19 to have an increased focal depth so that a magnified image corresponding to the object P may be formed on the object image formation member 16, a link member 374 connected with the blade 371 as a body, and an actuator 380 connected with the blade 371 as a body by way of the link member 374 to rotate the link member 374 according to a power supply state by the electronic device control module 20 (refer to FIGS. 24 and 25) to position the blade 371 in an opening non-formation area A for captured image or an opening formation area B for captured image to guide the light beams 19 from the object P to pass though the opening 302 for captured image and form a captured image (refer to FIGS. 17 and 24) or to pass through the pin hole 372 for magnified image and form a magnified image (refer to FIGS. 18 and 25).

Here, the unique actuator 380 rotating the link member 374 according to the present invention has the characteristics of, e.g., a voice coil motor (VCM)-type actuator.

Here, the VCM-type actuator 380 has a systematically combined configuration of a U-shaped bobbin 374b, a flexible printed circuit board (FPCB) 377 formed on the bobbin 374b and having a planar coil 378 and an electrode 376a, a spring 374c connected with the bobbin 371b as a body, and a spring support 374d installed on the base plate 301 while connected with the spring 374c to fasten the spring 374c to the base plate 301.

In this case, a magnet (not shown) with the N pole located in a magnetic field formation area 379a and the S pole located in a magnetic field formation area 379b is disposed at an upper part of the bobbin 374b, and a magnet (not shown) with the N pole located in the magnetic field formation area 379b and the S pole, located in the magnetic field formation area 379a is disposed at a lower part of the bobbin 374b (in such arrangement of the magnets, a magnetic field is generated in the magnetic field formation area 379a in an up-to-down direction, and a magnetic field is generated in the magnetic field formation area 379b in a down-to-up direction.

At this time, in case the bobbin 374b of the actuator 380 shows a left-right moving pattern, a pivot shaft 375 is further provided to rotate the blade 371 corresponding to the same.

Now described in detail is a process for selectively forming a captured image or magnified image according to the state of being supplied power by an optical lens system 150 for camera, including the switching aperture 360, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of cutting off current (power) supplied to the actuator 380 (or a procedure for maintaining the current cutoff state).

Accordingly, if current is cut off (or the current cutoff state is maintained), the bobbin 374b of the actuator 380 is inclined to the right (or maintains the state of being inclined to the right) by an elastic force exerted by the spring 374c in a direction of attraction, and thus, the link member 374 is rotated to the left on the pivot shaft 375 (or maintain the state rotated to the left), allowing the blade 371 connected therewith as a body to be located in the opening non-formation area A for captured image, as shown in FIG. 24.

Of course, if the blade 371 is located in the opening non-formation area A for captured image by the rotation of the link member 374 by the actuator 380, and resultantly, the opening 302 for captured image is opened, light beams 19 coming from the object P pass through the wide opening 302 for captured image and form a captured image corresponding to the object P on the object image formation member 16, so that the user may easily obtain his/her desired captured image (refer to FIGS. 17 and 24).

Next, if the user performs a procedure for bringing the optical lens system 150 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and applies a current (power), which flows in a down-to-up direction (the direction denoted in arrow) along the bobbin 374b, to the bobbin 374b of the actuator 380 corresponding to the magnetic field formation area 379a and applies a current (power), which flows in an up-to-down direction along the bobbin 374b, to the bobbin 374b of the actuator 380 corresponding to the magnetic field formation area 379b, as shown in FIG. 25.

Accordingly, if the current (power) flowing in the down-to-up direction and current (power) flowing in the up-to-down direction along the bobbin 374b, respectively, are applied to the bobbin 374b of the actuator 380 corresponding to the magnetic field formation area 379a and the bobbin 374b of the actuator 380 corresponding to the magnetic field formation area 379b, the magnetic field in an up-to-down vertical direction and the magnetic field in a down-to-up vertical direction, respectively, are formed in the magnetic field formation area 379a and the magnetic field formation area 379b, and by their influence (i.e., by Fleming's left hand rule), a strong force in the left direction is exerted to the bobbin 374b of the actuator 380 corresponding to each magnetic field formation area 379a or 379b, and accordingly, the bobbin 374b of the actuator 380 is moved to the left against the elastic force exerted by the spring 374c in the direction of attraction resulting in the link member 374 rotating to the right on the pivot shaft 375 and allowing the blade 371 connected therewith as a body to be located in the opening formation area B for captured image as shown in FIG. 25.

Of course, if the blade 371 is located in the opening formation area B for captured image by the rotation of the link member 374 by the actuator 380, and thus, the opening 302 for captured image is blocked by the blade 371, light beams 19 coming from the object P pass through the narrow pin hole 372 for magnified image provided in the blade 371 and form a magnified image corresponding to the object P on the object image formation member 16, so that the user may easily obtain his/her desired magnified image (refer to FIGS. 18 and 25).

Also in this case, the pin hole 372 for magnified image has a small diameter, preferably 0.03 mm to 0.3 mm to significantly narrow the width of light beams 19 coming from the object P, as contrasted to the conventional aperture stop. Thus, under a unique environment for implementing as magnified image according to the present invention, light beams 19 coming from the object P pass through the narrow opening of the pin hole 372 for magnified image and then forms a series of converging focuses with a small width h1 and large focal depth (refer to FIG. 18), thereby forming a very clear magnified image. Resultantly, the user of the electronic device has no difficulty in utilizing the optical lens system 50 for camera for magnifying object in contrast to the conventional art.

Meanwhile, as shown in FIG. 23, according to the present invention, the switching aperture 360 may further include a cap 340 having an opening 341 corresponding to the opening 302 for captured image at the center thereof and coupled with the base plate 301 as a body. Also in this case, the opening 341 of the cap 340 may have a size identical or slightly larger than the opening 302 for captured image which functions as an aperture stop for captured image to prevent a deterioration of the functionality of the opening 302 of captured image as an aperture stop for captured image.

Of course, also in the case of further including the cap 340, the switching aperture 360 configures a complete unit in which the base plate 301, blade 371, link member 374, and actuator 310 are combined with the cap 340, benefiting in light of treatment or distribution.

Also under the circumstance where the cap 340 is further provided, if the blade 371 is located in the opening non-formation area A for captured image by the rotation of the link member 374 by the actuator 380, and resultantly, the opening 302 for captured image is opened, light beams 19 coming from the object P pass through the wide opening 341 and opening 302 for captured image and form a captured image corresponding to the object P on the object image formation member 16, so that the user may easily obtain his/her desired captured image (refer to FIGS. 17, 23, and 24).

In the circumstance where the cap 340 is further provided, if the blade 371 is located in the opening formation area B for captured image by the rotation of the link member 374 by the actuator 380, and thus, an intermediate surface between the opening 341 and the opening 302 for captured image is blocked by the blade 371, light beams 19 coming from the object P pass through the narrow pin hole 372 for magnified image provided in the blade 371 and form a magnified image corresponding to the object P on the object image formation member 16, so that the user may easily obtain his/her desired magnified image (refer to FIGS. 18, 23, and 25).

Meanwhile, as shown in FIG. 23, also in the other embodiment of the present invention, a micro-lens 390, which has a positive refractive power to converge light beams 19 coming from the object P, may be further provided on the pin hole 372 for magnified image provided in the blade 371.

Of course, also under such circumstance where the micro-lens 390 is further provided, if the blade 371 is located in the opening formation area B for captured image by the rotation of the link member 374 by the actuator 380, and thus, the opening 302 for captured image is blocked by the blade 371, light beams 19 coming from the object P pass through the micro-lens 390 formed on the pin hole 372 for magnified image and the narrow pin hole 372 for magnified image provided in the blade 371 and form a magnified image corresponding to the object P on the object image formation member 16, so that the user may easily obtain his/her desired magnified image (refer to FIGS. 18, 23, and 25).

Of course, according to another embodiment of the present invention, since the micro-lens 390 having a positive refractive power for converging light beams 19 coming from the object P is further provided on the pin hole 372 for magnified image, the light brains 19 also under another environment for implementing a magnified image pass through the micro-lens 390 and the narrow opening of the pin hole 372 for magnified image and then form a series of converging focuses with a smaller width h2 on the object image formation member 16 (refer to FIG. 18), allowing for formation of a clearer magnified image.

For reference, the magnetic fields for actuating the link member described in the above embodiment may be generated in various ways. For example, according to the present invention, only one bar magnet is located above or below the bobbin 374b in the actuator 380, and the magnetic fields for actuating the link member may be generated using the bar magnet. As another example, according to the present invention, an external autofocusing magnet may be provided in the actuator 380, and the magnetic fields for actuating the link member may be generated using the external autofocusing magnet.

Figure 26:
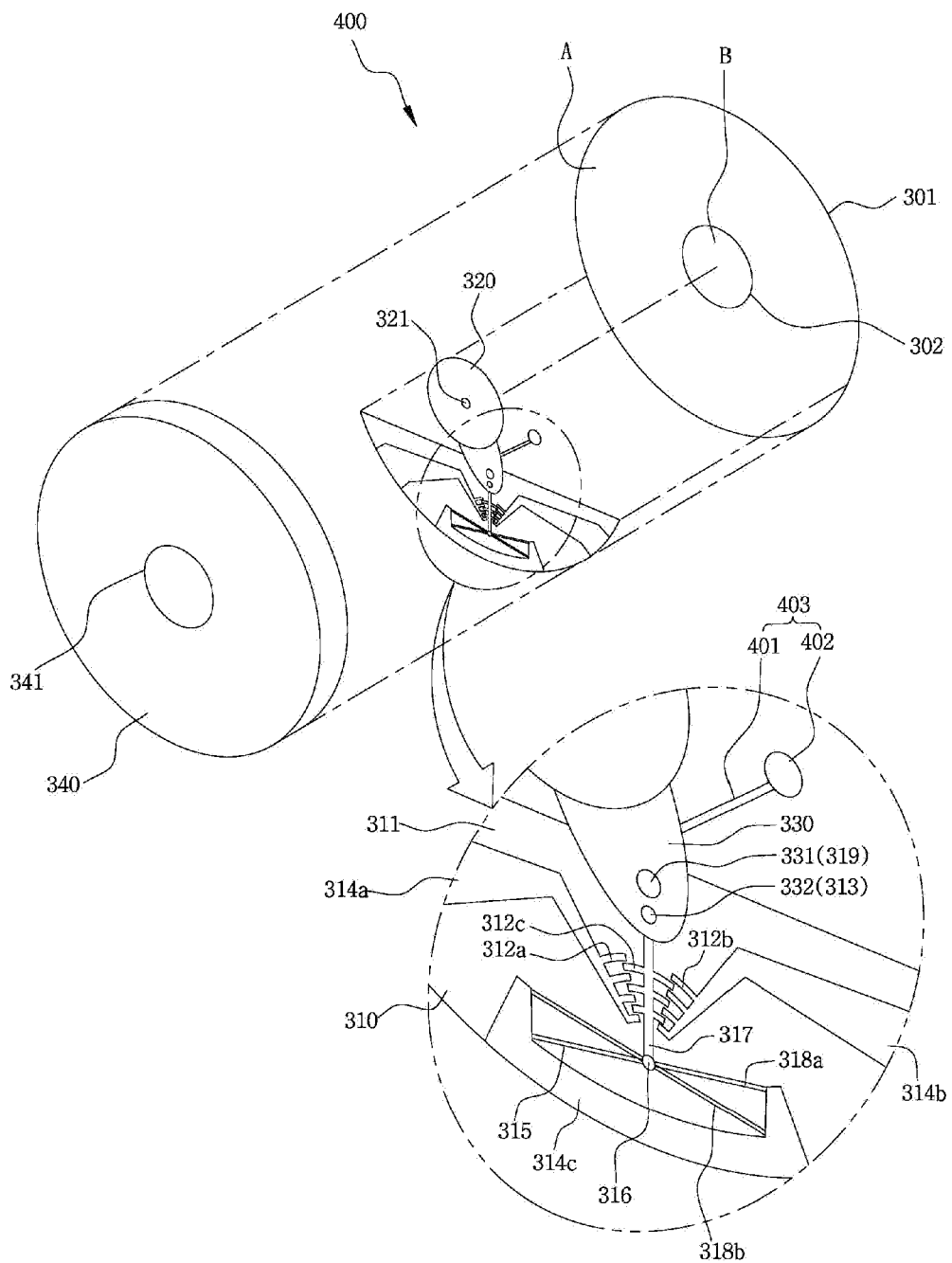
FIGS. 26 to 29 are views conceptually illustrating as detailed structure of a switching aperture and a process of performing functions according to another embodiment of the present invention.
Figure 27:
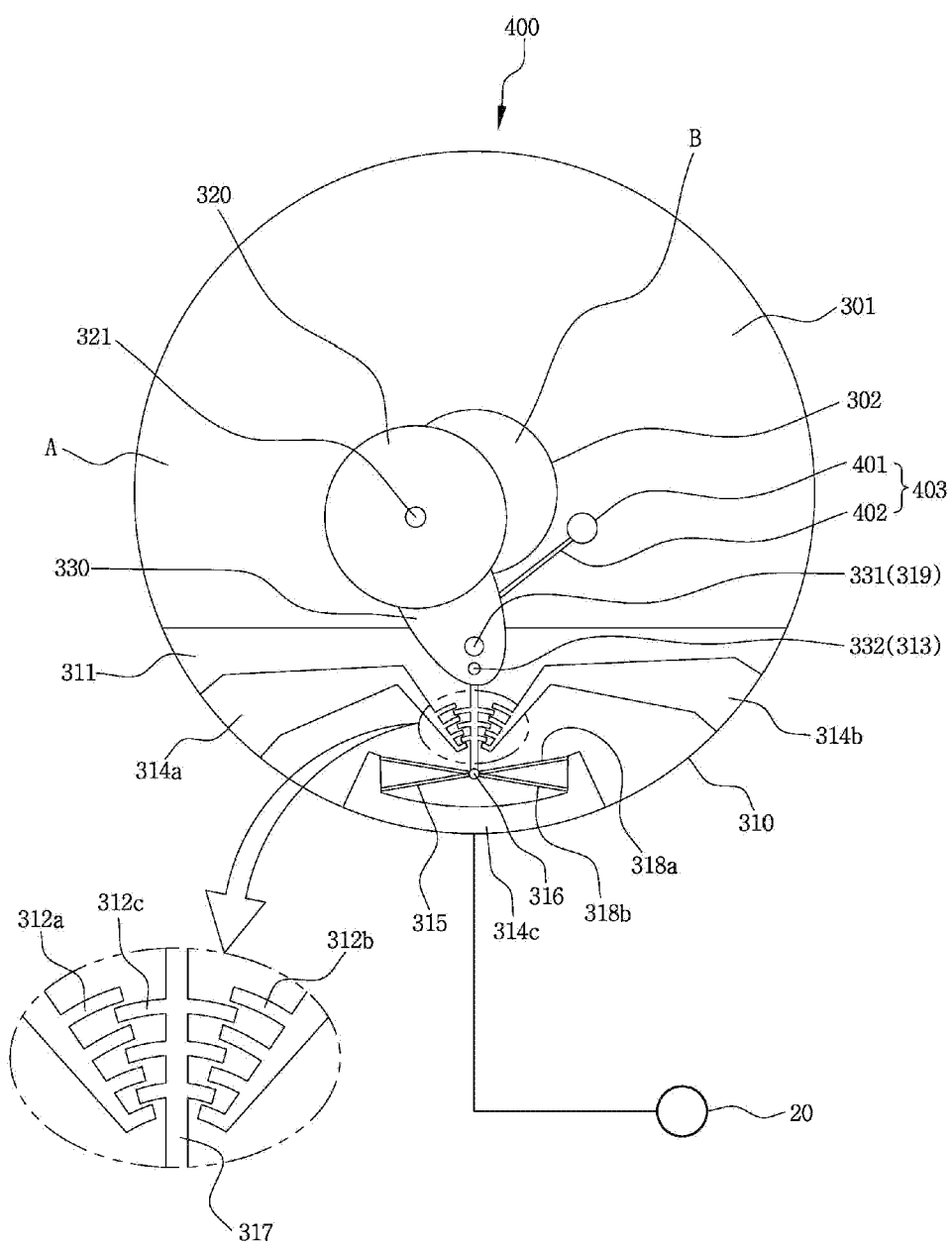
Figure 28:
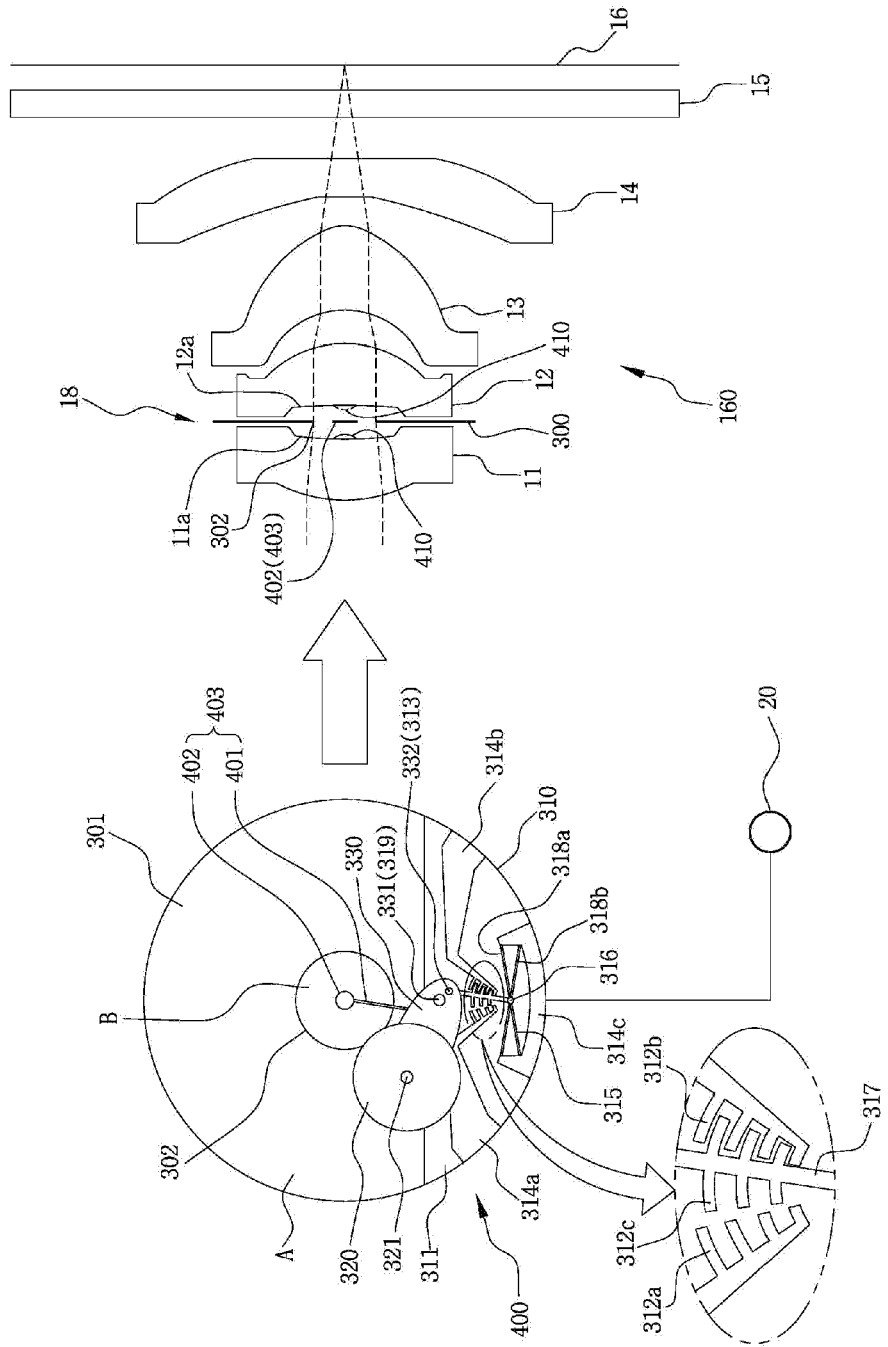

Meanwhile, as shown in FIGS. 26 to 29, according to another embodiment of the present invention, in a switching aperture 400, a micro-lens surface 410 for magnified image may be further provided at centers of optical lens surfaces immediately adjacent to the aperture stop area 18, e.g., a center of an optical lens surface 11a right ahead of the aperture stop area 18, a center of an optical lens surface 12a right behind the aperture stop area 18, or a center of each of the optical lens surface 11a right ahead of the aperture stop area 18 and the optical lens surface 12a right behind the aperture stop area 18 (refer to FIGS. 28 and 29), and a blocking member 403 may be further provided at a side of the link member 330 to block the micro-lens surface 410 for magnified image when the blade 320 is located in the opening non-formation area A for captured image, and thus, the opening 302 for captured image is located on a path where the light beams 19 are incident (refer to FIG. 28).

In this case, the center of the optical lens surface 11a further including the micro-lens surface 410 for magnified image or the center of the optical lens surface 12a is rendered to have a larger refractive power than that of the original optical lens surface 11a or 12a before the micro-lens surface 410 for magnified image is formed. The blocking member 403 includes a blocking plate 402 defining a blocking area and a connecting rod 401 connecting the blocking plate 402 with the link member 330 as a body.

Here, the unique actuator 310 rotating the link member 330 according to the present invention has the characteristics of, e.g., a micro electro mechanical system (MEMS)-type actuator, and also in this case, the MEMS-type actuator 310 includes, as its components, electrodes 314a and 314b having ends respectively electrically connected with comb-shape electrodes 312a and 312b, an elastic member 315 electrically connected with another electrode 314c and serving as a X-shaped hinge, a rotating member 317 having comb-shaped electrodes 312c that are movable on a central point 316 where they meet, as a rotational axis (pivot), and a ring 313 formed at an end of the rotating member 317.

Now described in detail is a process for selectively forming a captured image or magnified image according to the state of being supplied power by an optical lens system 160 for camera, including the switching aperture 400, according to another embodiment of the present invention.

First, if no power is supplied as normal as shown in FIG. 27, the blade 320 is positioned about in half in the opening non-formation area A for captured image while covering about a half of the opening 302 for captured image.

At this time, if the user performs a series of computational manipulation procedures (e.g., a procedure for driving camera function-related buttons of the electronic device or icons or software, etc.) to utilize the camera function of the electronic device, the electronic device control module 20 performs the procedure of applying a voltage between the two electrodes 314b and 314c of the actuator 310.

Accordingly, if the voltage is applied between the two electrodes 314b and 314c of the actuator 310, the comb electrodes 312b and 312c become a capacitor, and as a result, a force acts to attract each other. Thus, the rotating member 317 moves to the comb electrode 312b to move the rotational hole 332 of the link member 330 to the right, and the link member 330 thus rotates to the left with respect to the rotational shaft 319, resulting in the blade 320 connected therewith as a body being located in the opening non-formation area A for captured image as shown in FIG. 28.

Of course, if the blade 320 is located in the opening non-formation area A for captured image by the rotation of the link member 330 by the actuator 310, and resultantly, the opening 302 for captured image is opened, light beams 19 coming from the object P pass through the wide opening 302 for captured image and form a captured image corresponding to the object P on the object image formation member 16, so that the user may easily obtain his/her desired captured image (refer to FIGS. 26 and 28).

In such captured image formation aspect, if the blade 320 is located in the opening non-formation area A of captured image by the rotation of the link member 330 by the actuator 310, and thus, the opening 302 for captured image is opened, then the blocking plate 402 of the blocking member 403 provided at a side of the link member 330 is naturally located in the opening formation area B for captured image in accordance with the rotation of the link member 330, blocking the micro-lens surface 410 of captured image (refer to FIG. 28).

Of course, in such a blocking aspect of the blocking member 403, the micro-lens surface 410 for magnified image has no negative influence on the formation of captured image, and resultantly, the user or the electronic device may normally obtain his bet desired captured image even when the micro-lens surface 410 for magnified image is further provided.

Next, if the user performs a procedure for bringing the optical lens system 160 (or electronic device) close to the object P and a series of computational manipulation procedures (e.g., procedures for driving buttons, icons or software related to magnifying the object of the electronic device) to order to utilize the object magnify function, the electronic device control module 20 supplies power to the optical source 30 to turn on the light source 30 and applies voltage between the two electrodes 314a and 314c at the actuator 310.

Accordingly, if the voltage is applied between the two electrodes 314a and 314c of the actuator 310, the comb electrodes 312a and 312c become a capacitor, and as a result, a force acts to attract each other. Thus, the rotating member 317 moves to the comb electrode 312a to move the rotational hole 332 of the link member 330 to the left, and the link member 330 thus rotates to the right, resulting in the blade 320 connected therewith as a body being located in the opening formation area B for captured image as shown in FIG. 29.

Figure 29:
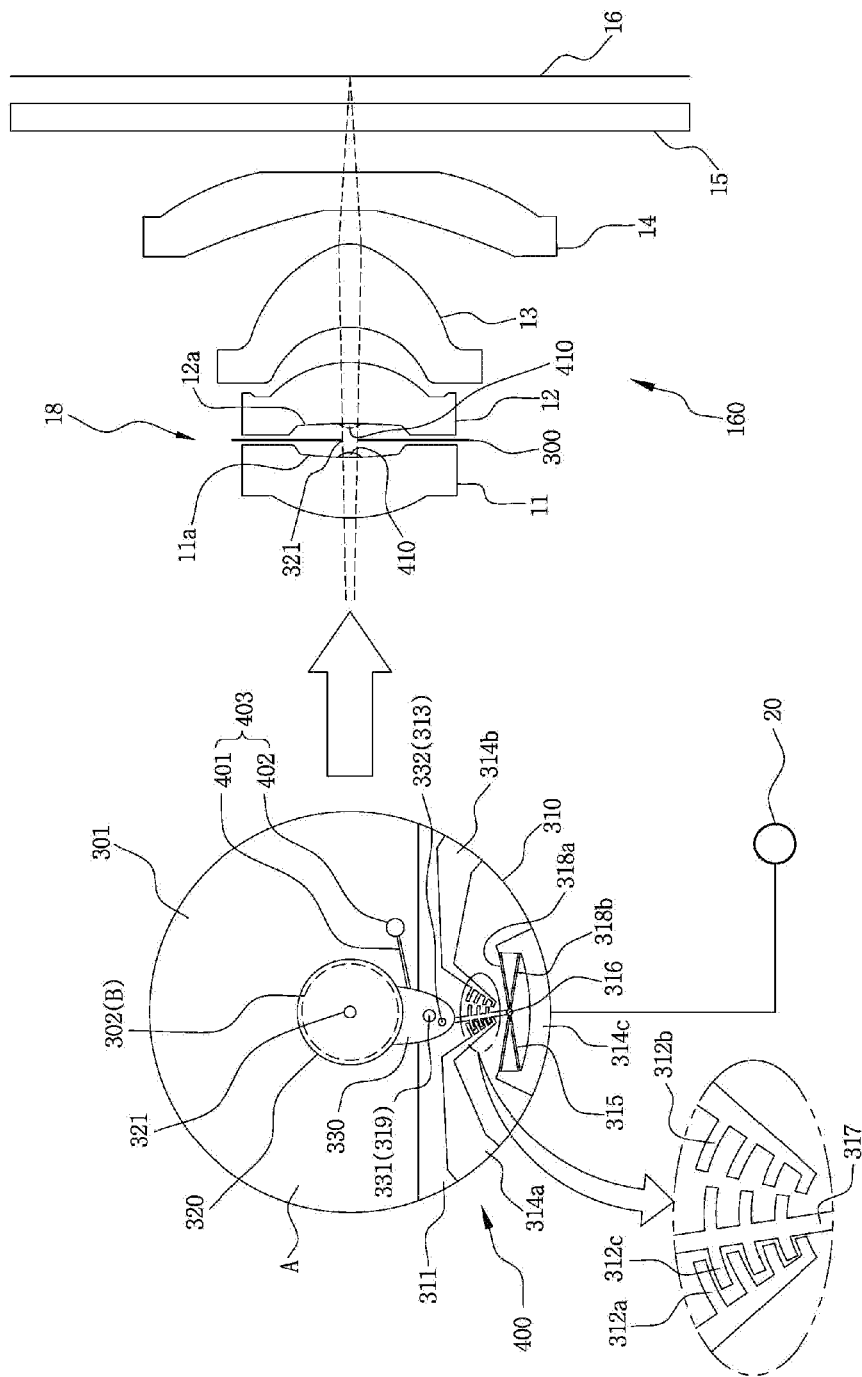

Of course, if the blade 320 is located in the opening formation area B for captured image by the rotation of the link member 330 by the actuator 310, and thus, the opening 302 for captured image is blocked by the blade 320, light beams 19 coming from the object P pass through the micro-lens surface 410 for magnified image and the narrow pin hole 321 for magnified image provided in the blade 320 and form a magnified image corresponding to the object P on the object image formation member 16, so that the user may easily obtain his/her desired magnified image (refer to FIGS. 26 and 29).

Of course, in such an aspect of forming a magnified image, since the micro-lens surface 410 for magnified image which has a larger refractive power than that of the original optical lens surface 11a or 12a is further provided at the center of an optical lens surface 11a right ahead of the aperture stop area 18, the center of an optical lens surface 12a right behind the aperture stop area 18, or the center of each of the optical lens surface 11a right ahead of the aperture stop area 18 and the optical lens surface 12a right behind the aperture stop area 18, which is located on the path where the light beams 19 are incident, the light beams 19 coming from the object P under another environment for implementing a magnified image according to the present invention may pass through the micro-lens surface 410 for magnified image and the narrow opening of the pin hole 321 for magnified image and then form a series of converging focuses with a smaller width on the object image formation member 16 (refer to FIG. 29), allowing for formation of a clearer magnified image.

In such magnified image formation aspect, if the blade 320 is located in the opening formation area B of captured image by the rotation of the link member 330 by the actuator 310, and thus, the opening 302 for captured image is blocked by the blade 320, then the blocking plate 402 of the blocking member 403 provided at a side of the link member 330 is naturally located in the opening non-formation area A for captured image in accordance with the rotation of the link member 330, unblocking the micro-lens surface 410 of magnified image (refer to FIG. 29).

Of course, in such an unblocking aspect the blocking member 403 has no negative influence on the formation of magnified image by the micro-lens surface 410 for magnified image, and resultantly, the user of the electronic device may normally obtain his/her desired magnified image even when the blocking member 403 is further provided.

Meanwhile, as shown in FIG. 26, also in the other embodiment of the present invention, the switching aperture 400 may further include a cap 340 having an opening 341 corresponding to the opening 302 for captured image at the center thereof and coupled with the base plate 301 as a body. Also in this case, the opening 341 of the cap 340 may have a site identical or slightly larger than the opening 302 for captured image which functions as an aperture stop for captured image to prevent a deterioration of the functionality of the opening 302 of captured image as an aperture stop for captured image.

Of course, also in the case of further including the cap 340, the switching aperture 400 configures a complete unit in which the base plate 301 blade 320, link member 330, and actuator 310 are combined with the cap 340, benefiting in light of treatment or distribution (for convenience, the process of forming a captured image/magnified image when the cap 340 is further provided is omitted).

Figure 30:
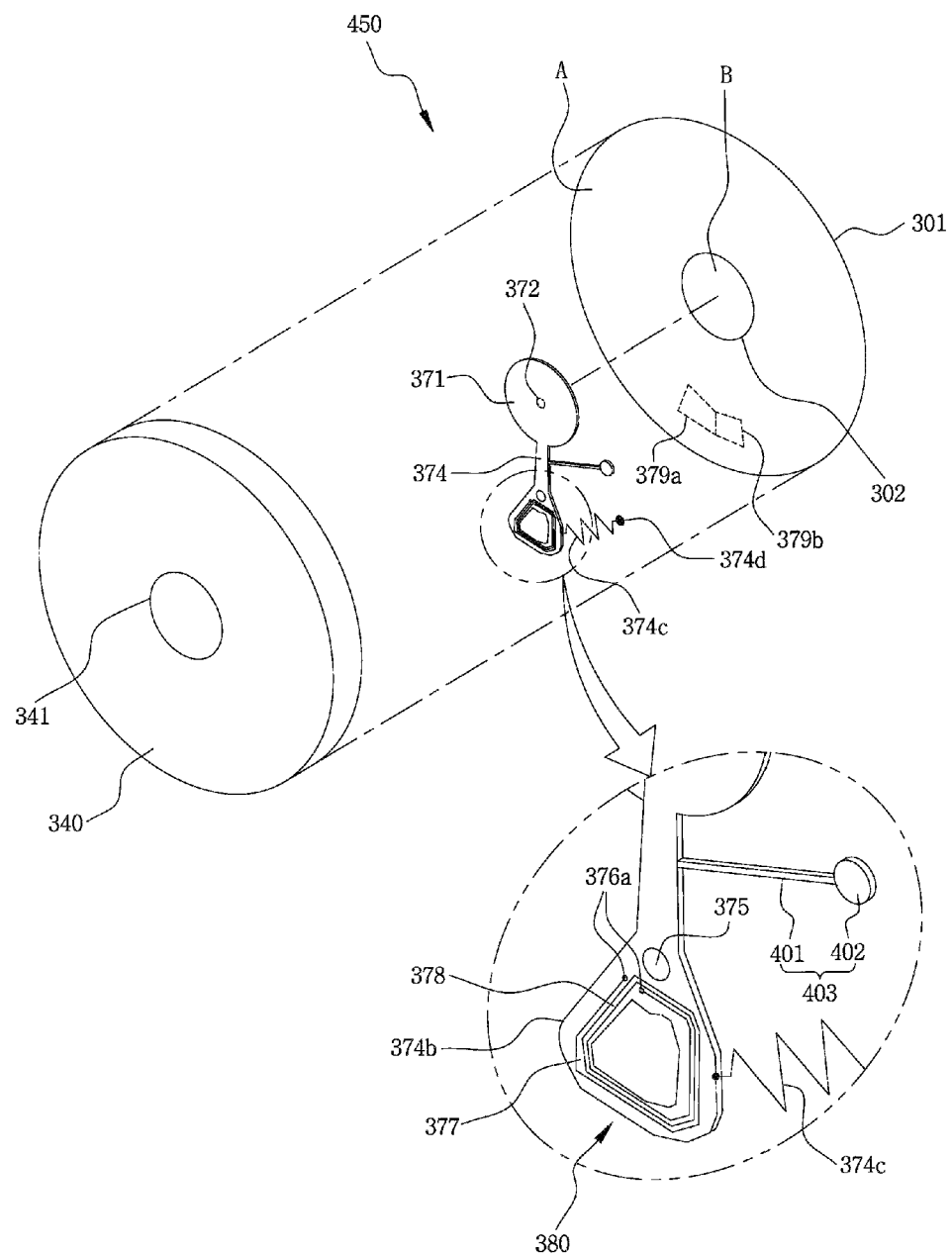
FIGS. 30 to 32 are views conceptually illustrating a detailed structure of a switching aperture and a process of performing functions according to another embodiment of the present invention.
Figure 31:
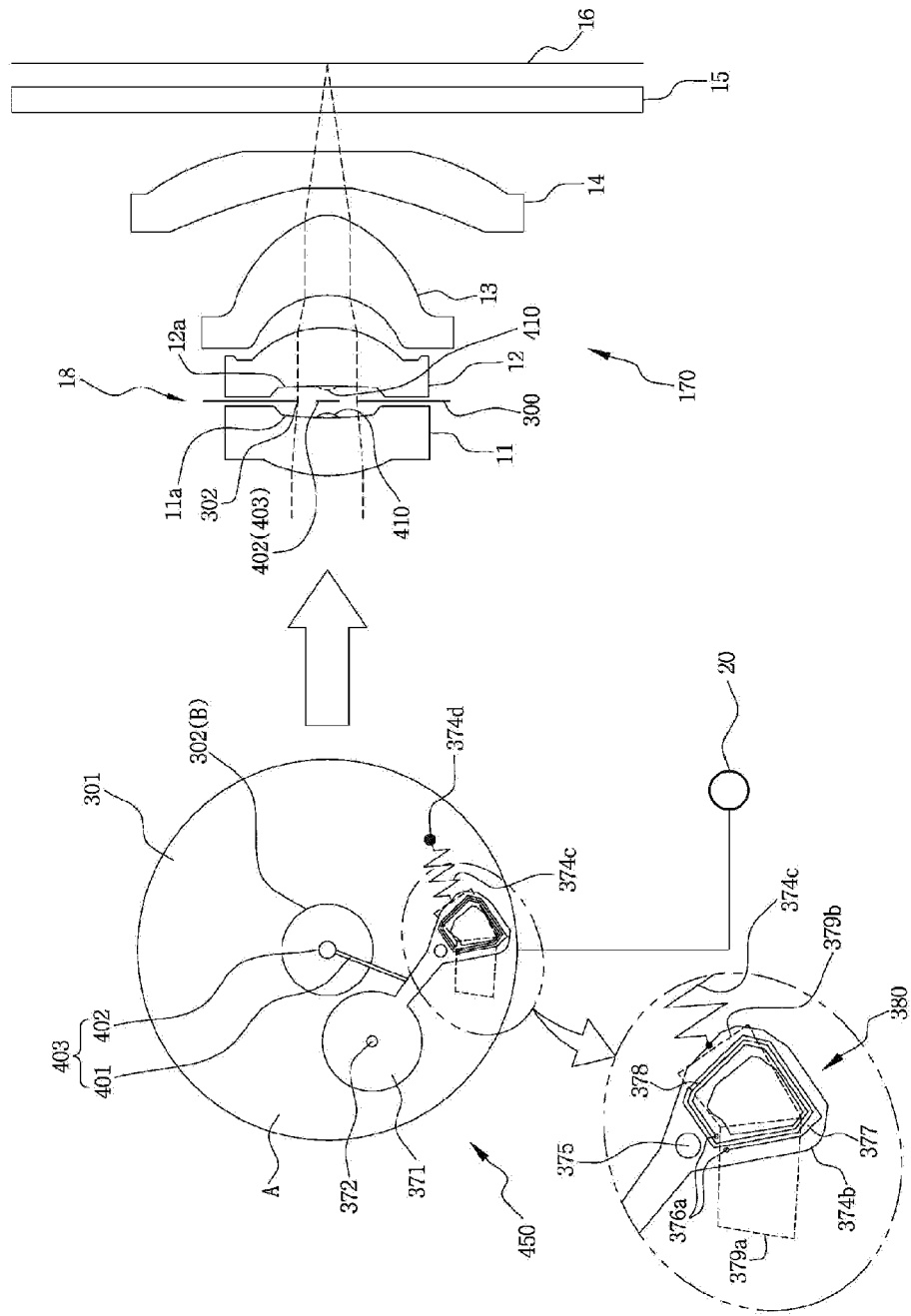
Figure 32:
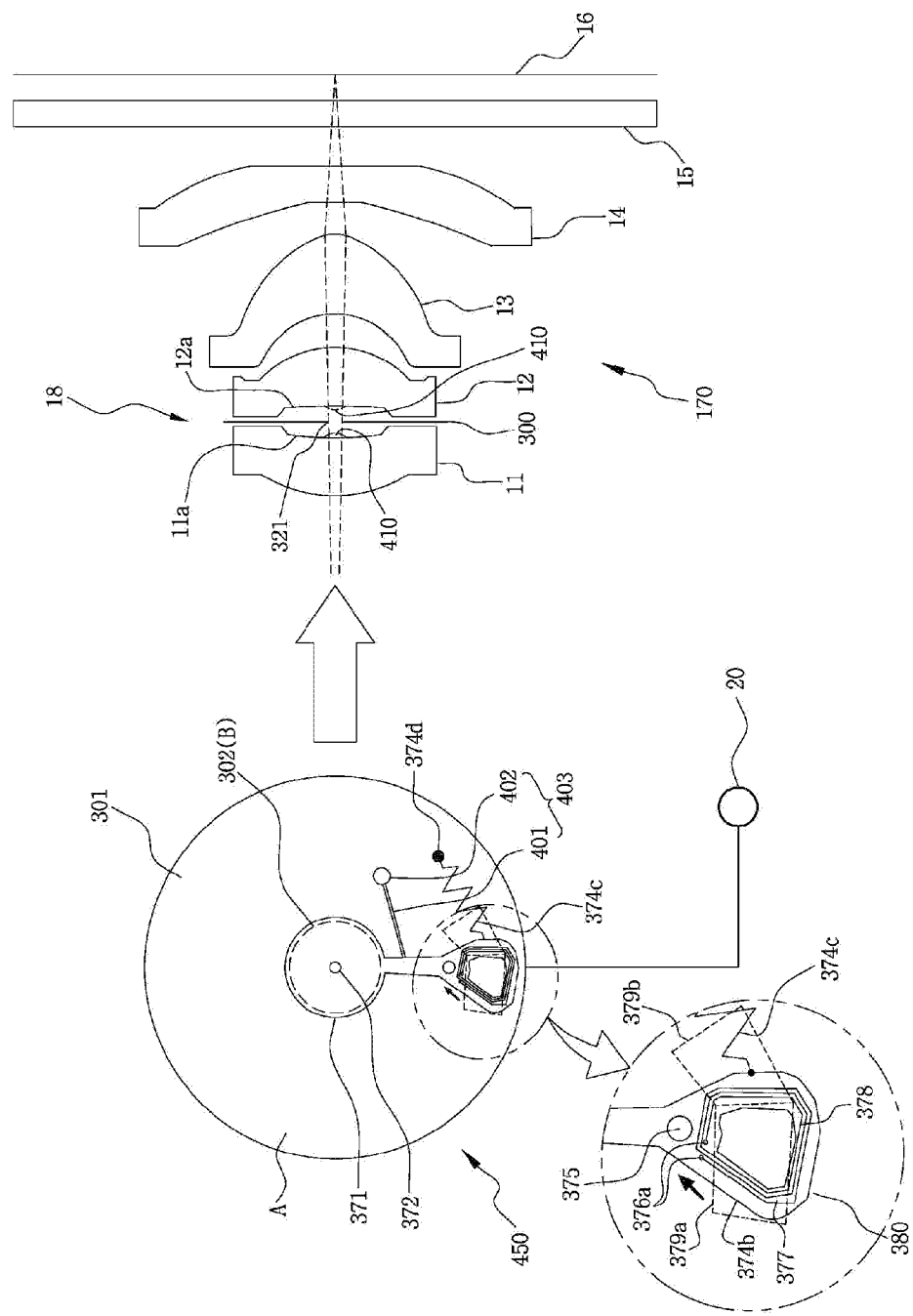

Meanwhile, also in the system of a switching aperture 450 according to another embodiment of the present invention, as shown in FIGS. 30 to 32, the actuator 380 has the characteristics of, e.g., a voice coil motor (VCM)-type actuator and has a systematically combined configuration of a U-shaped bobbin 374b, as flexible printed circuit board (FPCB) 377 formed on the bobbin 374b and having a planar coil 378 and an electrode 376a, a spring 374c connected with the bobbin 374b as a body, and a spring support 374d installed on the base plate 301 while connected with the spring 374c to fasten the spring 374c to the base plate 301.

Also in this case, in a switching aperture 450 according to the present invention, a micro-lens surface 410 for magnified image may be further provided at centers of optical lens surfaces immediately adjacent to the aperture stop area 18, e.g., a center of an optical lens surface 11a right ahead of the aperture stop area 18, a center of an optical lens surface 12a right behind the aperture stop area 18, or a center of each of the optical lens surface 11a right ahead of the aperture stop area 18 and the optical lens surface 12a right behind the aperture stop area 18 (refer to FIGS. 31 and 32), and a blocking member 403 may be further provided at a side of the link member 374 to block the micro-lens surface 410 for magnified image when the blade 371 is located in the opening non-formation area A for captured image, and thus, the opening 302 for captured image is located on a path where the light beams 19 are incident (refer to FIG. 31).

Also in this case, the center of the optical lens surface 11a further including the micro-lens surface 410 for magnified image or the center of the optical lens surface 12a is rendered to have a larger refractive power than that of the original optical lens surface 11a or 12a before the micro-lens surface 410 for magnified image is formed. The blocking member 403 includes a blocking plate 402 defining as blocking area and a connecting rod 401 connecting the blocking plate 402 with the link member 374 as a body.

Now described in detail is a process for selectively forming a captured image or magnified image according to the state of being supplied power by an optical lens system 170 for camera, including the switching aperture 450, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of cutting off current (power) supplied to the actuator 380 (or a procedure for maintaining the current cuttoff state).

Accordingly, if current is cut off (or the current cutoff state is maintained), the bobbin 374b of the actuator 380 is inclined to the right (or maintains the state of being inclined to the right) by an elastic force exerted b the spring 374c in a direction of attraction, and thus, the link member 374 is rotated to the left (or maintain the state rotated to the left), allowing the blade 371 connected therewith as a body to be located in the opening non-formation area A for captured image, as shown in FIG. 31.

Of course, if the blade 371 is located in the opening non-formation area A for captured image by the rotation of the link member 374 by the actuator 380, and resultantly, the opening 302 for captured image is opened, light beams 19 coming from the object P pass through the wide opening 302 for captured image and form a captured image corresponding to the object P on the object image formation member 16, so that the user may easily obtain his/her desired captured image (refer to FIG. 31).

In such captured image formation aspect, if the blade 371 is located in the opening non-formation area A of captured image by the rotation of the link member 374 by the actuator 380, and thus, the opening 302 for captured image is opened, then the blocking plate 402 of the blocking member 403 provided at a side of the link member 374 is naturally located in the opening formation area B for captured image in accordance with the rotation of the link member 374, blocking the micro-lens surface 410 of captured image (refer to FIG. 31).

Of course, in such a blocking aspect of the blocking member 403, the micro-lens surface 410 for magnified image has no negative influence on the formation of captured image, and resultantly, the user of the electronic device may normally obtain his/her desired captured image even when the micro-lens surface 410 for magnified image is further provided.

Next, if the user performs a procedure for bringing the optical lens system 170 (or electronic device) close to the object P and a series of computational manipulation procedures (e.g., procedures for driving, buttons, icons, or software related to magnifying the object of the electronic device) in order to utilize the object magnifying function, the electronic device control module 20 supplies power to the optical source 30 to turn on the light source 30 and applies a current (power), which flows in a down-to-up direction (the direction denoted in arrow) along the bobbin 374b, to the bobbin 374b of the actuator 380 corresponding to the magnetic field formation area 379a and applies a current (power), which flows in an up-to-down direction along the bobbin 374b, to the bobbin 374b of the actuator 380 corresponding to the magnetic field formation area 379b, as shown in FIG. 32.

Accordingly, if the current (power) flowing in the down-to-up direction and current (power) flowing in the up-to-down direction along the bobbin 374b, respectively, are applied to the bobbin 374b of the actuator 380 corresponding to the magnetic field formation area 379a and the bobbin 374b of the actuator 380 corresponding to the magnetic field formation area 379b, the magnetic field in an up-to-down vertical direction and the magnetic field in a down-to-up vertical direction, respectively, are formed in the magnetic field formation area 379a and the magnetic field formation area 379b, and by their influence (i.e., by Fleming's left hand rule), a strong force in the left direction is exerted to the bobbin 374b of the actuator 380 corresponding to each magnetic field formation area 379a or 379b, and accordingly, the bobbin 374b of the actuator 380 is moved to the left against the elastic force exerted by the spring 374c in the direction of attraction, resulting in the link member 374 rotating to the right on the pivot shaft 375 and allowing the blade 371 connected therewith as a body to be located in the opening formation area B for captured image as shown in FIG. 32.

Of course, if the blade 371 is located in the opening formation area B for captured image by the rotation of the link member 374 by the actuator 380, and thus, the opening 302 for captured image is blocked by the blade 371, light beams 19 coming from the object P pass through the micro-lens surface 410 for magnified image and the narrow pin hole 372 for magnified image provided in the blade 371 and form a magnified image corresponding to the object P on the object image formation member 16, so that the user may easily obtain his/her desired magnified image (refer to FIG. 32).

Of course, in such an aspect of forming a magnified image, since the micro-lens surface 410 for magnified image which has a larger refractive power than that of the original optical lens surface 11a or 12a before the micro-lens surface 410 for magnified image is formed is further provided at the center of an optical lens surface 11a right ahead of the aperture stop area 18, the center of an optical lens surface 12a right behind the aperture stop area 18, or the center of each of to the optical lens surface 11a right ahead of the aperture stop area 18 and the optical lens surface 12a right behind the aperture stop area 18, which is located on the path where the light beams 19 are incident, the light beams 19 coming from the object P under another environment for implementing a magnified image according to the present invention may pass through the micro-lens surface 410 for magnified image and the narrow opening of the pin hole 372 for magnified image and then form a series of converging focuses with a smaller with on the object image formation member 16 (refer to FIG. 32), allowing for formation of a clearer magnified image.

In such magnified image formation aspect, if the blade 371 is located in the opening formation area B of captured image by the rotation of the link member 374 by the actuator 380, and thus, the opening 302 for captured image is blocked by the blade 371, then the blocking plate 402 of the blocking member 403 provided at a side of the link member 374 is naturally located in the opening non-formation area A for captured image in accordance with the rotation of the link member 374, unblocking the micro-lens surface 410 of magnified image (refer to FIG. 32).

Of course, in such an unblocking aspect, the blocking member 403 has no negative influence on the formation of magnified image by the micro-lens surface 410 for magnified image, and resultantly, the user of the electronic device may normally obtain his/her desired magnified image even when the blocking member 403 is further provided.

Meanwhile, as shown in FIG. 30, also in the other embodiment of the present invention, the switching aperture 450 may further include a cap 340 having an opening 341 corresponding to the opening 302 for captured image at the center thereof and coupled with the base plate 301 as a body. Also in this case, the opening 341 of the cap 340 may have a size identical or slightly larger than the opening 302 for captured image which functions as an aperture stop for captured image to prevent a deterioration of the functionality of the opening 302 of captured image as an aperture stop for captured image.

Of course, also in the case of further including the cap 340, the switching aperture 450 configures a complete unit in which the base plate 301, blade 371, link member 374, and actuator 380 are combined with the cap 340, benefiting in light of treatment or distribution (for convenience, the process of forming a captured image/magnified image when the cap 340 is further provided is omitted).

Figure 33:
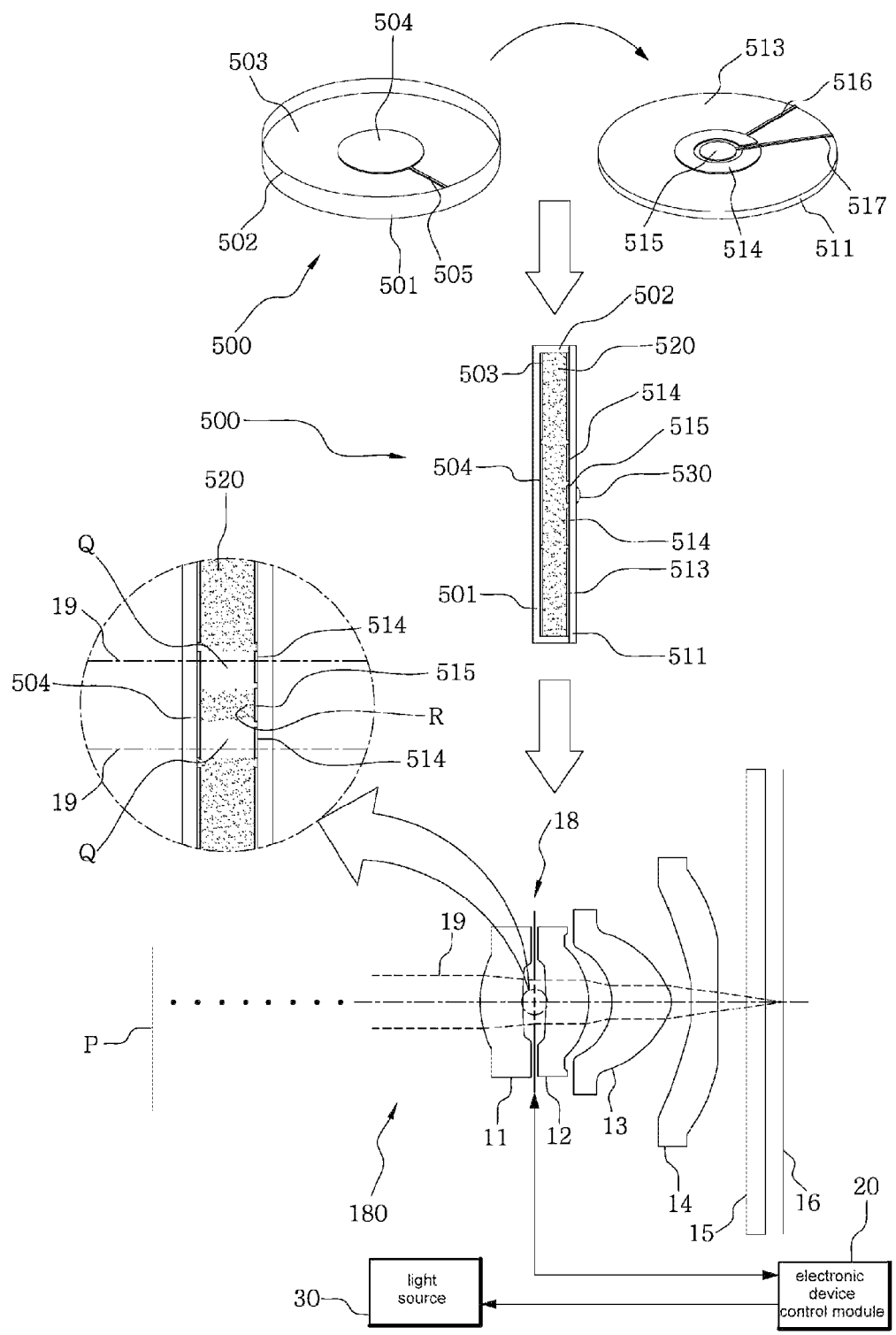
FIGS. 33 to 37 are views conceptually illustrating a detailed structure of a switching aperture and a process of performing functions according to another embodiment of the present invention.
Figure 34:
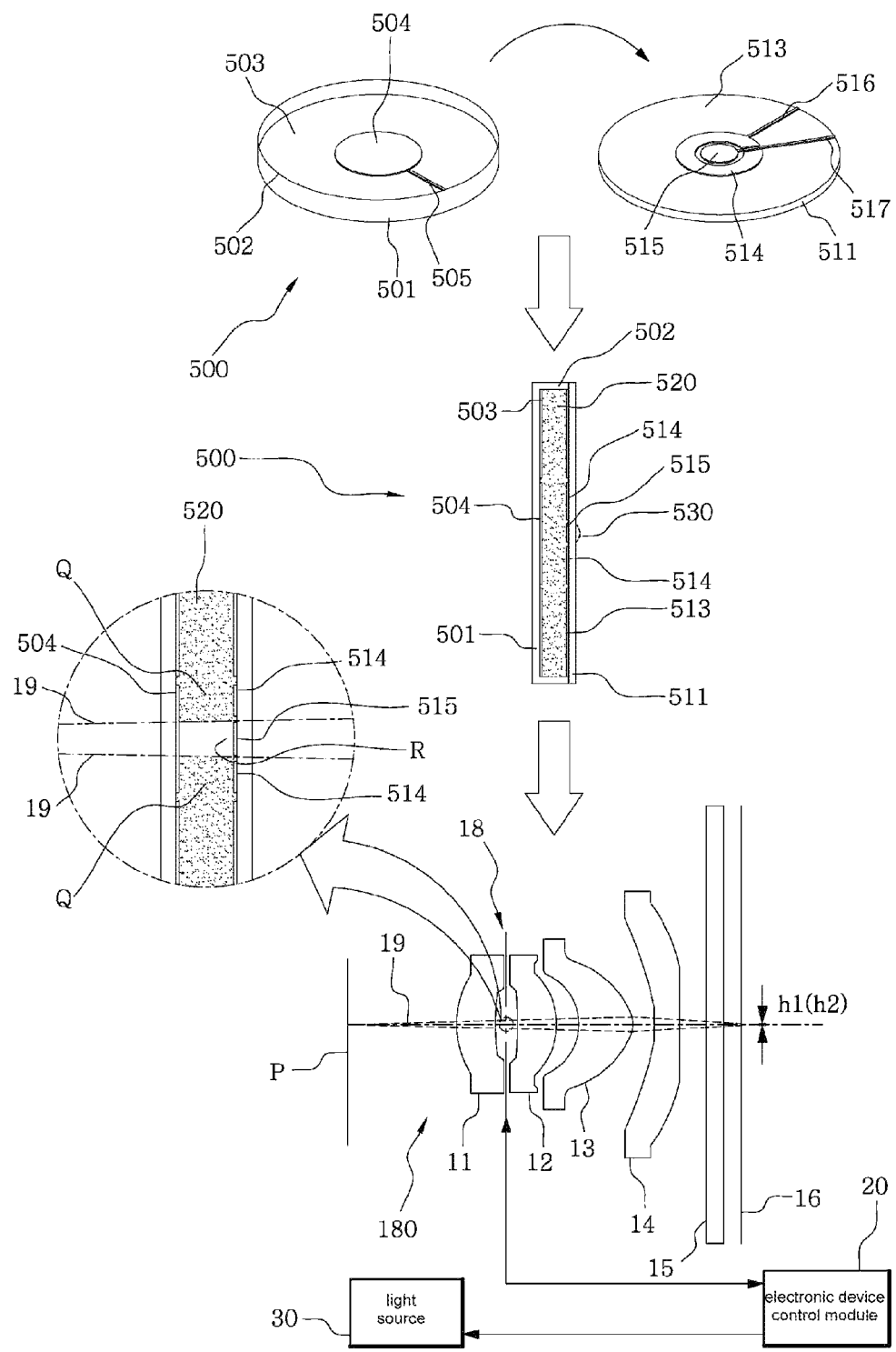

Meanwhile, as shown in FIGS. 33 and 34, also in the optical lens system 180 for camera according to another embodiment of the present invention, a switching aperture 500 is further disposed at a position where an aperture stop area 18 is defined.

In this case, according to the other embodiment of the present invention, the switching aperture 500 may perform as series of switching operations of increasing the width of its valid transparent area as shown in FIG. 33) or decreasing the width of the valid transparent area (as shown in FIG. 34) according to a power supply state under the control of an electronic device control module 20 to induce the light beams from the object P to widen or narrow, thereby functioning as a guide to selectively form a captured image corresponding to the object P (as shown in FIG. 33) or a magnified image corresponding to the object P (as shown in FIG. 34) on the object image formation member 16.

Of course, according to another embodiment of the present invention, the switching aperture 500 may also fully escape from the conventional raw approach of independently attaching/detaching a separate lens system for magnifying object from the optical lens system for camera, and rather, it is stably embedded in the optical lens system 180 for camera. Thus, also under another implementation environment according to the present invention, the user may freely obtain magnified images as well as his/her desired captured images without any trouble in portability of the electronic device.

Also here, in such a phase that the valid transparent area of the switching aperture 500 is narrowed so that a magnified image (as shown in FIG. 34) corresponding to the object P is selectively formed on the object image formation member 16, the light source 30 is turned on under the control of the electronic device control module 20, and it may thus function as a guide for supplying a series of light beams to the object P (for reference, as shown in FIG. 33, in case a captured image corresponding to the object P is formed on the object image formation member 16, the light source 30 is turned off under the control of the electronic device control module 20).

In this case, according to another embodiment of the present invention, the switching aperture 500 has a systematically combined configuration of a first transparent plate 501 having a central transparent electrode 504 and an outer transparent electrode 503 surrounding the central transparent electrode 504 (in this case, the central transparent electrode and the outer transparent electrode may be merged into a transparent electrode depending on contexts), a side plate 502 disposed on the edge of the first transparent plate 501 (in this case, the side plate 502 may alternatively be disposed on the edge of the second transparent plate 511), a second transparent plate 511 coupled with the first transparent plate 501 as a body to form a series of spacing spaces and having a transparent electrode 514 for captured image and an outer transparent electrode 513 surrounding the transparent electrode 514 for captured image, a transparent electrode 515 for magnified image disposed at a center of the second transparent plate 511 while electrically separated from the transparent electrode 514 for captured image and narrowing light beams 19 coming from the object P to adjust the light beams 19 to have a large focal depth so that a magnified image corresponding to the object P may be formed on the object image formation member 16, and a polymer dispersed liquid crystal layer 520 disposed in the spacing space between the first transparent plate 501 and the second transparent plate 511, forming a regular or irregular arrangement state depending on the state of being supplied power from the transparent electrode 514 for captured image or transparent electrode 515 for magnified image while power is supplied to the central transparent electrode 504 to adjust an area Q corresponding to the transparent electrode 514 for captured image or an area R corresponding to the transparent electrode 515 for magnified image into a transparent state or opaque state so as to guide the light beams 19 coming from the object P to pass through the transparent electrode 514 for captured image to form captured image (the case shown in FIG. 33) or the light beams 19 pass through the transparent electrode 515 for magnified image to form a magnified image (the case shown in FIG. 34).

Here, an electrode line 505 may be further disposed on the first transparent plate 501 to deliver voltage (power) outputted applied from the electronic device control module 20 to the central transparent electrode 504, and an electrode line 516 for delivering voltage (power) outputted/applied from the electronic device control module 20 to the transparent electrode 514 for captured image and an electrode line 517 for delivering voltage (power) outputted/applied from the electronic device control module 20 to the transparent electrode 515 for magnified image are further provided on the second transparent plate 511.

In this case, the electrode lines 505, 516, and 517 are preferably formed in different directions from each other or subjected to opaque coating in order to prevent unnecessary transparent from occurring in the aspect where the first transparent plate 501 and the second transparent plate 511 are coupled together up to down (or front to rear).

Here, the first transparent plate 501 and the second transparent plate 511 have a transparent glass material or transparent polymer material (e.g., transparent polyester, transparent polycarbonate, transparent polymethylmethacrylate, or transparent polyethylene naphthalate).

Further, the central transparent electrode 504, outer transparent electrodes 503 and 513, transparent electrode 514 for captured image, and transparent electrode 515 for magnified image have such a material as indium tin oxide, graphene, poly 3,4-ethylenedioxythiophene (PEDOT), or carbon nano tube (CNT).

Here, the polymer dispersed liquid crystal layer 520 is configured to include a polymer compound where liquid crystal particles and pigment are dispersed. In this case, as the polymer compound, a polyvinyl alcohol-based, epoxy-based, or urethane acrylate-based polymer matrix may be selected, and as the liquid crystal particles, mixed liquid crystal where cyano-biphenyl-based single-type liquid crystals are mixed, mixed liquid crystal where single-type liquid crystals with fluorine replaced in biphenyl mesogen are mixed, or mixed liquid crystal where ter-phenyl and biphenyl-based single-type liquid crystals are mixed may be selected, and as the pigment, dichromic pigment may be selected.

Here, the polymer dispersed liquid crystal layer 520 may further include a surfactant for leading to an easier change in the orientation of the polymer compound, liquid crystal particles, or pigment upon application of a voltage. In this case, as the surfactant, e.g., stearyl methacrylate may be selected.

Now described in detail is a process for selectively forming a captured image or magnified image according to the state of being supplied power by an optical lens system 180 for camera, including the switching aperture 500, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of applying voltage (power) to the central transparent electrode 504 of the first transparent plate 501 and the transparent electrode 514 for captured image of the second transparent plate 511 via the electrode line 504 and electrode line 516 (refer to FIG. 33).

Accordingly, if voltage (power) is applied to the central transparent electrode 504 of the first transparent plate 501 and the transparent electrode 514 for captured image of the second transparent plate 511, the polymer compound, liquid crystal particles, and pigment disposed midway in the area Q corresponding to the transparent electrode 514 for captured image and the central transparent electrode 504 are polarized to be regularly arranged, allowing the area Q corresponding to the transparent electrode 514 for captured image to be adjusted into the transparent state as shown in FIG. 33.

At this time, since no separate voltage (power) is applied to the transparent electrode 515 for magnified image of the second transparent plate 511, the polymer compound, liquid crystal particles, and pigment of the polymer dispersed liquid crystal layer 520 which are disposed midway in the area R corresponding to the transparent electrode 515 for magnified image remain in the irregular arrangement state, allowing the area R corresponding to the transparent electrode 515 for magnified image to be adjusted into the opaque state as shown in FIG. 33.

Of course, as such, if voltage (power) is applied to the central transparent electrode 504 of the first transparent plate 501 and the transparent electrode 514 for captured image of the second transparent plate 511, and the polymer compound, liquid crystal particles, and pigment disposed midway in the corresponding area Q are regularly arranged, and thus, the area Q corresponding to the transparent electrode 514 for captured image turns into the transparent state, then light beams 19 coming from the object P pass through the wide transparent electrode 514 for captured image and form a captured image corresponding to the object P on the object image formation member 16, so that the user may easily obtain his/her desired captured image (refer to FIG. 33).

Next, if the user performs a procedure for bringing the optical lens system 180 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and applies voltage (power) to the central transparent electrode 504 of the first transparent plate 501 and the transparent electrode 515 for magnified image of the second transparent plate 511 via the electrode line 505 and electrode line 51 (refer to FIG. 34).

Accordingly, if voltage (power) is applied to the central transparent electrode 504 of the first transparent plate 501 and the transparent electrode 515 for magnified image of the second transparent plate 511, the polymer compound, liquid crystal particles, and pigment disposed midway in the area R corresponding to the transparent electrode 515 for magnified image and the central transparent electrode 504 are polarized to be regularly arranged, allowing the area R corresponding to the transparent electrode 515 for magnified image to be adjusted into the transparent state as shown in FIG. 34.

At this time, since no separate voltage (power) is applied to the transparent electrode 514 for captured image of the second transparent plate 511, the polymer compound, liquid crystal particles, and pigment of the polymer dispersed liquid crystal layer 520 which are disposed midway in the area Q corresponding to the transparent electrode 514 for captured image remain in the irregular arrangement state, allowing the area Q corresponding to the transparent electrode 514 for captured image to be adjusted into the opaque state as shown in FIG. 34.

Of course, as such, if voltage (power) is applied to the central transparent electrode 504 of the first transparent plate 501 and the transparent electrode 515 for magnified image of the second transparent plate 511, and the polymer compound, liquid crystal particles, and pigment disposed midway in the corresponding area R are regularly arranged, and thus, the area R corresponding to the transparent electrode 515 for magnified image turns into the transparent state, then light beams 19 coming from the object P pass through the narrow transparent electrode 515 for magnified image and form a magnified image corresponding to the object P on the object image formation member 16, so that the user may easily obtain his/her desired magnified image (refer to FIG. 34).

Here, the transparent electrode 515 for magnified image, like the pin hole for magnified image, has a small diameter, preferably 0.03 mm to 0.3 mm to significantly narrow the width of light beams 19 coming from the object P, as contrasted to the conventional aperture stop. Thus, under a unique environment for implementing a magnified image according to the present invention, light beams 19 coming from the object P pass through the narrow area defined by the transparent electrode 515 for magnified image and then forms a series of converging focuses with a small width h1 and large focal depth (refer to FIG. 34) thereby forming a very clear magnified image. Resultantly, the user of the electronic device has no difficulty in utilizing the optical lens system 180 for camera for magnifying object in contrast to the conventional art.

Also here, if the diameter of the transparent electrode 515 for magnified image is rendered to be smaller than 0.03 mm, power supplied to the light source 30 needs to be increased causing more power consumption in the electronic device. If the diameter of the transparent electrode 515 of magnified image is larger than 0.3 mm, light beams may be more likely to diffuse. Accordingly, according to the present invention, the diameter of the transparent electrode 515 for magnified image preferably remains in a range from 0.03 mm to 0.3 mm.

Meanwhile, as shown in FIGS. 33 and 34, according to the present invention, a micro-lens 530 may be further provided, which has as positive refractive power to converge light beams 19 coming from the object P on the transparent electrode 515 for magnified image.

Of course, also under the circumstance where the micro-lens 530 is further provided, if voltage (power) is applied to the central transparent electrode 504 of the first transparent plate 501 and the transparent electrode 515 for magnified image of the second transparent plate 511, and the polymer compound, liquid crystal particles, and pigment disposed midway in the corresponding to area R are regularly arranged, and thus, the area R corresponding to the transparent electrode 515 for magnified image turns into the transparent state, then light beams 19 coming from the object P pass through the narrow transparent electrode 515 for magnified image and the micro-lens 530 and form a magnified image corresponding to the object P on the object image formation member 16, so that the user may easily obtain his/her desired magnified image, as shown in FIG. 34.

Of course, according to another embodiment of the present invention, since the micro-lens 530 having a positive refractive power for converging light beams 19 coming from the object P is further provided on the transparent electrode 515 for magnified image, the light beams 19 under another environment for implementing a magnified image sequentially pass through the transparent electrode 515 for magnified image and the micro-lens 530 and then form a series of converging focuses with a smaller width h2 on the object image formation member 16, allowing for formation of a clearer magnified image.

Figure 35:
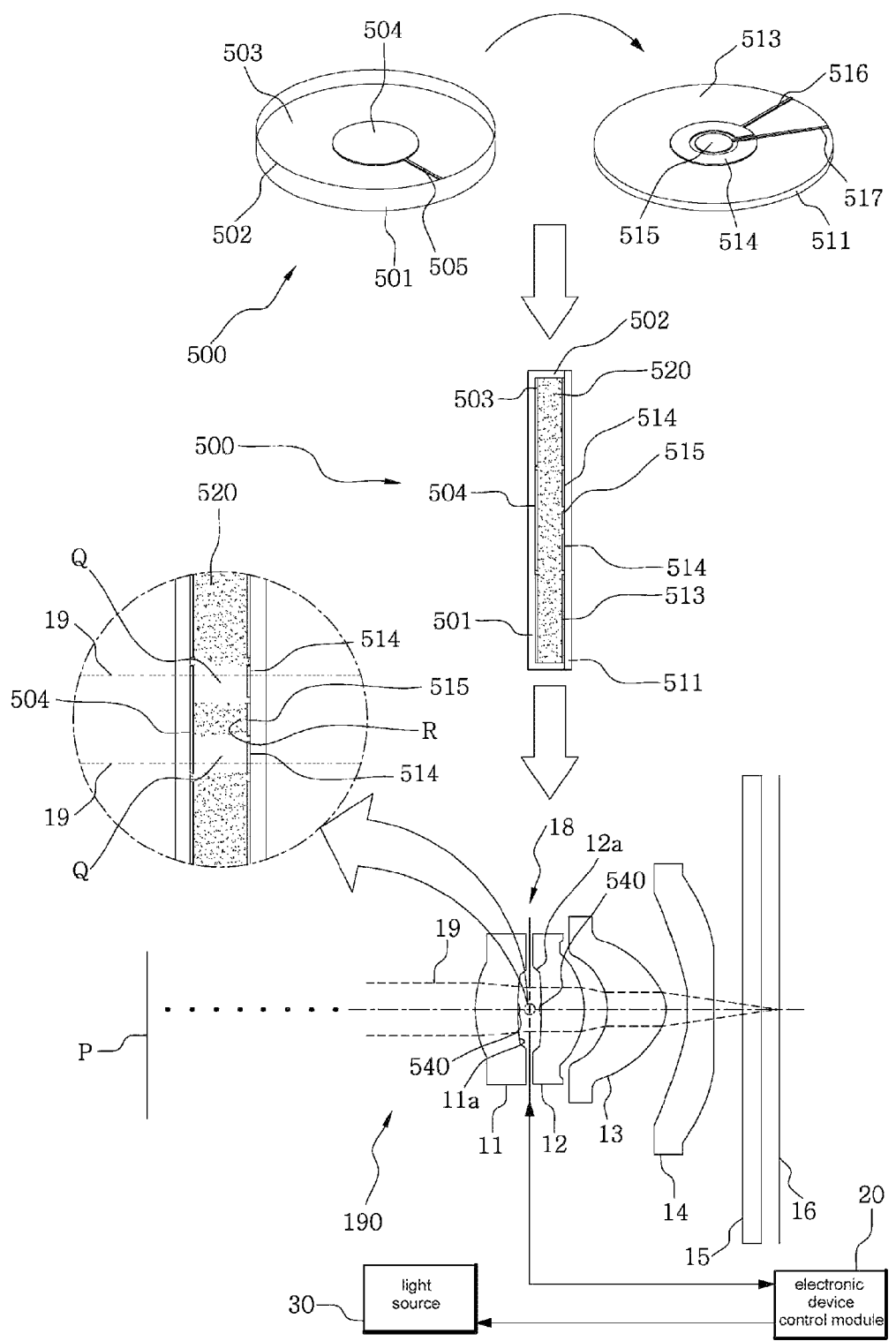
Figure 36:
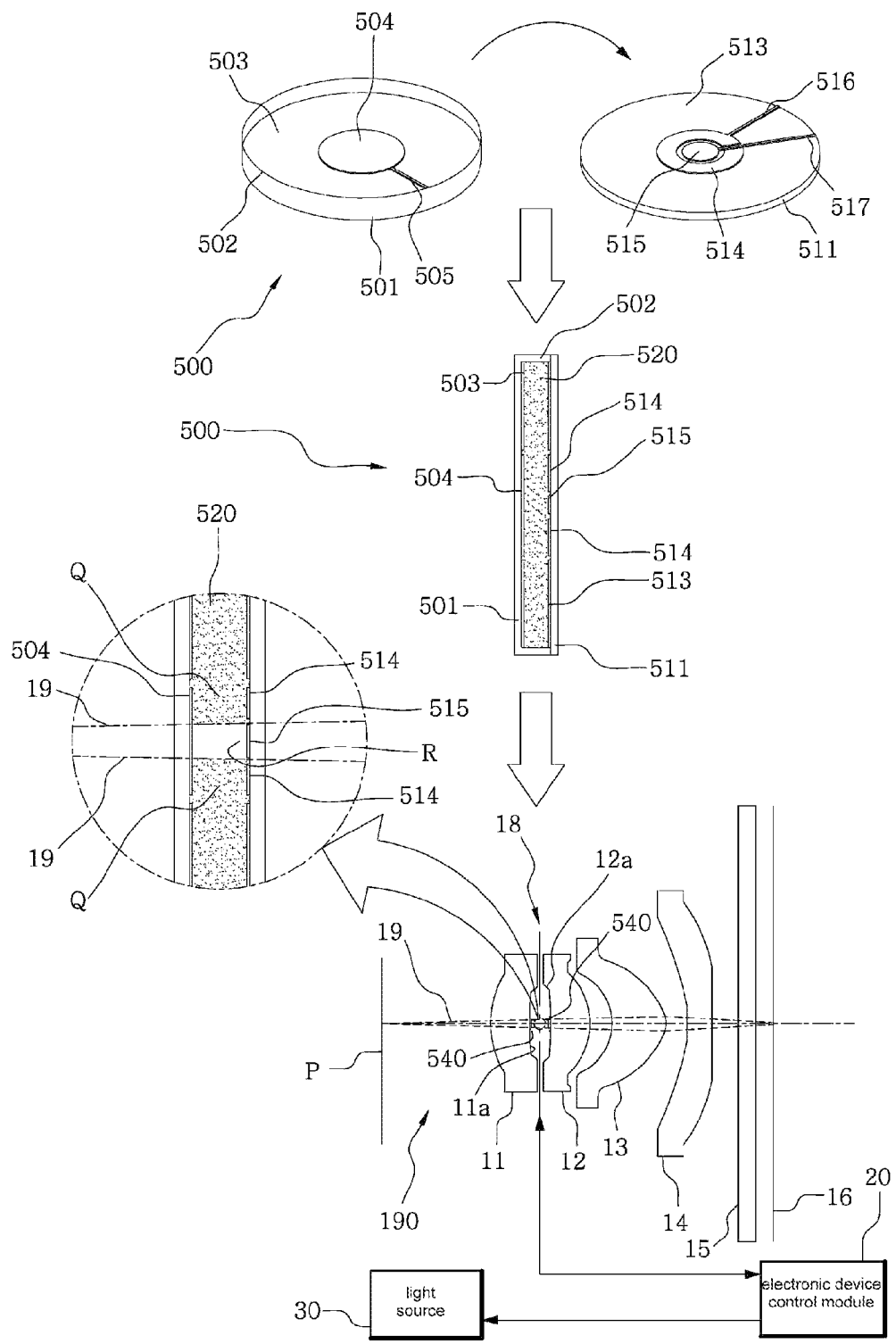

Meanwhile, as shown in FIGS. 35 and 36, according to another embodiment of the present invention, a micro-lens surface 540 for magnified image may be further provided at centers of optical lens surfaces immediately adjacent to the aperture stop area 18, e.g., a center of an optical lens surface 11a right ahead of the aperture stop area 18, a center of an optical lens surface 12a right behind the aperture stop area 18, or a center of each of the optical lens surface 11a right ahead of the aperture stop area 18 and the optical lens surface 12a right behind the aperture stop area 18.

In this case, the center of the optical lens surface 11a further including the micro-lens surface 540 for magnified image or the center of the optical lens surface 12a is rendered to have a larger refractive power than that of the original optical lens surface 11a or 12a before the micro-lens surface 540 for magnified image is formed.

Now described in detail is a process for selectively forming a captured image or magnified image according to the state of being supplied power by an optical lens system 190 for camera, including the switching aperture 500, according to another embodiment of the present invention.

First, if the user performs a series of computational manipulation procedures (e.g., a procedure for driving camera function-related buttons of the electronic device or icons or software, etc.) to utilize the camera function of the electronic device, the electronic device control module 20 performs the procedure of applying voltage (power) to the central transparent electrode 504 of the first transparent plate 501 and the transparent electrode 514 for captured image of the second transparent plate 511 via the electrode line 504 and electrode line 516 (refer to FIG. 35).

Accordingly, if voltage (power) is applied to the central transparent electrode 504 of the first transparent plate 501 and the transparent electrode 514 for captured image of the second transparent plate 511, the polymer compound, liquid crystal particles, and pigment disposed midway in the area Q corresponding to the transparent electrode 514 for captured image and the central transparent electrode 504 are polarized to be regularly arranged, allowing the area Q corresponding to the transparent electrode 514 for captured image to be adjusted into the transparent state as shown in FIG. 35.

At this time, since no separate voltage (power) is applied to the transparent electrode 515 for magnified image of the second transparent plate 511, the polymer compound, liquid crystal particles, and pigment of the polymer dispersed liquid crystal layer 520 which are disposed midway in the area R corresponding to the transparent electrode 515 for magnified image remain in the irregular arrangement state, allowing the area R corresponding to the transparent electrode 515 for magnified image to be adjusted into the opaque state as shown in FIG. 35.

Of course, as such, if voltage (power) is applied to the central transparent electrode 504 of the first transparent plate 501 and the transparent electrode 514 for captured image of the second transparent plate 511, and the polymer compound, liquid crystal particles, and pigment disposed midway in the corresponding area Q are regularly arranged, and thus, the area Q corresponding to the transparent electrode 514 for captured image turns into the transparent state, then light beams 19 coming from the object P pass through the wide transparent electrode 514 for captured image and form a captured image corresponding to the object P on the object image formation member 16, so that the user may easily obtain his/her desired captured image (refer to FIG. 35).

In such phase of forming captured image, as described above, the area R corresponding to the transparent electrode 515 for magnified image corresponding to the micro-lens surface 540 for magnified image, unlike the area Q corresponding to the transparent electrode 514 for captured image forms an opaque state to function to block the micro-lens surface 540 for magnified image (or light beams passing therethrough), and as a result, the micro-lens surface 540 for magnified image has no negative influence on the formation of a captured image, so that the user of the electronic device may normally obtain his/her desired captured image even when the micro-lens surface 540 for magnified image is further provided.

Next, if the user performs a procedure for bringing the optical lens system 190 (or electronic device) close to the object P and a series of computational manipulation procedures (e.g., procedures for driving buttons, icons, or software related to magnifying the object of the electronic device) in order to utilize the object magnifying function, the electronic device control module 20 supplies power to the optical source 30 to turn on the light source 30 and applies voltage (power) to the central transparent electrode 504 of the first transparent plate 501 and the transparent electrode 515 for magnified image of the second transparent plate 511 via the electrode line 505 and electrode line 517 (refer to FIG. 36).

Accordingly, if voltage (power) is applied to the central transparent electrode 504 of the first transparent plate 501 and the transparent electrode 515 for magnified image of the second transparent plate 511, the polymer compound, liquid crystal particles, and pigment disposed midway in the area R corresponding to the transparent electrode 515 for magnified image and the central transparent electrode 504 are polarized to be regularly arranged, allowing the area R corresponding to the transparent electrode 515 for magnified image to be adjusted into the transparent state as shown in FIG. 36.

Also at this time, since no separate voltage (power) is applied to the transparent electrode 514 for captured image of the second transparent plate 511, the polymer compound, liquid crystal particles, and pigment of the polymer dispersed liquid crystal layer 520 which are disposed midway in the area Q corresponding to the transparent electrode 514 for captured image remain in the irregular arrangement state, allowing the area Q corresponding to the transparent electrode 514 for captured image to be adjusted into the opaque state as shown in FIG. 36.

Of course, as such, if voltage (power) is applied to the central transparent electrode 504 of the first transparent plate 501 and the transparent electrode 515 for magnified image of the second transparent plate 511, and the polymer compound, liquid crystal particles, and pigment disposed midway in the corresponding area R are regularly arranged, and thus, the area R corresponding to the transparent electrode 15 for magnified image turns into the transparent state, then light beams 19 coming from the object P pass through the micro-lens surface 540 for magnified image and the narrow transparent electrode 515 for magnified image and form a magnified image corresponding to the object P on the object image formation member 16, so that the user may easily obtain his/her desired magnified image (refer to FIG. 36).

Of course, in such an aspect of forming a magnified image, since the micro-lens surface 540 for magnified image which has a larger refractive power than that of the original optical lens surface 11a or 12a is further provided at the center of an optical lens surface 11a right ahead of the aperture stop area 18, the center of an optical lens surface 12a right behind the aperture stop area 18, or the center of each of the optical lens surface 11a right ahead of the aperture stop area 18 and the optical lens surface 12a right behind the aperture stop area 18, which is located on the path where the light beams 19 are incident, the light beams 19 coming front the object P under another environment for implementing to magnified image according to the present invention may sequentially pass through the micro-lens surface 540 for magnified image and the narrow transparent electrode 515 for magnified image and then form a series of converging focuses with a smaller width on the object image formation member 16 (refer to FIG. 36), allowing for formation of a clearer magnified image.

Various changes may be made to the present invention depending on contexts.

Figure 37:
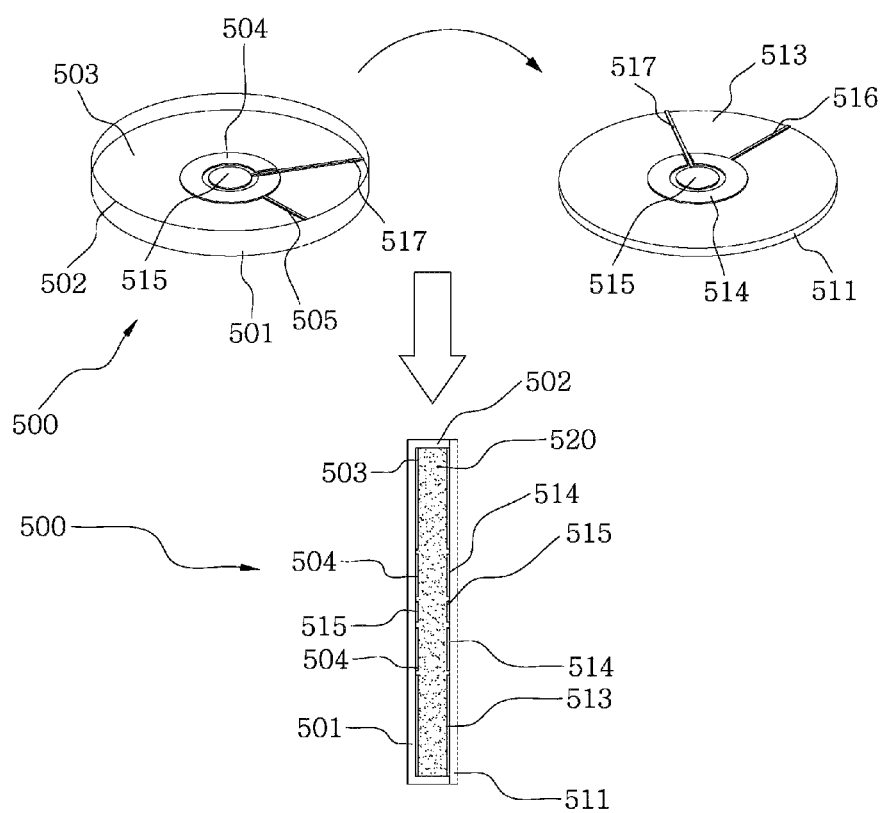

For example, as shown in FIG. 37, according to the present invention, the transparent electrode 515 for magnified image may be installed on the first transparent plate 501.

In this case, such structure is formed where the central transparent electrode 504 of the first transparent plate 501 further includes the transparent electrode 515 for magnified image at the center thereof in this case, the first transparent plate and the second transparent plate both may be regarded as forming a transparent electrode for magnified image at the center of the transparent electrode of captured image as well as the transparent electrode for captured image.

Of course, the same principle in which the corresponding area is adjusted into the transparent state or opaque state by voltage applied to the polymer dispersed liquid crystal layer 520 may apply likewise to this case, and no further detailed description thereof is given for ease of description.

As another example, according to the present invention, the blocking member may be installed in not the blade but the variable connecting member, not the link member but the blade, or may be installed in the bobbin (refer to FIGS. 11, 14, 26, and 30) (of course, other embodiments than the varied embodiments may also be possible in which a separate member moving along with the blade as a body is further installed in the switching aperture, and the blocking member is installed in the separate member, which may also be regarded as belonging to the definition of the blade/variable connecting member/link member according to the present invention).

The instant invention provides useful effects to various electronic devices requiring an optical lens system for camera.

Although particular embodiments of the present invention have been shown and described, it is apparent to one of ordinary skill in the art that various changes may be made to the present invention.

Of course, the distance between the optical lenses according to the present invention is not necessarily limited as fixed. Meanwhile, the base plate having an opening for captured image provided at the center thereof (e.g., in the case where the aperture stop area is positioned in the foremost part thereof) may be formed directly on the barrel or may be constituted of two or more surfaces.

The modified embodiments should not be appreciated individually departing from the technical spirit or point of view of the present invention, and the modified embodiments belong to the scope of the present invention defined in the appended claims.

DESCRIPTION OF SYMBOLS

10, 100, 110, 120, 130, 140, 150, 160, 170, 180, 190 optical lens system for camera
200, 250, 260, 270, 300, 360, 400, 450, 500 switching aperture
P Object

| 11, 12, 13, 14 | optical lens | 15 | optical filter |
|---|---|---|---|
| 16 | object image formation member | 17 | aperture stop |
| 18 | aperture stop area | 19 | light beam |

| 20 | electronic device control module | 30 | light source |
|---|---|---|---|
| 201, 301 | base plate | 202, 302 | opening for captured image |

A opening non-formation area for captured image B opening formation area for captured image

| 206, 320, 371 | blade | 209, 321, 372 | pin hole for magnified image |
|---|---|---|---|
| 207 | variable connecting member | 330, 374 | link member |
| 310, 380 | actuator | 501 | first transparent plate |
| 502 | side plate | 503, 513 | outer electrode |
| 504 | central electrode | 505, 516, 517 | electrode line |

514 transparent electrode for captured image
515 transparent electrode for magnified image
520 polymer dispersed liquid crystal layer There may be provided optical lens systems for cameras which are capable of flexibly performing a series of magnified image formation functions (i.e., object magnifying function) as well as basic captured image formation functions.

That is, there may be an optical lens system for camera that may address various problems (e.g., a significant deterioration of quality competitiveness of the product or reduction in application of the product) that the manufacturer or user of the electronic device may suffer due to a failure to form magnified images of the product without, e.g., difficulty in attaching or detaching an additional lens system for magnified image or increase in the overall length of the product.

What is claimed is:

1. An optical lens system for a camera for image capturing an object, the optical lens system comprising: an object image formation member for forming a captured image or a magnified image corresponding to the object, a light source supplying a light beam to the object when the magnified image is formed, optical lenses arranged in front of the object image formation member, an aperture stop area located in a front space of the optical lenses, a spacing space between the optical lenses, or a rear space of the optical lenses, and a switching aperture disposed in the aperture stop area, wherein the switching aperture includes a base plate having an opening for the captured image at a center thereof, a blade provided in the base plate and having a pin hole for the magnified image at a center thereof, which decreases a width of the light beam coming from the object to adjust the light beam to have an increased focal depth so that a magnified image corresponding to the object is formed on the object image formation member, and a variable connecting member connected with the blade as a body and bent or unbent according to a power supply state to position the blade in an opening non-formation area for the captured image or an opening formation area for the captured image to guide the light beam from the object to pass through the opening for the captured image and form the captured image or to pass through the pin hole for the magnified image and form the magnified image.

2. The optical lens system of claim 1, further comprising a micro-lens surface for the magnified image formed at a center of an optical lens surface right adjacent to the aperture stop area, and wherein when the light beam coming from the object is guided to form the magnified image, the variable connecting member allows the light beam to pass through the micro-lens surface for the magnified image and the pin hole for the magnified image, and wherein a blocking member is disposed at a side of the blade or the variable connecting member to block the micro-lens surface for the magnified image when the blade is positioned in the opening non-formation area for the captured image so that the opening for the captured image is positioned in an incident path of the light beam.

3. The optical lens system of claim 1, wherein the variable connecting member further includes a wrinkle in a direction perpendicular to the base plate to allow the blade to move in parallel with the base plate.

4. The optical lens system of claim 1, wherein the variable connecting member is formed of an electro-active polymer (EAP) material or piezoelectric material.

5. An optical lens system for a camera for image capturing an object, the optical lens system comprising: an object image formation member for forming a captured image or a magnified image corresponding to the object, a light source supplying a light beam to the object when the magnified image is formed, optical lenses arranged in front of the object image formation member, an aperture stop area located in a front space of the optical lenses, a spacing space between the optical lenses, or a rear space of the optical lenses, and a switching aperture disposed in the aperture stop area, wherein the switching aperture includes a base plate having an opening for the captured image at a center thereof, a blade provided in the base plate and having a pin hole for the magnified image at a center thereof which decreases a width of the light beam coming from the object to adjust the light beam to have an increased focal depth so that a magnified image corresponding to the object is formed on the object image formation member, a link member connected with the blade as a body, and an actuator connected via the link member with the blade as a body and rotating the link member according to a power supply state to position the blade in an opening non-formation area for the captured image or an opening formation area for the captured image to guide the light beam from the object to pass through the opening for the captured image and form the captured image or to pass through the pin hole for the magnified image and form the magnified image.

6. The optical lens system of claim 5, further comprising a micro-lens surface for the magnified image formed at a center of an optical lens surface right adjacent to the aperture stop area, and wherein when the light beam coming from the object is guided to form the magnified image, the actuator allows the light beam to pass through the micro-lens surface for the magnified image and the pin hole for the magnified image, and wherein a blocking member is disposed at a side of the blade or the link member to block the micro-lens surface for the magnified image when the blade is positioned in the opening non-formation area for the captured image so that the opening for the captured image is positioned in an incident path of the light beam.

7. The optical lens system of claim 5, wherein the actuator is any one of a voice coil motor (VCM)-type actuator or a micro electro mechanical system (MEMS)-type actuator.

8. The optical lens system of claim 1, wherein the switching aperture further includes a cap having an opening corresponding to the opening for the captured image at a center thereof and coupled with the base plate as a body.

9. The optical lens system of claim 1, wherein the pin hole has a diameter of 0.03 mm to 0.3 mm.

10. The optical lens system of claim 1, wherein a micro-lens having a positive refractive power is further mounted on the pin hole for the magnified image to converge the light beam coming from the object.

11. An optical lens system for a camera for image capturing an object, the optical lens system comprising: an object image formation member for forming a captured image or a magnified image corresponding to the object, a light source supplying a light beam to the object when the magnified image is formed, optical lenses arranged in front of the object image formation member, an aperture stop area located in a front space of the optical lenses, a spacing space between the optical lenses, or a rear space of the optical lenses, and a switching aperture disposed in the aperture stop area, wherein the switching aperture includes a first transparent plate having a central transparent electrode, a second transparent plate coupled with the first transparent plate as a body to form a spacing space and having a transparent electrode for the captured image, a transparent electrode for the magnified image disposed at a center of the second transparent plate while electrically separated from the transparent electrode for the captured image and decreasing a width of the light beam coming from the object to adjust the light beam to have an increased focal depth so that the magnified image corresponding to the object is formed on the object image formation member, and a polymer dispersed liquid crystal layer disposed in the spacing space between the first transparent plate and the second transparent plate, forming a regular or irregular arrangement state depending on a state of being supplied power from the transparent electrode for the captured image or the transparent electrode for the magnified image while power is supplied to the central transparent electrode to adjust an area corresponding to the transparent electrode for the captured image or an area corresponding to the transparent electrode for the magnified image into a transparent state or opaque state so as to guide the light beam coming from the object to pass through the transparent electrode for the captured image to form the captured image or guide the light beam to pass through the transparent electrode for the magnified image to form the magnified image.

12. The optical lens system of claim 11, wherein a micro-lens surface for the magnified image corresponding to the transparent electrode for the magnified image is further formed at a center of an optical lens surface right adjacent to the aperture stop area.

13. The optical lens system of claim 11, wherein the transparent electrode for the magnified image has a diameter of 0.03 mm to 0.3 mm.

14. The optical lens system of claim 11, wherein a micro-lens having a positive refractive power is further mounted on the transparent electrode for the magnified image to converge the light beam coming from the object.

15. The optical lens system of claim 11, wherein the polymer dispersed liquid crystal layer includes a polymer, a liquid crystal particle, and a pigment.

16. The optical lens system of claim 11, wherein the transparent electrode for the magnified image is further formed at a center of the central transparent electrode provided in the first transparent plate.

17. The optical lens system of claim 5, wherein the switching aperture further includes a cap having an opening corresponding to the opening for the captured image at a center thereof and coupled with the base plate as a body.

18. The optical lens system of claim 5, wherein the pin hole has a diameter of 0.03 mm to 0.3 mm.

19. The optical lens system of claim 5, wherein a micro-lens having a positive refractive power is further mounted on the pin hole for the magnified image to converge the light beam coming from the object.

* * * * *